US005991459A

United States Patent [19]

Fogel

[11] Patent Number: 5,991,459
[45] Date of Patent: Nov. 23, 1999

[54] METHOD OF MODIFYING A TIME-VARYING IMAGE SEQUENCE BY ESTIMATION OF VELOCITY VECTOR FIELDS

[75] Inventor: Sergei Valentinovich Fogel, Rochester, N.Y.

[73] Assignee: Eastman Kodak Company, Rochester, N.Y.

[21] Appl. No.: 07/823,723

[22] Filed: Jan. 22, 1992

[51] Int. Cl.$^6$ .................................................... G06K 9/00
[52] U.S. Cl. .................................................. 382/264
[58] Field of Search .................................. 364/516, 560, 364/565, 571.05; 358/105, 107; 382/16, 1

[56] References Cited

U.S. PATENT DOCUMENTS

| | | | |
|---|---|---|---|
| 4,727,422 | 2/1988 | Hinman | 358/133 |
| 4,926,259 | 5/1990 | Billard et al. | 358/105 |
| 5,030,984 | 7/1991 | Buckler et al. | 358/105 |
| 5,067,014 | 11/1991 | Bergen et al. | 364/516 |
| 5,173,865 | 12/1992 | Koike | 364/560 |

OTHER PUBLICATIONS

Huang, "Determining Three–Dimensional Motion and Structure from Two Perspective Views", Handbook of Pattern Recognition and Image Processing, 1986, pp. 333–353.

Second International Conference On Computer Vision, Dec. 5–8, 1988, "A Nonlinear Approach To The Motion Correspondence Problem", by Sergei V. Fogel, pp. 619–628.

Primary Examiner—Christopher S. Kelley
Attorney, Agent, or Firm—Ed Dugas; Gordon M. Stewart

[57] ABSTRACT

A method of modifying a time-varying image sequence in which a parametric velocity vector field that characterizes changes in successive images of the image sequence is estimated. The estimating includes combining optical flow constraints, directional smoothness constraints and regularization constraints in a functional of the estimate of the parametric velocity vector field such that the weighting coefficients of the functional are functions of the parametric velocity vector field to be estimated. A system of nonlinear equations that arise from the optimality criterion of the functional are then solved. Once the system of nonlinear equations is solved, the estimate of the parametric velocity vector field is applied to modify at least one image in the image sequence.

24 Claims, 10 Drawing Sheets

METHOD OF MODIFYING A TIME-VARYING IMAGE SEQUENCE BY ESTIMATION OF VELOCITY VECTOR FIELDS

This application is related to application Ser. No. 07/631,750, filed on Dec. 20, 1990, for a Method for Estimating Velocity Vector Fields From A Time-Varying Image Sequence, now U.S. Pat. No. 5,241,608, issued Aug. 31, 1993.

FIELD OF THE INVENTION

The present invention relates to the field of image processing, and more particularly, to a method of modifying a time-varying image sequence based on an estimate of the velocity vector field.

BACKGROUND OF THE INVENTION

A time-varying image sequence is a sequence of images of a given scene with each successive image taken some time interval apart from the one preceding it. The velocity vector field of an image is defined as the collection of the two-dimensional velocity vectors which are the projections of the three-dimensional velocity vectors of the visible points in the scene. If the scene being imaged changes gradually with time, and if the changes are mostly due to the relative movements of the physical objects in space, then the corresponding changes in the successive images of the sequence can be used to estimate the velocity vector fields of the images.

Reliable estimation of velocity vector fields is very important for the analysis of time-varying image sequences. The temporal variations in the images of the sequence specified by the velocity vector fields can be used to extract spatial information about the scene. They can also be used to extract information characterizing the movements of the objects in the scene. Stereopsis can be considered as a special case of image-sequence analysis where the number of images is restricted to two and the displacement direction is known.

There are two principal approaches to the problem of estimation of the velocity vector field: the feature-based matching approach and the spatio-temporal gradient approach. For feature-based matching approach, the image points with significant variations in the values of the time-varying image function, called feature points, are identified in both images. The estimation of the velocity vector field is accomplished by matching the feature points of one image to the feature points of the other image. The spatio-temporal gradient approach is based on the constraint imposed on each velocity vector relating the spatial gradient of time-varying image function to the temporal derivative of the time-varying image function.

The spatial variation in the time-varying image function utilized in the above approaches do not provide sufficient information to determine the estimate of the velocity vector field. In the feature-based matching approach the velocity vectors can be estimated only on a sparse set of image points, while in the spatio-temporal gradient approach at most one constraint is imposed on two components of each velocity vector. To overcome these difficulties, it has been proposed, Horn and Schunk, "Determining Optical Flow", Artif. Intell. 17, 1981, pp. 185–203, that velocity vector fields should vary smoothly from point to point on the image plane. This requirement enabled estimation of both components of the velocity vector at each image point; however, it forced the estimate of the velocity vector field to vary smoothly across the occluding boundaries. Several approaches, which are based on the selective application of the smoothness requirement, have been proposed to overcome this difficulty.

Yachida used estimates of the velocity vectors at prominent feature points as reliable initial estimates and sequentially propagated them into neighboring image points. Davis et al first computed estimates of the velocity vectors at corner points and then propagated them along the contour lines between corner points. Hildreth estimated the velocity vector field along zero-crossing contours. Nagel used image points with significant second-order spatial variation to estimate of velocity vector fields. Nagel and Enkelmann investigated oriented smoothness constraints for the estimation of velocity vector fields. Terzopoulos introduced controlled continuity measures to overcome the discontinuities in visual problems. Hierarchical approaches to the problem of estimation of velocity vector fields have also been investigated.

There is a need for a method of modifying a time-varying image sequence based on an improved method of estimating the velocity vector field.

SUMMARY OF THE INVENTION

This and other needs are met by the present invention which provides a method of modifying a time-varying image sequence in which a parametric velocity vector field that characterizes changes in successive images of the image sequence is estimated. The estimating includes combining optical flow constraints, directional smoothness constraints and regularization constraints in a functional of the estimate of the parametric velocity vector field such that the weighting coefficients of the functional are functions of the parametric velocity vector field to be estimated. A system of nonlinear equations that arise from the optimality criterion of the functional are then solved. Once the system of nonlinear equations is solved, the estimate of the parametric velocity vector field is applied to modify at least one image in the image sequence.

In another embodiment of the present invention, the estimation of the parametric velocity vector field includes combining optical flow constraints, directional smoothness constraints and regularization constraints in a functional of the estimate of the parametric velocity vector field such that weighting coefficients of the functional are functions of the parametric velocity vector field to be estimated; and providing a dual feed-back interaction between the optical flow constraints and the directional smoothness constraints.

These and other objects of the present invention will become more apparent when taken in conjunction with the following description and drawings wherein like characters indicate like parts and which drawings form a part of the present description.

DETAILED DESCRIPTION OF THE PREFERRED EMBODIMENT

Figure 1:
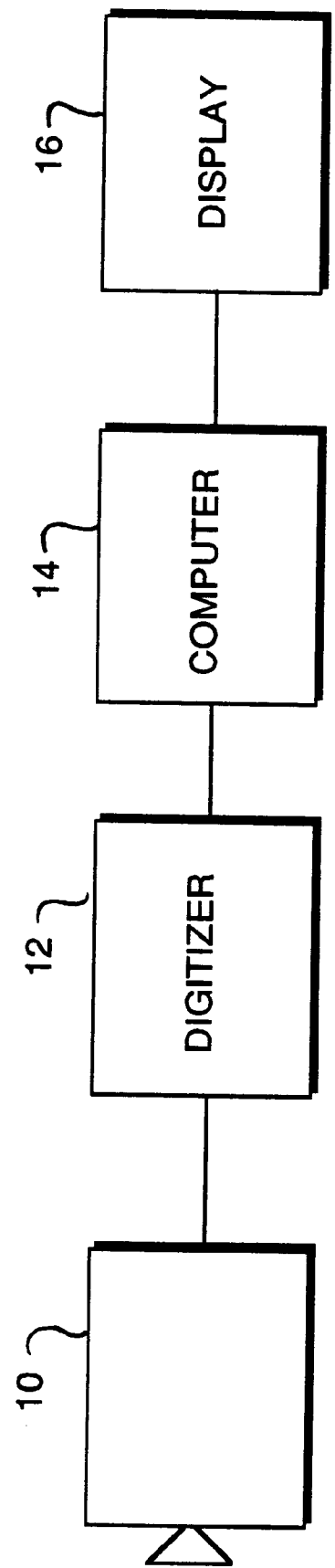
FIG. 1 illustrates a schematic block diagram of apparatus useable to perform the method of the present invention.

In implementing the method of the present invention, conventional physical image processing equipment is used. This equipment would include, as seen in FIG. 1, for example, a camera 10, an image digitizer 12, a computer 14, and a display 16 that are entirely conventional.

The following is a description of the formulation of the estimation problem. The images are of a three-dimensional scene and their spatial partial derivatives are take within some time interval T. The initial images of a three-dimensional scene are, in general, discontinuous functions and their spatial partial derivatives are not defined at the points of discontinuity. The points of discontinuity are, often, among the most important points in the images and cannot be easily ignored. To overcome these difficulties the initial images are treated as generalized functions and their partial derivatives as generalized partial derivatives. These generalized functions are defined on some subset of the set of infinitely differentiable functions. The functions from the subset are called "testing functions". Parametric families of secondary images are then introduced through evaluations of the generalized functions associated with the initial images on the specific parametric family of functions taken from the set of testing functions. The secondary images are infinitely differentiable, and their partial derivatives can be obtained through evaluations of the generalized functions associated with the initial images on the partial derivatives of this specific parametric family of functions. This process can be described as follows.

One way of constructing an initial image if by projecting the light reflected by the objects in the scene at a given moment of time t∈R (here R is a one-dimensional Euclidean space) onto a two-dimensional Euclidean space $R^2$, called the "image plane", and then identifying the irradiance value $\xi(x,y,t)$ of each point (x,y) in the image plane $R^2$. The function $\xi(x,y,t)$ defined as above will be called the "irradiance image function". The value $\xi(x,y,t)$ of the irradiance image function at the point $(x,y) \in R^2$ and the time t∈R is assumed to be roughly proportional to the radiance of the point in the scene being imaged, which projects to such a point (x,y) at the time t for every $(x,y) \in R^2$ and every t∈R. Different irradiance image functions $\xi(x,y,t)$, $(x,y,t) \in R^3$ (here $R^3$ is a three-dimensional Euclidean space) can be obtained by changing the following aspects of the image formation process: the direction of a light source illuminating the scene, the color of such a light source, and the spectral responsivity function that is used to compute the irradiance.

Assume that each irradiance image function $\xi(x,y,t)$ is locally integrable with respect to the Lebesgue measure dx dy dt in $R^3$ and thereby can be used to form a continuous linear functional $\Gamma_\xi$ (generalized function) defined on the locally convex linear topological space $\Phi(R^3)$. The space $\Phi(R^3)$ consists of all infinitely differentiable functions having compact supports in the set $R^3$. This means that for each function $\phi \in \Phi(R^3)$ there exists a closed bounded subset $S_\phi \subset R^3$ such that the function $\phi$ is equal to zero at the points that are outside the subset $S_\phi$. The topology of the space $\Phi(R^3)$ is defined by a certain family of semi-norms. The functions $\phi$ from the set $\Phi(R^3)$ will be called the "testing functions". The value of the generalized function $\Gamma_\xi$ associated with the irradiance image function $\xi$ at the testing function $\phi \in \Phi(R^3)$ is defined by the following relation:

$$\Gamma_\xi(\phi) = \int\int_{R^3}\int \xi(x, y, t)\phi(x, y, t)dx\,dy\,dt. \qquad (2-1)$$

The generalized function $\Gamma_\xi$ associated with different irradiance image functions $\xi(x,y,t)$ are united into the family $\{\Gamma_\xi | \xi \in \Xi\}$. Here, to simplify the notation, the symbol $\xi$ takes the role of the index (parameter) specifying the generalized function $\Gamma_\xi$ associated with a particular irradiance image function $\xi(x,y,t)$ in addition to its role as a part of the notation for such as irradiance image function. The symbol $\Xi$ denotes the set of indices.

Another way of constructing an initial image at a given moment of time t∈R is by identifying the set of points $M(t) \subset R^2$ in the image plane, called the "feature points", where significant variations in the projected light patterns represented by the irradiance image functions takes place at the time t, and then assigning feature value $\eta(x_\mu,y_\mu,t_\mu)$ to each feature point $(x_\mu,y_\mu,t_\mu) \in M(t)$. The set of feature points $M \equiv \cup/t\in R\ M(t)$ is assumed to be a closed subset of the space $R^3$. The function $\eta(x_\mu,y_\mu,t_\mu)$ defined on the set M as above will be called the "feature image function". Different feature image functions $\eta(x_\mu,y_\mu,t_\mu)$, $(x_\mu,y_\mu,t_\mu) \in M$ can be obtained by changing the criteria for selecting the set of feature points M and the criteria for assigning the feature values $\eta(x_\mu,y_\mu,t_\mu)$. The set M may, for example, be a finite combination of the following four types of the subsets of the space $R^3$: the three-dimensional regions, the two-dimensional regions, the one-dimensional contours, and the isolated points.

By the family B≡B(M) of "Borel subsets" of the set M shall be meant the members of the smallest σ-additive family of subsets of M which contains every compact set of M. Let $\mu(B)$ be a σ-finite, σ-additive, and real-valued measure defined on the family B of Borel subsets of the set M. The feature image function $\eta(x_\mu,y_\mu,t_\mu)$, $(x_\mu,y_\mu,t_\mu) \in M$ is assumed to be $\mu$-measurable measurable and thereby can be used to form a continuous linear functional $\Gamma_\eta$ (generalized function) defined on the locally convex linear topological space $\Phi(R^3)$. The value of the generalized function $\Gamma_\eta$ associated with the feature image function $\eta$ at the testing function $\phi \in \Phi(R^3)$ is given by the following relation $$\Gamma_\eta(\phi) = \int \int_M \int \eta(x_\mu, y_\mu, t_\mu) \phi(x_\mu, y_\mu, t_\mu) d\mu. \quad (2-2)$$

The generalized functions $\Gamma_\eta$ associated with different feature image functions $\eta(x_\mu, y_\mu, t_\mu)$ are united into the family $\{\Gamma_\eta | \eta \in H\}$. Here, to simplify the notation, the symbol $\eta$ takes the role of the index (parameter) specifying the generalized function $\Gamma_\eta$ associated with a particular feature image function $\eta(x_\mu, y_\mu, t_\mu)$ in addition to its role as a part of the notation for such a feature image function. The symbol H denotes the set of indices.

Given a generalized function F defined on the locally convex linear topological space $\Phi(R^3)$, and given non-negative integer constants $m_x$, $m_y$, $m_t$ the "generalized partial derivative"

$$\frac{\partial^{m_x + m_y + m_t}}{\partial x^{m_x} \partial y^{m_y} \partial t^{m_t}}$$

of the generalized function F is the generalized function $$\frac{\partial^{m_x + m_y + m_t}}{\partial x^{m_x} \partial y^{m_y} \partial t^{m_t}} F$$

defined on the locally convex linear topological space $\Phi(R^3)$ as follows. The value of the generalized function $$\frac{\partial^{m_x + m_y + m_t}}{\partial x^{m_x} \partial y^{m_y} \partial t^{m_t}} F$$

at a testing function $\phi \in \Phi(R^3)$ is the value of the generalized function F itself at the testing function $$\phi_{m_x, m_y, m_t} \in \Phi(R^3),$$

$$\phi_{m_x, m_y, m_t}(x, y, t) \equiv (-1)^{m_x + m_y + m_t} \frac{\partial^{m_x + m_y + m_t}}{\partial x^{m_x} \partial y^{m_y} \partial t^{m_t}} \phi(x, y, t), (x, y, t) \in R^3.$$

A "combined generalized initial image function" will be defined as a linear combination of the generalized partial derivatives of the generalized functions associated with the irradiance image functions and of the generalized partial derivatives of the generalized functions associated with the feature image functions. Let $\lambda \equiv \{\lambda_\xi, \lambda_\eta | \xi \in \Xi, \eta \in H\}$ be a set of real-valued constants; let $g(\lambda)$ be an index attached to the set $\lambda$; and let $m_{g(\lambda)} \equiv \{m_{\xi,x}, m_{\xi,y}, m_{\xi,t}, m_{\eta,x}, m_{\eta,y}, m_{\eta,t} | \xi \in \Xi, \eta \in H\}$ be a set of non-negative integer constants corresponding to the set of constants $\lambda$. Then the combined generalized initial image function corresponding to the set of constants $\lambda$ is the generalized function $\Gamma_{g(\lambda)}$ defined on the locally convex linear topological space $\Phi(R^3)$. The value of the combined generalized initial image function $\Gamma_{g(\lambda)}$ corresponding to the set of constant $\lambda$ at the testing function $\phi \in \Phi(R^3)$ is given by the relation $$\Gamma_{g(\lambda)}(\phi) = \sum_{\xi \in \Xi} \lambda_\xi \frac{\partial^{m_{\xi,x} + m_{\xi,y} + m_{\xi,t}}}{\partial x^{m_{\xi,x}} \partial y^{m_{\xi,y}} \partial t^{m_{\xi,t}}} \Gamma_\xi(\phi) + \quad (2-3)$$

$$\sum_{\eta \in H} \lambda_\eta \frac{\partial^{m_{\eta,x} + m_{\eta,y} + m_{\eta,t}}}{\partial x^{m_{\eta,x}} \partial y^{m_{\eta,y}} \partial t^{m_{\eta,t}}} \Gamma_\eta(\phi)$$

and is called the "observation" of the combined generalized initial image function $\Gamma_{g(\lambda)}$ corresponding to the set of constants $\lambda$ on the testing function $\phi$. The combined generalized initial image functions $\Gamma_{g(\lambda)}$ corresponding to sets of constant $\lambda$ with different values are united into the family $\{\Gamma_{g(\lambda)} | \lambda \in \Lambda\}$. Here the symbol $\Lambda$ denotes the family of all different sets of constant $\lambda$, while the symbol g denotes the one-to-one mapping from the family $\Lambda$ onto the set of indices denoted by the symbol G. In what follows, to simplify the notation, the argument $\lambda$ appearing in the notation for a combined generalized initial image function is omitted and the symbol $\Gamma_g$, $g \in G$ is used instead of the symbol $\Gamma_{G(\lambda)}$, $\lambda \in \Lambda$ to denote it.

Assume that there is a given fixed testing function $\Psi \in \Phi(R^3)$, which will be called the "measurement function". (An example of the measurement function $\Psi$ is given later.) Let $g \in G$; then for every point (x,y) of some convex bounded subset $\Omega \subset R^2$ (such points will be called "image points"), for every moment of time $t \in T$, and for every value of the parameter $\sigma \in [1, )$, the value of the component $g^\sigma(x,y,t)$ of the image corresponding to the parameter value $\sigma$ at the image point (x,y) and time moment t is determined as the observation $\Gamma_g(\Psi_{x,y,t}^\sigma)$ of the combined generalized initial image function $\Gamma_g$ on the testing function $\Psi_{x,y,t}^\sigma \in \Phi(R^3)$, $$\psi_{x,y,t}^\sigma(\tilde{x}, \tilde{y}, \tilde{t}) \equiv \frac{1}{\sigma^3} \psi((\tilde{x}-x)/\sigma, (\tilde{y}-y)/\sigma, (\tilde{t}-t)/\sigma), \quad (2-4)$$

$$(\tilde{x}, \tilde{y}, \tilde{t}) \in R^3.$$

Note that, to simplify the notation, the symbol g is used as the part of the notation $g^\sigma$ for the component of the image corresponding to the parameter value $\sigma$ in addition to its role as the index for such a component.

The parametric vector valued function $g^\sigma(x,y,t) \equiv \{g^\sigma(x,y,t) | g \in G\}$, $(x,y,t) \in \Psi x T$, $\sigma \in [1, )$ with each component $g^\sigma(x,y,t)$, $g \in G$ defined on the set $\Psi x T$ as the observation $\Gamma_g(\Psi_{x,y,t}^\sigma)$ of the combined generalized initial image function $\Gamma_g$ on the testing function $\Psi_{x,y,t}^\sigma \in \Phi(R^3)$ specified by the relation (2-4) for every parameter value $\sigma$ from the set $[1, )$ (here the symbol $\Omega x T$ denotes the Cartesian product of the set $\Omega$ on the set T) will be called the "parametric time-varying image function". The points (x,y,t) from the set $\Omega x T$ will be called "time-varying image points". By the "image" corresponding to the parameter value $\sigma \in [1, )$ and taken at the time moment $t \in T$ is meant the collection, $\{g^\sigma(x,y,t) | (x,y) \in \Omega\}$, of the values of the parametric time-varying image function $g^\sigma(x,y,t)$, $(x,y,t) \in \Omega x T$. The collection $\{g^\sigma(x,y,t) | (x,y) \in \Omega, \sigma \in [1, )\}$ of the images $\{g^\sigma(x,y,t) | (x,y) \in \Omega\}$ corresponding to every parameter value $\sigma \in [1, )$ and taken at a fixed time moment $t \in T$ will be called the "parametric image" taken at the time moment t.

Each component $g^\sigma(x,y,t)$, $g \in G$ of the parametric time-varying image function $g^\sigma(x,y,t)$ is infinitely differentiable everywhere in the domain $\Omega x T$, and its partial derivatives with respect to the variables x, y, t can be obtained as observations of the combined generalized initial image function $\Gamma_g$ on the partial derivatives with respect to the parameters x, y, t of the testing function $\Psi_{x,y,t}^\sigma \in \Phi(R^3)$ specified by the relation (2–4). For example, the components $g_x^\sigma(x,y,t)$, $g_y^\sigma(x,y,t)$, $g \in G$ of the first-order partial derivatives $g_x^\sigma(x,y,t) = \{g_x^\sigma(x,y,t) | g \in G\}$, $g_y^\sigma(x,y,t) = \{g_y^\sigma(x,y,t) | g \in G\}$ of the parametric time-varying image function $g^\sigma(x,y,t)$ are given as the observations $$\Gamma_g\left(\frac{\partial}{\partial x}\psi_{x,y,t}^\sigma\right), \Gamma_g\left(\frac{\partial}{\partial y}\psi_{x,y,t}^\sigma\right)$$

of the combined generalized initial image function $\Gamma_g$ on the testing functions $$\frac{\partial}{\partial x}\psi_{x,y,t}^\sigma, \frac{\partial}{\partial y}\psi_{x,y,t}^\sigma \in \Phi(R^3),$$

for every $(x,y,t) \in \Omega \times T$, $\sigma \in [1, )$, where $$\frac{\partial}{\partial x}\psi_{x,y,t}^\sigma(\tilde{x}, \tilde{y}, \tilde{t}) \equiv -\frac{1}{\sigma^4}\psi_x((\tilde{x}-x)/\sigma, (\tilde{y}-y)/\sigma, (\tilde{t}-t)/\sigma), \quad (2-5)$$
$$(\tilde{x}, \tilde{y}, \tilde{t}) \in R^3,$$

$$\frac{\partial}{\partial y}\psi_{x,y,t}^\sigma(\tilde{x}, \tilde{y}, \tilde{t}) \equiv -\frac{1}{\sigma^4}\psi_y((\tilde{x}-x)/\sigma, (\tilde{y}-y)/\sigma, (\tilde{t}-t)/\sigma), \quad (2-6)$$
$$(\tilde{x}, \tilde{y}, \tilde{t}) \in R^3,$$

and $\Psi_x(x,y,t)$, $\Psi_y(x,y,t)$ are the partial derivatives of the function $\Psi(x,y,t)$ with respect to the variables x, y.

Let $t-\Delta t^-$, $t$, $t+\Delta t^+ \in R$ be three consecutive instants of time (here $\Delta t^-$ and $\Delta t^+$ are positive time increments), and let $(x(t-\Delta t^-), y(t-\Delta t^-)) \in R^2$ be a projection of some point in the scene taken at the time $t-\Delta t^-$, while $(x(t+\Delta t^+), y(t+\Delta t^+)) \in R^2$ is a projection of the same point taken at the time $t+\Delta t^+$. The vector $(\mu_A(x,y,t,\Delta t^-,\Delta t^+), v_A(x,y,t,\Delta t^-,\Delta t^+))$ defined by the relations:

$$\mu_A(x,y,t,\Delta t^-,\Delta t^+) = (x(t+\Delta t^+)-x(t-t^-))/(\Delta t^- + \Delta t^+), \quad (2-7)$$

$$v_A(x,y,t,\Delta t^-,\Delta t^+) = (y(t+\Delta t^+)-y(t-\Delta t^-))/(\Delta t^- + \Delta t^+), \quad (2-8)$$

where $$x = (\Delta t^- x(t+\Delta t^+) + \Delta t^+ x(t-\Delta t^-))/(\Delta t^- + \Delta t^+), \quad (2-9)$$

$$y = (\Delta t^- y(t+\Delta t^+) + \Delta t^+ y(t-\Delta t^-))/(\Delta t^- + \Delta t^+), \quad (2-10)$$

will be called the "average velocity vector" of the scene projection at the point $(x,y) \in R^2$ and the time $t \in R$ based on the scene projections at the time $t+\Delta t^+$ and time $t-\Delta t^-$. The vector $(\mu_A(x,y,t,\Delta t^-,\Delta t^+), v_A(x,y,t,\Delta t^-,\Delta t^+))$ can be defined only at those points (x,y) from the set $R^2$ that are projections of the points in the scene visible at the time $t-\Delta t^-$ as well as the time $t+\Delta t^+$. The collection of such image points will be denoted by the symbol $\Psi(t,\Delta t^-,\Delta t^+)$.

The "instantaneous velocity vector" $(\mu_I(x,y,t), v_I(x,y,t))$ of the scene projection at the point $(x,y) \in R^2$ and time $t \in R$ will now be defined. Let $\Delta t^-$, $\Delta t^+$ be positive time increments, and let $W(x,y,t,\Delta t^-,\Delta t^+)$ be the set which is equal to a single-element set containing the average velocity vector $(\mu_A(x,y,t,\Delta t^-,\Delta t^+), v_A(x,y,t,\Delta t^-,\Delta t^+))$ if $(x,y) \in \Omega(t,\Delta t^-,\Delta t^+)$, and is equal to an empty set $\emptyset$ otherwise. Then for every positive time increment $\Delta t < \delta t$ (here $\delta t$ is a positive real constant), the set $W(x,y,t\Delta t)$ will be defined from the relation $$W(x, y, t, \Delta t) = \bigcup_{\substack{0 < \Delta t^- < \Delta t \\ 0 < \Delta t^+ < \Delta t}} W(x, y, t, \Delta t^-, \Delta t^+), \quad (2-11)$$

while the set $W(x,y,t)$ will be defined as $$W(x, y, t) = \bigcap_{0 < \Delta t < \delta t} \overline{W(x, y, t, \Delta t)}, \quad (2-12)$$

where the symbol $\overline{W(x,y,t,\Delta t)}$ means the topological closure of the set $W(x,y,t,\Delta t)$. It will be assumed that $W(x,y,t)$ are single-element sets for almost every $(x,y,t) \in R^3$. This assumption means that the subset of the set $R^3$ containing the points (x,y,t), where the sets $W(x,y,t)$ are not single-element sets, has a Lebesgue measure equal to zero. For every point $(x,y,t) \in R^3$ such that the set $W(x,y,t)$ consists of a single element, that element is selected as the value of the instantaneous velocity vector $(\mu_I(x,y,t), v_I(x,y,t))$; otherwise a zero is chosen for the value of the instantaneous velocity vector $(\mu_I(x,y,t), v_I(x,y,t))$.

Assume that the functions $\mu_I(x,y,t), v_I(x,y,t)$, $(x,y,t) \in R^3$ are locally integrable with respect to the Lebesgue measure dx dy dt in $R^3$ and thereby can be used to form continuous linear functional $U_I$, $V_I$ (generalized functions) defined on the locally convex linear topological space $\Phi(R^3)$. The values of the generalized functions $U_I$, $V_I$ at the testing function $\phi \in \Phi(R^3)$ are given by the relations $$U_I(\phi) = \int\int_{R^3}\int u_I(x, y, t)\phi(x, y, t)dx\,dy\,dt, \quad (2-13)$$

$$V_I(\phi) = \int\int_{R^3}\int v_I(x, y, t)\phi(x, y, t)dx\,dy\,dt. \quad (2-14)$$

Let (x,y) be an image point from $\Omega$, t a moment of time from T, and $\sigma$ a parameter value from $[1, )$; then the "velocity vector" $(\mu^\sigma(x,y,t), v^\sigma(x,y,t))$ of the image corresponding to the parameter value $\sigma$ at the point (x,y) and time t is defined from the relations $$u^\sigma(x, y, t) = \frac{1}{\sigma^3} \quad (2-15)$$

$$\int\int_{R^3}\int u_I(\tilde{x}, \tilde{y}, \tilde{t})\psi((\tilde{x}-x)\sigma, (\tilde{y}-y)\sigma, (\tilde{t}-t)/\sigma)d\tilde{x}\,d\tilde{y}\,d\tilde{t},$$

$$v^\sigma(x, y, t) = \frac{1}{\sigma^3} \quad (2-16)$$

$$\int\int_{R^3}\int v_I(\tilde{x}, \tilde{y}, \tilde{t})\psi((\tilde{x}-x)\sigma, (\tilde{y}-y)\sigma, (\tilde{t}-t)/\sigma)d\tilde{x}\,d\tilde{y}\,d\tilde{t},$$

where $\Psi$ is the measurement function from the set $\Phi(R^3)$. The collection of the velocity vectors $\{(\mu^\sigma(x,y,t), v^\sigma(x,y,t)) | (x,y) \in \Omega\}$ corresponding to the moment of time $t \in T$ and to the parameter value $\sigma \in [1, )$ will be called the "velocity vector field" of the image $\{g^\sigma(x,y,t) | (x,y) \in \Omega\}$ corresponding to the parameter value $\sigma$ and taken at the time moment t. The collection $\{(\mu^\sigma(x,y,t), v^\sigma(x,y,t)) | (x,y) \in \Omega, \sigma \in [1, )\}$ of the velocity vector fields $\{(\mu^\sigma(x,y,t), \mu^\sigma(x,y,t)) | (x,y) \in \Omega\}$ of the images $\{g^\sigma(x,y,t) | (x,y) \in \Omega\}$ corresponding to every parameter value $\sigma \in [1, )$ and taken at a fixed time moment $t \in T$ will be called the "parametric velocity vector field" of the parametric image $\{g^\sigma(x,y,t) | (x,y) \in \Omega, \sigma \in [1, )\}$ taken at the time moment t.

Let $t_0" < t_1" < \ldots < t_{K"}$ be a finite increasing sequence of time moments from some time interval T, and let t be a time moment from the same time interval T. Then the estimation problem can be formulated as follows. Given a sequence of parametric images $\{g^\sigma(x,y,t_K")|(x,y)\in\Omega, \sigma\in[1, )\}K"/k=0$ taken at the time moments $t_k"$, $k=0, 1, \ldots, K"$, which will be called the "parametric time-varying image sequence", and given the time moment t, find the parametric velocity vector field $\{(\mu^\sigma(x,y,t),v^\sigma(x,y,t))|(x,y)\in\Omega, \sigma\in[1, )\}$ which is an estimate of the parametric velocity vector field $\{(\mu^\sigma(x,y,t),v^\sigma(x,y,t))|(x,y)\in\Omega, \sigma\in[1, )\}$ of the parametric image $\{g^\sigma(x,y,t)|(x,y)\in\Omega, \sigma\in[1, )\}$ taken at the time moment t.

Although changes in the scene giving rise to the parametric velocity vector field $\{(\mu^\sigma(x,y,t),v^\sigma(x,y,t))|(x,y)\in\Omega, \sigma\in[1, )\}$ are reflected in the parametric time-varying image sequence $\{g^\sigma(x,y,t_K")|(x,y)\in\Omega, \sigma\in[1, )\}K"/k=0$ the relation between them is not necessarily unique. The same parametric time-varying image sequence can be associated with different parametric velocity vector fields and, vice versa, the same parametric velocity vector field can result from different parametric time-varying image sequences.

The method of the present invention, then, includes determining an estimate of the parametric velocity vector field corresponding to a given parametric time-varying image sequence. In order for this determination to be possible, specific assumptions have to be made about the scene being imaged and about the imaging process itself. The assumptions we make are described in the following. Based on these assumptions constraints are imposed on the estimate of the parametric velocity vector field. The determination of the estimate is then reduced to solving the system of equations arising from such constraints for a given parametric time-varying image sequence.

Let $\{g^\sigma(x,y,t_K")|(x,y)\in\Omega, \sigma\in[1, )\}K"/k=0$ be given parametric time-varying image sequence taken at the time moments $t_k"$, $k=0, 1, \ldots, K"$, which form an increasing sequence within the time interval T, and let t be a given time moment within the time interval T. We consider the problem of finding an estimate $\{(\mu^\sigma(x,y,t),v^\sigma(x,y,t))|(x,y)\in\Omega, \sigma\in[1, )\}$ of the parametric velocity vector field $\{(\mu^\sigma(x,y,t),v^\sigma(x,y,t))|(x,y)\in\Omega, \sigma\in[1, )\}$ as a function of the parametric time-varying image sequence $\{g^\sigma(x,y,t_K")|(x,y)\in\Omega, \sigma\in[1, )\}K"/k=0$.

In what follows, the estimate $\{(\mu^\sigma(x,y,t),v^\sigma(x,y,t))|(x,y)\in\Omega, \sigma\in[1, )\}$ of the parametric velocity vector field $\{(\mu^\sigma(x,y,t),v^\sigma(x,y,t))|(x,y)\in\Omega, \sigma\in[1, )\}$ is determined as the parametric vector field satisfying a set of constraints. These constraints are based on the following assumptions:

1. The scene to be imaged is assumed to have near-constant and near-uniform illumination, which means that the changes in the incident illumination of each surface patch in the scene are small across the space and across the time, and are mainly due to the orientation of such surface patch relative to the light source.

2. It is assumed that changes in the incident illumination of each surface patch in the scene across the time due to the changes in the orientation of that surface patch are sufficiently small to be neglected.

3. The radiance of each surface point in the scene is assumed to be nearly Lambertian, which means that locally its dependence on the viewing position is small and can be neglected.

4. As has been mentioned in the previous section, the irradiance $\xi(x,y,t)$, $\xi\in\Xi$ of each point (x,y) in the image plane $R^2$ at a time $t\in R$ is assumed to be roughly proportional to the radiance of the point in the scene projecting into the point (x,y) in the image plane at the time t, and the proportionality coefficient, to be independent of the location (x,y) and the time t.

5. The scene is assumed to be made out of opague objects. The criteria for selecting feature points $(x_\mu,y_\mu,t_\mu)\in M$ and the criteria for assigning feature values $\eta(x_\mu,y_\mu,t_\mu)$, $\eta\in H$ to each feature point $(x_\mu,y_\mu,t_\mu)\in M$ are assumed to represent the true properties of the objects and to be independent of the objects' spatial attitudes.

6. The velocities of neighboring points of the objects in the scene are assumed to be similar, on one hand, and to change slowly with respect to time, on the other hand. In other words, it is assumed that the parametric time-varying velocity vector field of the surface points of each object in the scene varies smoothly across the space and across the time.

Let $\text{II}_t$ be a subset of the space $R^2$ defined by the relation $$\text{II}_t = \{(\Delta t^-,\Delta t^+)|(\Delta t^-,\Delta t^+)\in R^2, \Delta t^- + \Delta t^+ > 0, (t-\Delta t^-), (t+\Delta t^+)\in\{t_k"\}K"/k=0\}, \quad (3\text{-}1)$$

let $P_t$ be a subset of the set $\text{II}_t$, and let $G_t \equiv G \times P_t$ be the Cartesian product of the set G on the set $P_t$. The elements from the set $G_t$ are denoted by the symbol $g_t$, and the set $G_t$ is assumed to be a measurable space with some measure $dg_t$ defined on the family $B(G_t)$ of Borel subsets of the set $G_t$. In practice, the set $G_t$ is finite, and the measure $dg_t$ is a point measure on the finite set $G_t$, but a more general approach is used for the sake of uniformity of presentation.

Let $g_t \equiv (g,\Delta t^-,\Delta t^+)\in G_t$, $\sigma\in[1, )$, and let $g_t^\sigma(x,y,t,\mu^\sigma,v^\sigma)$ be a function defined by the relation $$g_t^\sigma(x,y,t,\mu^\sigma,v^\sigma) \equiv (g^\sigma(x+\Delta t^+\mu^\sigma(x,y,t),y+\Delta t^+v^\sigma(x,y,t),t+\Delta t^+) - g^\sigma(x-\Delta t^-\mu^\sigma(x,y,t),y-\Delta t^-v^\sigma(x,y,t),t-\Delta t^-))/(\Delta t^- + \Delta t^+), \quad (3\text{-}2)$$

for every $(x,y)\in\Omega$, where $(\mu^\sigma,v^\sigma) \equiv (\mu^\sigma(x,y,t),v^\sigma(x,y,t))$ is the velocity vector of the image corresponding to the parameter value $\sigma$ at the image point (x,y) and the time moment t. Here, to simplify the notation, the symbol $g_t$ is used as the part of the notation $g_t^\sigma$ for the above defined function (3-2) in addition to its role as the index for such a function.

Let $(x,y)\in\Omega$ be an image point that is taken at the time t projection of some point in the scene that does not belong to the occluding boundaries. The occluding boundary of an object is defined as the points in the scene belonging to the portion of the object that projects to its silhouette. The assumptions 1–5 made at the beginning of this section imply that the absolute value of the function $g_t^\sigma(x,y,t,\mu^\sigma,v^\sigma)$ is small. Therefore it is natural to use the function $$(g_t^\sigma(x,y,t,\mu^\sigma,v^\sigma))^2 \quad (3\text{-}3)$$

as a part of the functional whose minimum specifies the estimate $(\mu^\sigma,v^\sigma) \equiv (\mu^\sigma(x,y,t),v^\sigma(x,y,t))$ of the velocity vector $(\mu^\sigma(x,y,t),v^\sigma(x,y,t))$ of the image corresponding to the parameter value $\sigma$. It is customary for the function (3-3) to be called the "optical flow constraint" corresponding to the parameter value $\sigma$ and the index $g_t$ [2, 12–14, 18–21].

Note that if the time increments $\Delta t^-$, $\Delta t^+$ approach zero, then for an integer n greater than or equal to 2 the nth-order partial derivative of the function $g_t^\sigma(x,y,t,\mu^\sigma,v^\sigma)$ with respect to the components $\mu^o \equiv \mu^o(x,y,t)$, $v^o \equiv v^o(x,y,t)$ of the estimate of the velocity vector approaches zero at a rate proportional to $(\Delta t^-)^{n-1}+(\Delta t^+)^{n-1}$. This, in particular, implies that when the time increments $\Delta t^-$, $\Delta t^+$ approach zero the function $g_t^\sigma(x,y,t,\mu^o,v^o)$ approaches the function which is linear with respect to the components $\mu^o$, $v^o$ of the estimate of the velocity vector.

It can be easily verified that the estimate $(\mu^o(x,y,t), \mu^o(x,y,t))$ of the velocity vector on which the function (3-3) achieves its minimum satisfies the system of equations $$\begin{cases} g_{t\tilde{u}}^\sigma(x, y, t, \tilde{u}^\sigma, \tilde{v}^\sigma)g_t^\sigma(x, y, t, \tilde{u}^\sigma, \tilde{v}^\sigma) = 0, \\ g_{t\tilde{v}}^\sigma(x, y, t, \tilde{u}^\sigma, \tilde{v}^\sigma)g_t^\sigma(x, y, t, \tilde{u}^\sigma, \tilde{v}^\sigma) = 0, \end{cases} \quad (3-4)$$

where the function $g_{\tilde{u}}^o(x,y,t,\mu^o,v^o)$ and $g_{\tilde{v}}^o(x,y,t,\mu^o,v^o)$ are the first-order partial derivatives of the function $g_t^o(x,y,t,\mu^o, v^o)$ with respect to the components $\mu^o$ and $v^o$ of the estimate of the velocity vector.

Let the vector $(\Delta\mu^o(x,y,t),\Delta v^o(x,y,t))$ be defined as in the relations $$\mu^o(x,y,t)=\mu^o(x,y,t)+\Delta\mu^o(x,y,t), \quad (3-5)$$

$$v^o(x,y,t)=v^o(x,y,t)+\Delta v^o(x,y,t). \quad (3-6)$$

By expanding the left hand sides of the relation (3-4) into their Taylor series about the velocity vector $(\mu^o(x,y,t),v^o(x,y,t))$ and by setting the second-order and higher partial derivatives of the function $g_t^o(x,y,t,\mu^o,v^o)$ with respect to the components $\mu^o \equiv \mu^o(x,y,t)$ and $v^o \equiv v^o(x,y,t)$ of the velocity vector to zero, we obtain the system of linear equations, relative to the vector $(\Delta\mu^o(x,y,t),\Delta v^o(x,y,t))$, $$\begin{cases} (g_{tu}^\sigma(x, y, t, u^\sigma, v^\sigma))^2 \Delta u^\sigma(x, y, t) + g_{tu}^\sigma(x, y, t, u^\sigma, v^\sigma)g_{tv}^\sigma(x, y, t, u^\sigma, v^\sigma)\Delta v^\sigma(x, y, t) + \\ \qquad g_{tu}^\sigma(x, y, t, u^\sigma, v^\sigma)g_t^\sigma(x, y, t, u^\sigma, v^\sigma) = 0, \\ g_{tu}^\sigma(x, y, t, u^\sigma, v^\sigma)g_{tv}^\sigma(x, y, t, u^\sigma, v^\sigma)\Delta u^\sigma(x, y, t) + (g_{tv}^\sigma(x, y, t, u^\sigma, v^\sigma))^2 \Delta v^\sigma(x, y, t) + \\ \qquad g_{tv}^\sigma(x, y, t, u^\sigma, v^\sigma)g_t^\sigma(x, y, t, u^\sigma, v^\sigma) = 0. \end{cases} \quad (3-7)$$

where the functions $g_{tu}^o(x,y,t,\mu^o,v^o)$ and $g_{tv}^o(x,y,t,\mu^o,v^o)$ are the first-order partial derivatives of the function $g_t^o(x,y,t,\mu^o,v^o)$ with respect to the components $\mu^o$ and $v^o$ of the velocity vector.

Let us first assume that the norm of the gradient $$(g_{tu}^\sigma(x,y,t,\mu^o,v^o),g_{tv}^\sigma(x,y,t,\mu^o,v^o)) \quad (3-8)$$

of the function $g_t^o(x,y,t,\mu^o,v^o)$, with respect to the components $\mu^o$ and $v^o$ of the velocity vector, is relatively large; then the system of equations (3-7) is equivalent to the relation $$g_{tu}^\sigma(x,y,t,\mu^o,v^o)\Delta\mu^o(x,y,t)+g_{tv}^\sigma(x,y,t,\mu^o,v^o)\Delta v^o(x,y,t)+g_t^\sigma(x,y,t,\mu^o,v^o)=0. \quad (3-9)$$

The last relation implies that the requirement for the function (3-3) to achieve a minimum on the estimate $(\mu^o(x,y,t), v^o(x,y,t))$ of the velocity vector $(\mu^o(x,y,t),v^o(x,y,t))$ specifies the component of the estimate in the direction of the gradient (3-8) and leaves the component orthogonal to the gradient (3-8) undetermined.

If the norm of the gradient (3-8) is relatively small; then the system of equations (3-7) becomes too weak, and the requirement for the function (3-3) to achieve a minimum on the estimate $(\mu^o(x,y,t),v^o(x,y,t))$ of the velocity vector $(\mu^o(x,y,t),v^o(x,y,t))$ imposes no constraint on the estimate.

The above discussion suggests that we need to impose additional constraints on the estimate $\{(\mu^o(x,y,t), v^o(x,y,t))|(x,y)\in\Omega, \sigma\in[1, )\}$ of the parametric velocity vector field $\{(\mu^o(x,y,t),v^o(x,y,t))|(x,y)\in\Omega, \sigma\in[1, )\}$ in order for the computation to be well defined.

Let $S \equiv \{(s_x,s_y)|(s_x,s_y)\in R^2, x_x^2+s_y^2=1\}$ be a unit circle in the two-dimensional Euclidean space $R^2$, with each vector $s \equiv (s_x,s_y)\in S$ specifying the direction in the image plane. The set S is assumed to be a measurable space with some uniform measure ds defined on the family B(S) of Borel subsets of the set S.

Let $s \equiv (s_x,s_y)\in S$, and let $(s,\nabla u^o(x,y,t))$, $(s,\nabla v^o(x,y,t))$ be the functions defined by the relations $$(s, \nabla u^\sigma(x, y, t)) = \left(\frac{\partial}{\partial \omega} u^\sigma(x+\omega s_x, y+\omega s_y, t)\right)_{\omega=0}, \quad (3-10)$$

$$(s, \nabla v^\sigma(x, y, t)) = \left(\frac{\partial}{\partial \omega} v^\sigma(x+\omega s_x, y+\omega s_y, t)\right)_{\omega=0}. \quad (3-11)$$

for every $(x,y)\in\Omega$. Here the symbol $\nabla$ stands for the gradient of a function with respect to the variables x,y.

Let $s \equiv (s_x,s_y)\in S$, and let $(x,y)\in\Omega$ be an image point that is taken at a time t projection of some point in the scene that does not cross the occluding boundary in the direction s, meaning that for all sufficiently small positive constants $\omega$, the following two points in the scene both belong to the same object and are sufficiently close to each other: the first is the one projecting to the image point $(s+\omega s_x,y+\omega s_y)$ at the time t, whereas the second is the one projecting to the image point (x,y) at the time t. The assumption 6 made at the beginning of this section implies that the absolute values of the functions $(s,\nabla u^o(x,y,t))$ and $(s,\nabla v^o(x,y,t))$ are small. Therefore it is natural to use the functions $$(s,\nabla\tilde{u}^o(x,y,t))^2, \quad (3-12)$$

$$(s,\nabla\tilde{v}^o(x,y,t))^2 \quad (3-13)$$

as a part of the functional whose minimum specifies the estimate $(\tilde{u}^o(x,y,t),\tilde{v}^o(x,y,t))$ of the velocity vector $(u^o(x,y,t),v^o(x,y,t))$ of the image corresponding to the parameter value $\sigma$. It is customary for the functions (3-12), (3-13) to be called the "smoothness constraints" in the direction s [2, 12-14, 18-21].

Finally, to make the process of computing the estimate $\{(\tilde{u}^o(x,y,t),\tilde{v}^o(x,y,t))|(x,y)\in\Omega,\sigma\in[1,\infty)\}$ of the parametric velocity vector field $\{(u^o(x,y,t),v^o(x,y,t))|(x,y)\in\Omega,\sigma\in[1,\infty)\}$ well defined, we require that for every image point $(x,y)\in\Omega$ and for every parameter value $\sigma\in[1,\infty)$ where the optical flow constraints and the directional smoothness constraints impose no restrictions the difference between the unknown estimate $(\tilde{u}^o(x,y,t),\tilde{v}^o(x,y,t))$ of the velocity vector $(u^o(x,y,$ t),v°(x,y,t)) and its initial estimate $(\tilde{u}_0^\circ(x,y,t),\tilde{v}_0^\circ(x,y,t))$ be small. This can be accomplished by including the functions $$(\tilde{u}^\circ(x,y,t)-\tilde{u}_0^\circ(x,y,t))^2, \qquad (3\text{-}14)$$

$$(\tilde{v}^\circ(x,y,t)-\tilde{v}_0^\circ(x,y,t))^2 \qquad (3\text{-}15)$$

in the functional whose minimum specifies the estimate $(\tilde{u}^\circ(x,y,t),\tilde{v}^\circ(x,y,t))$ of the velocity vector $(u^\circ(x,y,t),v^\circ(x,y,t))$ of the image corresponding to the parameter value σ in addition to the functions (3—3), (3-12), and (3-13) specifying the optical flow and the directional smoothness constraints, provided that the weights associated with the functions (3-14) and (3-15) are small relative to the weights associated with the functions (3—3), (3-12), and (3-13). The initial estimate $(\tilde{u}_0^\circ(x,y,t),\tilde{v}_0^\circ(x,y,t))$ appearing in the relations (3-14), (3-15) is defined towards the end of the next section. The constraints imposed on the estimate $(\tilde{u}^\circ(x,y,t), \tilde{v}^\circ(x,y,t))$ of the velocity vector $(u^\circ(x,y,t),v^\circ(x,y,t))$ at the image point $(x,y)\in\Omega$ and the time moment t by the above requirements will be called the "regularization constraints".

As has been stated earlier, the optical flow and the directional smoothness constraints are not necessarily valid at the points near the occluding boundaries, even when the assumptions described at the beginning of this section are observed. The method of computing the estimate of the parametric velocity vector field of the present invention resolves the above difficulties by adjusting the weight associated with each constraint in such a way that it becomes small whenever the constraint is not valid. In the following, it is described how the functions (3—3), (3-12), (3-13), (3-14), and (3-15), specifying the optical flow, directional smoothness, and regularization constraints, are combined into the functional of the estimate of the parametric velocity vector field. The estimate is then computed by solving the system of nonlinear equations arising from a certain optimality criterion related to such functional.

The following describes the system of nonlinear equations used in the method of the present invention in its estimation of velocity vector fields. In the method of the invention, the estimate $\{(\tilde{u}^\circ(x,y,t),\tilde{v}^\circ(x,y,t))|(x,y)\in\Omega,\sigma\in[1,\infty)\}$ of the parametric velocity vector field $\{(u^\circ(x,y,t),v^\circ(x,y,t))|(x,y)\in\Omega,\sigma\in[1,\infty)\}$ is determined as the parametric vector field on which a weighted average of the optical flow, directional smoothness, and regularization constraints is minimized. The weight functions are chosen in such a way that at every image point $(x,y)\in\Omega$ which is near the occluding boundary the following requirements are met: each weight function associated with an optical flow constraint becomes small whenever the optical flow constraint is not satisfied, and each weight function associated with a smoothness constraint corresponding to a direction in which an occluding boundary is crossed becomes small whenever the directional smoothness constraint is not satisfied. The criteria for the presence of the occluding boundary near a given image point, and the criteria for the occluding boundary being crossed near a given image point in a given direction, can be defined most effectively in terms of the values of the unknown estimate of the parametric velocity vector field. Therefore, the values of the unknown estimate of the parametric velocity vector field have to be used implicitly in each of the weight functions. On the other hand, each weight function has to be treated as if it were independent of the values of the unknown estimate of the parametric velocity vector field, because it only specifies a relative significance of the corresponding constraint as a part of the weighted average and not the constraint itself. To overcome these difficulties, two copies of the unknown estimate of the parametric velocity vector field are introduced: the invariable one, and the variable one. In the weight functions the values of the invariable copy of the unknown estimate of the parametric velocity vector field are used, whereas in the constraint functions the values of the variable copy of the unknown estimate of the parametric velocity vector field are used. Then a more general variational principle as opposed to an energy minimization principle is applied to the weighted average of the optical flow, directional smoothness, and regularization constraints to derive the system of nonlinear equations of the unknown estimate of the parametric velocity vector field. This variational principle can be described as follows.

Let $(\tilde{u},\tilde{v})\equiv\{(\tilde{u}^\circ(x,y,t),\tilde{v}^\circ(x,y,t))|(x,y)\in\Omega,\sigma\in[1,\infty)\}$ be an invariable copy of the estimate of the parametric velocity vector field, let $(\hat{u},\hat{v})\equiv\{(\hat{u}^\circ(x,y,t),\hat{v}^\circ(x,y,t))|(x,y)\in\Omega, \sigma\in[1,\infty)\}$ be a variable copy of the estimate of the parametric velocity vector field, and let the parametric vector field $(\Delta\tilde{u},\Delta\tilde{v})\equiv\{(\Delta\tilde{u}^\circ(x,y,t),\Delta\tilde{v}^\circ(x,y,t))|(x,y)\in\Omega,\sigma\in[1,\infty)\}$ be defined by the relation $$(\Delta\tilde{u}^\circ(x,y,t),\Delta\tilde{v}^\circ(x,y,t))=(\hat{u}^\circ(x,y,t),\hat{v}^\circ(x,y,t))-(\tilde{u}^\circ(x,y,t),\tilde{v}^\circ(x,y,t)),$$
$$(x,y)\in\Omega,\ \sigma\in[1,\infty) \qquad (4\text{-}1)$$

Assume that the derivative of the parametric vector field $(\Delta\tilde{u},\Delta\tilde{v})$ in the direction normal to the boundary $\partial\Omega$ of the image $\Omega$ is equal to zero for every parameter value $\sigma\in[1,\infty)$ and for every image point $(x,y)$ belonging to the image boundary $\partial\Omega$. This will impose restrictions on the types of the variations that can be applied to the variable copy of the unknown estimate of the parametric velocity vector field.

Let $f(\tilde{u},\tilde{v},\hat{u},\hat{v})$ be a functional of the parametric vector fields $(\tilde{u},\tilde{v})$, $(\hat{u},\hat{v})$ defined as a weighted average of functions (3—3), (3-12), (3-13), (3-14), and (3-15), specifying the optical flow, directional smoothness, and regularization constraints, respectively, by the following relation:

$$f(\tilde{u},\tilde{v},\hat{u},\hat{v}) = \int_1^\infty \int_\Omega \int \left[ \int_{G_t} 0.5\alpha^\sigma_{g_t}(x,y,t,\tilde{u}^\sigma,\tilde{v}^\sigma,\|\nabla\tilde{u}^\sigma\|, \right. \qquad (4\text{-}2)$$

$$\|\nabla\tilde{v}^\sigma\|)(g_t^\sigma(x,y,t,\hat{u}^\sigma,\hat{v}^\sigma))^2\, dg_t + \int_S 0.5\beta^\sigma_s(x,y,$$

$$t,\tilde{u}^\sigma,\tilde{v}^\sigma,(s,\nabla\tilde{u}^\sigma),(s,\nabla\tilde{v}^\sigma))((s,\nabla\hat{u}^\sigma(x,y,t))^2 +$$

$$(s,\nabla\hat{v}^\sigma(x,y,t))^2)ds +$$

$$0.5\gamma_0(\hat{u}^\sigma(x,y,t)-\tilde{u}_0^\sigma(x,y,t))^2 +$$

$$\left. 0.5\gamma_0(\hat{v}^\sigma(x,y,t)-\tilde{v}_0^\sigma(x,y,t))^2 \right] dxdy d\sigma.$$

Here:
(i) $\alpha_{g_t}^\circ(x,y,t,\tilde{u}^\circ,\tilde{v}^\circ,\|\nabla\tilde{u}^\circ\|,\|\nabla\tilde{v}^\circ\|)$, $(x,y)\in\Omega$, $\sigma\in[1,\infty)$, $g_t\in G_t$ is a weight associated with an optical flow constraint corresponding to the parameter value σ and the index $g_t$, which is a functional of the independent variables x, y, t and of the functions $\tilde{u}^\circ\equiv\tilde{u}^\circ(x,y,t)$, $\tilde{v}^\circ\equiv\tilde{v}^\circ(x,y,t)$, $\|\nabla\tilde{u}^\circ\|\equiv\|\nabla\tilde{u}^\circ(x,y,t)\|$, $\|\nabla\tilde{v}^\circ\|\equiv\|\nabla\tilde{v}^\circ(x,y,t)\|$ of these variables;

(ii) $\beta_s^\circ(x,y,t,\tilde{u}^\circ,\tilde{v}^\circ,(s,\nabla\tilde{u}^\circ),(s,\nabla\tilde{v}^\circ))$, $(x,y)\in\Omega$, $\sigma\in[1,\infty)$, $s\in S$ is a weight associated with a smoothness constraint in the direction s, which is a function of the independent variables x, y, t and of the functions $\tilde{u}^\sigma \equiv \tilde{u}^\sigma(x,y,t)$, $\tilde{v}^\sigma \equiv \tilde{v}^\sigma(x,y,t)$, $(s, \nabla \tilde{u}^\sigma) \equiv (s, \nabla \tilde{u}^\sigma(x,y,t))$, $(s, \nabla \tilde{v}^\sigma) \equiv (s, \nabla \tilde{v}^\sigma(x,y,t))$ of these variables;

(iii) $\gamma_0$ is a positive constant specifying a weight for the regularization constraint;

(iv) the functions $\|\nabla \tilde{u}^\sigma(x,y,t)\|$, $\|\nabla \tilde{v}^\sigma(x,y,t)\|$, $(x,y) \in \Omega, \sigma \in [1,\infty)$ are the norms of the vector valued functions $\nabla \tilde{u}^\sigma(x,y,t)$, $\nabla \tilde{v}^\sigma(x,y,t)$, which are the gradients with respect to the variables x,y of the functions $\tilde{u}^\sigma(x,y,t)$, $\tilde{v}^\sigma(x,y,t)$, respectively, given by the relations $$\|\nabla \tilde{u}^\sigma(x, y, t)\| = \sqrt{\tilde{u}_x^\sigma(x, y, t)^2 + \tilde{u}_y^\sigma(x, y, t)^2}, \quad (4-3)$$

$$\|\nabla \tilde{v}^\sigma(x, y, t)\| = \sqrt{\tilde{v}_x^\sigma(x, y, t)^2 + \tilde{v}_y^\sigma(x, y, t)^2}; \quad (4-4)$$

(v) the functions $(s, \nabla \tilde{u}^\sigma(x,y,t))$, $(s, \nabla \tilde{v}^\sigma(x,y,t))$, $(s, \nabla \hat{u}^\sigma(x,y,t))$, $(s, \nabla \hat{v}^\sigma(x,y,t))$, $(x,y) \in \Omega$, $\sigma \in [1,\infty)$, $s \in S$ are defined as in the relations (3-10), (3-11);

(vi) the function $g_t^\sigma(x,y,t,\hat{u}^\sigma,\hat{v}^\sigma)$, $(x,y) \in \Omega$, $\sigma \in [1,\infty)$, $g_t \in G_t$ is defined as in the relation (3-2); and (vii) the components $\tilde{u}_0^\sigma(x,y,t)$, $\tilde{v}_0^\sigma(x,y,t)$ of the initial estimate of the velocity vector corresponding to the parameter value $\sigma \in [1,\infty)$ at the image point $(x,y) \in \Omega$ are defined later.

The estimate of the parametric velocity vector field is then defined as the parametric vector field $(\tilde{u},\tilde{v})$, on which the functional $f(\tilde{u},\tilde{v},\hat{u},\hat{v})$, considered as the function of the parametric vector field $(\hat{u},\hat{v})$ and depending on the parametric vector field $(\tilde{u},\tilde{v})$ as on the parameters, achieves a local minimum when the value of the parametric vector field $(\hat{u},\hat{v})$ is identically equal to the value of the parametric vector field $(\tilde{u},\tilde{v})$. Taking into account the relation (4-1) the functional $f(\tilde{u},\tilde{v},\hat{u},\hat{v})$ can be expressed in the form $f(\tilde{u},\tilde{v},\tilde{u}+\Delta\tilde{u},\tilde{v}+\Delta\tilde{v})$. The parametric vector field $(\Delta\tilde{u},\Delta\tilde{v})$ specifies a perturbation to the parametric vector field $(\tilde{u},\tilde{v})$, and the functional $f(\tilde{u},\tilde{v},\tilde{u}+\Delta\tilde{u},\tilde{v}+\Delta\tilde{v})$ assigns the cost to each choice of the parametric vector field $(\tilde{u},\tilde{v})$ and its perturbation $(\Delta\tilde{u},\Delta\tilde{v})$. Then the estimate of the parametric velocity vector field is the parametric vector field $(\tilde{u},\tilde{v})$, for which a locally minimal cost is achieved when the perturbation $(\Delta\tilde{u},\Delta\tilde{v})$ is identically equal to zero. Using the calculus of variations with respect to the parametric vector field $(\Delta\tilde{u},\Delta\tilde{v})$ applied to the functional $f(\tilde{u},\tilde{v},\tilde{u}+\Delta\tilde{u},\tilde{v}+\Delta\tilde{v})$, the above defined estimate $(\tilde{u},\tilde{v})$ of the parametric velocity vector field is a solution of the system of equations $$\int_{G_t} \alpha_{g_t}^\sigma(x, y, t, \tilde{u}^\sigma, \tilde{v}^\sigma, \|\nabla \tilde{u}^\sigma\|, \|\nabla \tilde{v}^\sigma\|) g_{\tilde{u}}^\sigma(x, \quad (4-5)$$

$$y, t, \tilde{u}^\sigma, \tilde{v}^\sigma) g_t^\sigma(x, y, t, \tilde{u}^\sigma, \tilde{v}^\sigma) d g_t -$$

$$\int_S (s, \nabla (\beta_s^\sigma(x, y, t, \tilde{u}^\sigma, \tilde{v}^\sigma, (s, \nabla \tilde{u}^\sigma), (s, \nabla \tilde{v}^\sigma))(s,$$

$$\nabla \tilde{u}^\sigma(x, y, t)))) d s +$$

$$\gamma_0 (\tilde{u}^\sigma(x, y, t) - \tilde{u}_0^\sigma(x, y, t)) = 0,$$

-continued $$\int_{G_t} \alpha_{g_t}^\sigma(x, y, t, \tilde{u}^\sigma, \tilde{v}^\sigma, \|\nabla \tilde{u}^\sigma\|, \|\nabla \tilde{v}^\sigma\|) g_{\tilde{v}}^\sigma(x,$$

$$y, t, \tilde{u}^\sigma, \tilde{v}^\sigma) g_t^\sigma(x, y, t, \tilde{u}^\sigma, \tilde{v}^\sigma) d g_t - \int_S (s,$$

$$\nabla (\beta_s^\sigma(x, y, t, \tilde{u}^\sigma, \tilde{v}^\sigma, (s, \nabla \tilde{u}^\sigma), (s, \nabla \tilde{v}^\sigma))(s, \nabla \tilde{v}^\sigma(x, y, t))))$$

$$d s + \gamma_0 (\tilde{v}^\sigma(x, y, t) - \tilde{v}_0^\sigma(x, y, t)) = 0,$$

where the functions $g_{\tilde{u}}^\sigma(x,y,t,\tilde{u}^\sigma,\tilde{v}^\sigma)$ and $g_{\tilde{v}}^\sigma(x,y,t,\tilde{u}^\sigma,\tilde{v}^\sigma)$ are the first-order partial derivatives of the function $g_t^\sigma(x,y,t,\tilde{u}^\sigma,\tilde{v}^\sigma)$ with respect to the components $\tilde{u}^\sigma \equiv \tilde{u}^\sigma(x,y,t)$ and $\tilde{v}^\sigma \equiv \tilde{v}^\sigma(x,y,t)$ of the estimate of the velocity vector.

To select the weight functions associated with the optical flow, directional smoothness, and regularization constraints, consider the functional $f(\tilde{u},\tilde{v},\hat{u},\hat{v})$ defined by the relation (4-2) under the conditions that the parametric vector field $(\hat{u},\hat{v})$ be identically equal to the parametric vector field $(\tilde{u},\tilde{v})$, and that both be equal to the estimate $\{(\tilde{u}^\sigma(x,y,t), \tilde{v}^\sigma(x,y,t)) | (x,y) \in \Omega, \sigma \in [1,\infty)\}$ of the parametric velocity vector field obtained as the solution of the system of nonlinear equations (4-5). In this case the functional $f(\tilde{u},\tilde{v},\hat{u},\hat{v})$ takes the form $$f(\tilde{u}, \tilde{v}, \tilde{u}, \tilde{v}) = \int_1^\infty \int_\Omega \int \left[ \int_{G_t} 0.5 \alpha_{g_t}^\sigma(x, y, t, \tilde{u}^\sigma, \tilde{v}^\sigma, \|\nabla \tilde{u}^\sigma\|, \quad (4-6) \right.$$

$$\|\nabla \tilde{v}^\sigma\|)(g_t^\sigma(x, y, t, \tilde{u}^\sigma, \tilde{v}^\sigma))^2 d g_t + \int_S 0.5 \beta_s^\sigma(x, y,$$

$$t, \tilde{u}^\sigma, \tilde{v}^\sigma, (s, \nabla \tilde{u}^\sigma), (s, \nabla \tilde{v}^\sigma))((s, \nabla \tilde{u}^\sigma(x, y, t))^2 +$$

$$(s, \nabla \tilde{v}^\sigma(x, y, t))^2) d s +$$

$$0.5 \gamma_0 (\tilde{u}^\sigma(x, y, t) - \tilde{u}_0^\sigma(x, y, t))^2 +$$

$$\left. 0.5 \gamma_0 (\tilde{v}^\sigma(x, y, t) - \tilde{v}_0^\sigma(x, y, t))^2 \right] d x d y d \sigma.$$

Let $\{(\tilde{u}^\sigma(x,y,t),\tilde{v}^\sigma(x,y,t))|(x,y) \in \Omega, \sigma \in [1,\infty)\}$ be an estimate of the parametric velocity vector field, which is obtained as the solution of the system of nonlinear equations (4-5). Select each of the weight functions $\alpha_{g_t}^\sigma(x,y,t,\tilde{u}^\sigma,\tilde{v}^\sigma,\|\nabla \tilde{u}^\sigma\|,\|\nabla \tilde{v}^\sigma\|)$, $g_t \in G_t$ in such a way that the contribution of the optical flow constraint $g_t^\sigma(x,y,t,\tilde{u}^\sigma,\tilde{v}^\sigma)$ to the functional (4-6) becomes small for every image point $(x,y) \in \Omega$ located near the occluding boundary where the optical flow constraint $g_t^\sigma(x,y,t,\tilde{u}^\sigma,\tilde{v}^\sigma)$ is not satisfied. Similarly, each of the weight functions $\beta_s^\sigma(x,y,t,\tilde{u}^\sigma,\tilde{v}^\sigma,(s,\nabla \tilde{u}^\sigma),(s,\nabla \tilde{v}^\sigma))$, $s \in S$ will be chosen so that the contributions of the directional smoothness constraints $(s, \nabla \tilde{u}^\sigma(x,y,t))$ and $(s, \nabla \tilde{v}^\sigma(x,y,t))$ to the functional (4-6) become small for every image point $(x,y) \in \Omega$ located near the occluding boundary where the occluding boundary is crossed in the direction s and one of the directional smoothness constraints $(s, \nabla \tilde{u}^\sigma(x,y,t))$ and $(s, \nabla \tilde{v}^\sigma(x,y,t))$ is not satisfied. Let the image point $(x,y) \in \Omega$ be near the occluding boundary; then the following two events are likely to happen:

1. For some small positive time increments $\Delta t^-$ and $\Delta t^+$ the point in the scene projecting into the image point $(x,y)$ at the time t either is visible at the time $(t-\Delta t^-)$ and is invisible at the time $(t+\Delta t^+)$, or it is visible at the time $(t+\Delta t^+)$ and is invisible at the time $(t-\Delta t^-)$. Let $(x_1,y_1)$ and $x_2,y_2)$ be projections of such a point in the scene into the image plane taken at the time moments $(t-\Delta t^-)$ and $(t+\Delta t^+)$, respectively. If the radiance of the point in the scene projecting into the image point $(x_1,y_1)$ at the time $(t-\Delta t^-)$ is significantly different from the radiance of the point in the scene projecting into the image point $(x_2,y_2)$ at the time $(t+\Delta t^+)$, and if the radiance undergoes some changes in the neighborhoods of the above points in the scene, then the following cases are likely to be encountered:

1.1. The point in the scene projecting into the image point $(x-\Delta t^- \tilde{u}^o(x,y,t), y-\Delta t^- \tilde{v}^o(x,y,t))$ at the time $(t-\Delta t^-)$, and the point in the scene projecting into the image point $(x+\Delta t^+ \tilde{u}^o(x,y,t), y+\Delta t^+ \tilde{v}^o(x,y,t))$ at the time $(t+\Delta t^+)$, both belong to the occluded object, on one hand, and have different radiances, on the other hand. The later may happen if the above point occupy distinct locations on the object of the scene which, in turn, may be caused by the presence of the occluding boundary. Under these conditions the absolute values of some of the functions $g_t^o(x,y,t,\tilde{u}^o,\tilde{v}^o)$, $g_t \in G_t$ become large.

1.2. The point in the scene projecting into the image point $(x-\Delta t^- \tilde{u}^o(x,y,t), y-\Delta t^- \tilde{v}^o(x,y,t))$ at the time $(t-\Delta t^-)$ and the point in the scene projecting into the image point $(x+\Delta t^+ \tilde{u}^o(x,y,t), y+\Delta t^+ \tilde{v}^o(x,y,t))$ at the time $(t+\Delta t^+)$ both belong either to the occluding object of to the occluded one. In addition to this, for some not-too-large vector $(\Delta \tilde{u}^o(x,y,t), \Delta \tilde{v}^o(x,y,t))$, one of the following two points in the scene belongs to the occluding object, while the other belongs to the occluded one: the first point is the one projecting into the image point $(x-\Delta t^-(\tilde{u}^o(x,y,t)+\Delta \tilde{u}^o(x,y,t)), y-\Delta t^-(\tilde{v}^o(x,y,t)+\Delta \tilde{v}^o(x,y,t)))$ at the time $(t-\Delta t^-)$, and the second point is the one projecting into the image point $(x+\Delta t^+(\tilde{u}^o(x,y,t)+\Delta \tilde{u}^o(x,y,t)), y+\Delta t^+(\tilde{v}^o(x,y,t)+\Delta \tilde{v}^o(x,y,t)))$ at the time $(t+\Delta t^+)$. Likewise, for the same vector $(\Delta \tilde{u}^o(x,y,t), \Delta \tilde{v}^o(x,y,t))$, one of the following two points in the scene belongs to the occluding object, while the other belongs to the occluded one: the first point is the one projecting into the image point $(x-\Delta t^-(\tilde{u}^o(x,y,t)-\Delta \tilde{u}^o(x,y,t)), y-\Delta t^-(\tilde{v}^o(x,y,t)-\Delta \tilde{v}^o(x,y,t)))$ at the time $(t-\Delta t^-)$, and the second point is the one projecting into the image point $(x+\Delta t^+(\tilde{u}^o(x,y,t)-\Delta \tilde{u}^o(x,y,t)), y+\Delta t^+(\tilde{v}^o(x,y,t)-\Delta \tilde{v}^o(x,y,t)))$ at the time $(t+\Delta t^+)$ (see FIG. 1). In such a case the values of the functions $(g_t^o(x,y,t,\tilde{u}^o,\tilde{v}^o))^2$, $g_t \in G_t$ become relatively small, while the values of some of the functions $(g_t^o(x,y,t,\tilde{u}^o+\Delta \tilde{u}^o,\tilde{v}^o+\Delta \tilde{v}^o))^2$, $g_t \in G_t$, as well as the values of some of the functions $(g_t^o(x,y,t,\tilde{u}^o-\Delta \tilde{u}^o,\tilde{v}^o-\Delta \tilde{v}^o))^2$, $g_t \in G_t$, become relatively large.

This implies that the values of some of the functions $$(g_t^o(x,y,t,\tilde{u}^o+\Delta \tilde{u}^o,\tilde{v}^o+\Delta \tilde{v}^o))^2 + (g_t^o(x,y,t,\tilde{u}^o-\Delta \tilde{u}^o,\tilde{v}^o-\Delta \tilde{v}^o))^2 - 2(g_t^o(x,y,t,\tilde{u}^o,\tilde{v}^o))^2, \quad (4\text{-}7)$$

$g_t \in G_t$ becomes large. If the second-order and higher partial derivatives of the function $g_t^o(x,y,t,\tilde{u}^o,\tilde{v}^o)$ with respect to the components $\tilde{u}^o \equiv \tilde{u}^o(x,y,t)$ and $\tilde{v}^o \equiv \tilde{v}^o(x,y,t)$ of the estimate of the velocity vector are ignored, each of the functions (4-7) can be expressed in the form $$2(\Delta \tilde{u}^o(x,y,t) g_{t\tilde{u}}^o(x,y,t,\tilde{u}^o,\tilde{v}^o) + \Delta \tilde{v}^o(x,y,t) g_{t\tilde{v}}^o(x,y,t,\tilde{u}^o,\tilde{v}^o))^2 \quad (4\text{-}8)$$

where the functions $g_{t\tilde{u}}^o(x,y,t,\tilde{u}^o,\tilde{v}^o)$ and $g_{t\tilde{v}}^o(x,y,t,\tilde{u}^o,\tilde{v}^o)$ are the first-order partial derivatives of the function $g_t^o(x,y,t,\tilde{u}^o,\tilde{v}^o)$ with respect to the components $\tilde{u}^o$ and $\tilde{v}^o$ of the estimate of the velocity vector. For the vector $s \equiv (s_x, s_y)$, $s \in S$ that is collinear to the vector $(\Delta \tilde{u}^o(x,y,t), \Delta \tilde{v}^o(x,y,t))$, the above observations imply that the absolute values of some of the functions $(s, \nabla' g_t^o(x,y,t,\tilde{u}^o,\tilde{v}^o))$, $g_t \in G_t$, defined by the relation $$(s, \nabla' g_t^o(x,y,t,\tilde{u}^o,\tilde{v}^o)) = s_x g_{t\tilde{u}}^o(x,y,t,\tilde{u}^o,\tilde{v}^o) + s_y g_{t\tilde{v}}^o(x,y,t,\tilde{u}^o,\tilde{v}^o) \quad (4\text{-}9)$$

become large.

2. The estimate $\{(\tilde{u}^o(x,y,t), \tilde{v}^o(x,y,t)) | (x,y) \in \Omega, \sigma \in [1,\infty)\}$ of the parametric velocity vector field changes rapidly in the vicinity of the image point $(x,y)$ (see FIG. 2), which implies the following:

2.1. The values of the functions $\|\nabla \tilde{u}^o(x,y,t)\|$ and $\|\nabla \tilde{v}^o(x,y,t)\|$ become large.

2.2. The absolute values of the functions $(s, \nabla \tilde{u}^o(x,y,t))$ and $(s, \nabla \tilde{v}^o(x,y,t))$, $s \in S$ become large, provided that the image point $(x,y)$ crosses the occluding boundary in the direction s.

If the conditions on the scene being imaged and on the imaging process itself described at the beginning of the previous section are satisfied, then in the event of the absolute value of the function $g_t^o(x,y,t,\tilde{u}^o,\tilde{v}^o)$ being large for some $g_t \in G_t$, or of the values of the functions $\|\nabla \tilde{u}^o(x,y,t)\|$, $\|\nabla \tilde{v}^o(x,y,t)\|$ being large in addition to the absolute value of the function $g_t^o(x,y,t,\tilde{u}^o,\tilde{v}^o)$ being large for some $g_t \in G_t$, the image point $(x,y)$ is likely to be near the occluding boundary, while in the event of the absolute values of the functions $(s, \nabla \tilde{u}^o(x,y,t))$, $(s, \nabla \tilde{v}^o(x,y,t))$, $s \in S$ being large, or of the absolute values of some of the functions $(s, \nabla' g_t^o(x,y,t,\tilde{u}^o, \tilde{v}^o))$, $g_t \in G_t$ being large in addition to the absolute values of the functions $(s, \nabla \tilde{u}^o(x,y,t))$, $(s, \nabla \tilde{v}^o(x,y,t))$, $s \in S$ being large, the image point $(x,y)$ is likely to cross the occluding boundary in the direction s. Note that in the case of the functions $\|\nabla \tilde{u}^o(x,y,t)\|$, $\|\nabla \tilde{v}^o(x,y,t)\|$ being large, the image point $(x,y)$ does not necessarily lie near the occluding boundary. It may, for example, lie on the object of the scene whose projection onto the image plane undergoes a rotation or a local deformation. Also note that in the case of some of the functions $(s, \nabla' g_t^o(x,y,t,\tilde{u}^o,\tilde{v}^o))$, $g_t \in G_t$ being large, the image point $(x,y)$ does not necessarily cross the occluding boundary in the direction s. It may, for example, cross the radiance boundary arising from a texture or a sudden change in the illumination.

These observations suggest the following: each of the weight functions $\alpha_{g_t}^o(x,y,t,\tilde{u}^o,\tilde{v}^o, \|\nabla \tilde{u}^o\|, \|\nabla \tilde{v}^o\|)$, $g_t \in G_t$ should be a steadily decreasing function relative to the absolute value of the function $g_t^o(x,y,t,\tilde{u}^o,\tilde{v}^o)$ and to the values of the functions $\|\nabla \tilde{u}^o(x,y,t)\|$, $\|\nabla \tilde{v}^o(x,y,t)\|$ multiplied by the absolute value of the function $g_t^o(x,y,t,\tilde{u}^o,\tilde{v}^o)$; and each of the weight functions $\beta_s^o(x,y,t,\tilde{u}^o,\tilde{v}^o,(s,\nabla \tilde{u}^o),(s,\nabla \tilde{v}^o))$, $s \in S$ should be a steadily decreasing function relative to the absolute values of the functions $(s, \nabla \tilde{u}^o(x,y,t))$, $(s, \nabla \tilde{v}^o(x,y,t))$ and to the absolute values of some of the functions $(s, \nabla' g_t^o(x,y,t,\tilde{u}^o,\tilde{v}^o))$, $g_t \in G_t$ multiplied by some combination of the absolute values of the functions $(s, \nabla \tilde{u}^o(x,y,t))$, $(s, \nabla \tilde{v}^o(x,y,t))$.

It is natural to require each of the weight functions corresponding to either an optical flow constraint or a directional smoothness constraint to be selected in such a way that the product of the weight function and the corresponding constraint function appearing as the summand in the functional (4-6) becomes larger whenever the constraint function becomes larger. This makes the solution of the system of nonlinear equations (4-5) determining the estimate of the parametric velocity vector field more robust with respect to the choice of the initial estimate of the parametric velocity vector field and with respect to the noise. To be more specific, these requirements consist of the following.

1. For every $g_t \epsilon G_t$ the function defined by the relation:

$$\alpha_{g_t}^\sigma(x,y,t,\tilde{u}^\sigma,\tilde{v}^\sigma,\|\nabla\tilde{u}^\sigma\|,\|\nabla\tilde{v}^\sigma\|)(g_t^\sigma(x,y,t,\tilde{u}^\sigma,\tilde{v}^\sigma))^2, \quad (4\text{-}10)$$

and appearing as the summand in the functional (4-6) is required to be steadily increasing relative to the function $(g_t^\sigma(x,y,t,\tilde{u}^\sigma,\tilde{v}^\sigma))^2$. In other words, the function (4-10) is required to increase whenever the function $(g_t^\sigma(x,y,t,\tilde{u}^\sigma,\tilde{v}^\sigma))^2$ is increased.

2. For every $s \epsilon S$ the function defined by the relation:

$$\beta_s^\sigma(x,y,t,\tilde{u}^\sigma,\tilde{v}^\sigma,(s,\nabla\tilde{u}^\sigma),(s,\nabla\tilde{v}^\sigma))((s,\nabla\tilde{u}^\sigma(x,y,t))^2+(s,\nabla\tilde{v}^\sigma(x,y,t))^2) \quad (4\text{-}11)$$

and appearing as the summand in the functional (4-6) is required to be steadily increasing relative to the function $((s,\nabla\tilde{u}^\sigma(x,y,t))^2+(s,\nabla\tilde{v}^\sigma(x,y,t))^2)$. In other words, the function (4-11) is required to increase whenever the function $((s,\nabla\tilde{u}^\sigma(x,y,t))^2+(s,\nabla\tilde{v}^\sigma(x,y,t))^2)$ is increased.

The weight functions $$\alpha_{g_t}^\sigma(x,y,t,\tilde{u}^\sigma,\tilde{v}^\sigma,\|\nabla\tilde{u}^\sigma\|,\|\nabla\tilde{v}^\sigma\|)=(r^2+(p^2+q^2(\|\nabla\tilde{u}^\sigma(x,y,t)\|^2+\|\nabla\tilde{v}^\sigma(x,y,t)\|^2))(g_t^\sigma(x,y,t,\tilde{u}^\sigma,\tilde{v}^\sigma))^2)^{-1}, \quad (4\text{-}12)$$

for every $g_t \epsilon G_t$, where $r^2$, $p^2$, $q^2$ are non-negative real constants, and $$\beta_s^\sigma(x,y,t,\tilde{u}^\sigma,\tilde{v}^\sigma,(s,\nabla\tilde{u}^\sigma),(s,\nabla\tilde{v}^\sigma))=(a^2+(c^2+b^2(s,\nabla'g_t^\sigma(x,y,t,\tilde{u}^\sigma,\tilde{v}^\sigma))^2)((s,\nabla\tilde{u}^\sigma(x,y,t))^2+(s,\nabla\tilde{v}^\sigma(x,y,t))^2))^{-1}, \quad (4\text{-}13)$$

for every $s \epsilon S$, where the expression $b^2(s,\nabla'g_t^\sigma(x,y,t,\tilde{u}^\sigma,\tilde{v}^\sigma))^2$ is defined as in the relation $$b^2(s, \nabla' g_t^\sigma(x, y, t, \tilde{u}^\sigma, \tilde{v}^\sigma))^2 = \int_{G_t} b_{g_t}^2(s, \nabla' g_t^\sigma(x, y, t, \tilde{u}^\sigma, \tilde{v}^\sigma))^2 dg_t, \quad (4-14)$$

and $a^2$, $c^2$, $b_{g_t}^2$, $g_t \epsilon G_t$ are non-negative real constants, comply with the above requirements and with the requirements stated earlier in this section.

The approach of obtaining the estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$ by solving the system of nonlinear equations (4-5) for each parameter value σ independently may encounter difficulty relating to the fact that the system of equations (4-5) may, in general, have many solutions. To overcome this difficulty, the values of the estimates of the velocity vector field corresponding to the different values of the parameter σ are tied together by imposing the following restriction: the estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$ is required to be a continuously differentiable function with respect to the parameter σ for every image point $(x,y)\epsilon\Omega$ and for every parameter value $\sigma\epsilon[1,\infty)$. The additional restrictions on the estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$ are imposed in the form of the boundary conditions as follows:

1. The estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$ is required to converge to the vector field that is identically equal to a given vector constant $(\tilde{u}^\infty,\tilde{v}^\infty)$ when the parameter σ converges to ∞, and such convergence is required to be uniform over the set of the image points Ω.

2. The derivative of the estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$ in the direction normal to the boundary $\partial\Omega$ of the image Ω is required to be equal to zero for every image point (x,y) belonging to the image boundary $\partial\Omega$ and for every parameter value $\sigma\epsilon[1,\infty)$.

Let $\sigma\epsilon[1,\infty)$ be a given parameter value, and let Δσ be an infinitesimal positive real value. Taking into consideration the above restrictions, the initial estimate of the velocity vector field $\{(\tilde{u}_0^\sigma(x,y,t),\tilde{v}_0^\sigma(x,y,t))|(x,y)\epsilon\Omega\}$ corresponding to the parameter value σ can be defined as follows:

$$(\tilde{u}_0^\sigma(x,y,t),\tilde{v}_0^\sigma(x,y,t))\equiv(\tilde{u}^{\sigma+\Delta\sigma}(x,y,t),\tilde{v}^{\sigma+\Delta\sigma}(x,y,t)), \ (x,y)\epsilon\Omega. \quad (4\text{-}15)$$

Then the regularization constraints (3-14) and (3-15) can, respectively, be approximated by the relations $$\gamma_0(\tilde{u}^\sigma(x, y, t) - \tilde{u}_0^\sigma(x, y, t)) \approx -\gamma\frac{\partial}{\partial\sigma}\tilde{u}^\sigma(x, y, t), \quad (4-16)$$

$$\gamma_0(\tilde{v}^\sigma(x, y, t) - \tilde{v}_0^\sigma(x, y, t)) \approx -\gamma\frac{\partial}{\partial\sigma}\tilde{v}^\sigma(x, y, t), \quad (4-17)$$

for every image point $(x,y)\epsilon\Omega$, where γ is a positive real constant given by the relation By substituting the regularization constraints $\gamma_0(\tilde{u}^\sigma(x,y,t)-\tilde{u}_0^\sigma(x,y,t))$ and $\gamma_0(\tilde{v}^\sigma(x,y,t)-\tilde{v}_0^\sigma(x,y,t))$ appearing in the system of nonlinear equations (4-5) with the constraints $$-\gamma\frac{\partial}{\partial\sigma}\tilde{u}^\sigma(x, y, t) \text{ and } -\gamma\frac{\partial}{\partial\sigma}\tilde{v}^\sigma(x, y, t),$$

respectively, and by defining the weight functions $\alpha_{g_t}^\sigma(x,y,t,\tilde{u}^\sigma,\tilde{v}^\sigma,\|\nabla\tilde{u}^\sigma\|,\|\nabla\tilde{v}^\sigma\|)$, $g_t\epsilon G_t$ and $\beta_s^\sigma(x,y,t,\tilde{u}^\sigma,\tilde{v}^\sigma,(s,\nabla\tilde{u}^\sigma),(s,\nabla\tilde{v}^\sigma))$, $s\epsilon S$ according to the relations (4-12) and (4-13), respectively, the system (4-5) becomes the following system of equations relative to the unknown estimate of the parametric velocity vector field $\{(\tilde{u}^\sigma(x,y,t),\tilde{v}^\sigma(x,y,t))|(x,y)\epsilon\Omega,\sigma\epsilon[1,\infty)\}$:

$$\int_{G_t} \frac{g_{\tilde{u}}^\sigma(x,y,t,\tilde{u}^\sigma,\tilde{v}^\sigma) g_t^\sigma(x,y,t,\tilde{u}^\sigma,\tilde{v}^\sigma)}{r^2 + (p^2 + q^2(\|\nabla \tilde{u}^\sigma(x,y,t)\|^2 + \|\nabla \tilde{v}^\sigma(x,y,t)\|^2))(g_t^\sigma(x,y,t,\tilde{u}^\sigma,\tilde{v}^\sigma))^2} dg_t - \gamma \frac{\partial}{\partial \sigma} \tilde{u}^\sigma(x,y,t) - \tag{4-19}$$

$$\int_S \left( s, \nabla \frac{(s, \nabla \tilde{u}^\sigma(x,y,t))}{a^2 + (c^2 + b^2(s, \nabla' g_t^\sigma(x,y,t,\tilde{u}^\sigma,\tilde{v}^\sigma))^2)((s, \nabla \tilde{u}^\sigma(x,y,t))^2 + (s, \nabla \tilde{v}^\sigma(x,y,t))^2)} \right) ds = 0,$$

$$\int_{G_t} \frac{g_{\tilde{v}}^\sigma(x,y,t,\tilde{u}^\sigma,\tilde{v}^\sigma) g_t^\sigma(x,y,t,\tilde{u}^\sigma,\tilde{v}^\sigma)}{r^2 + (p^2 + q^2(\|\nabla \tilde{u}^\sigma(x,y,t)\|^2 + \|\nabla \tilde{v}^\sigma(x,y,t)\|^2))(g_t^\sigma(x,y,t,\tilde{u}^\sigma,\tilde{v}^\sigma))^2} dg_t - \gamma \frac{\partial}{\partial \sigma} \tilde{v}^\sigma(x,y,t) -$$

$$\int_S \left( s, \nabla \frac{(s, \nabla \tilde{v}^\sigma(x,y,t))}{a^2 + (c^2 + b^2(s, \nabla' g_t^\sigma(x,y,t,\tilde{u}^\sigma,\tilde{v}^\sigma))^2)((s, \nabla \tilde{u}^\sigma(x,y,t))^2 + (s, \nabla \tilde{v}^\sigma(x,y,t))^2)} \right) ds = 0.$$

Under conditions that the regularization constraints $0.5\gamma_0(\hat{u}^\circ(x,y,t)-\tilde{u}_0^\circ(x,y,t))^2$ and $0.5\gamma_0(\hat{v}^\circ(x,y,t)-\tilde{v}_0^\circ(x,y,t))^2$ appearing in the functional $f(\tilde{u},\tilde{v},\hat{u},\hat{v})$ defined by the relation (4-2) be replaced with the constraints $$0.5\gamma \left( \hat{u}^\sigma(x,y,t) - \tilde{u}^\sigma(x,y,t) - \frac{\partial}{\partial \sigma} \tilde{u}^\sigma(x,y,t) \right)^2$$

and $$0.5\gamma \left( \hat{v}^\sigma(x,y,t) - \tilde{v}^\sigma(x,y,t) - \frac{\partial}{\partial \sigma} \tilde{v}^\sigma(x,y,t) \right)^2,$$

respectively, and provided that the weight functions $\alpha_{g_t}^\circ(x,y,t,\tilde{u}^\circ,\tilde{v}^\circ,\|\nabla \tilde{u}^\circ\|,\|\nabla \tilde{v}^\circ\|)$, $g_t \in G_t$ are defined according to the relation (4-12), whereas the weight functions $\beta_s^\circ(x,y,t,\tilde{u}^\circ,\tilde{v}^\circ,(s,\nabla\tilde{u}^\circ),(s,\nabla\tilde{v}^\circ))$, $s \in S$ are defined according to the relation (4-13), the functional $f(\tilde{u},\tilde{v},\hat{u},\hat{v})$ of the parametric vector field $(\tilde{u},\tilde{v}) \equiv \{(\tilde{u}^\circ(x,y,t),\tilde{v}^\circ(x,y,t))|(x,y)\in\Omega, \sigma\in[1,\infty)\}$ and the parametric vector field $(\hat{u},\hat{v}) \equiv \{(\hat{u}^\circ(x,y,t),\hat{v}^\circ(x,y,t))|(x,y)\in\Omega, \sigma\in[1,\infty)\}$ defined by the relation (4-2) can be replaced with the functional $h(\tilde{u},\tilde{v},\hat{u},\hat{v})$ of the same parametric vector fields $(\tilde{u},\tilde{v})$, $(\hat{u},\hat{v})$ defined as in the relation $$h(\tilde{u},\tilde{v},\hat{u},\hat{v}) = \int_1^\infty \int_\Omega \int \left[ \int_{G_t} \frac{\ln(r^2 + (p^2 + q^2(\|\nabla \tilde{u}^\sigma(x,y,t)\|^2 + \|\nabla \tilde{v}^\sigma(x,y,t)\|^2))(g_t^\sigma(x,y,t,\hat{u}^\sigma,\hat{v}^\sigma))^2)}{2(p^2 + q^2(\|\nabla \tilde{u}^\sigma(x,y,t)\|^2 + \|\nabla \tilde{v}^\sigma(x,y,t)\|^2))} dg_t + \right. \tag{4-20}$$

$$\int_S \frac{\ln(a^2 + (c^2 + b^2(s, \nabla' g_t^\sigma(x,y,t,\tilde{u}^\sigma,\tilde{v}^\sigma))^2)((s,\nabla\hat{u}^\sigma(x,y,t))^2 + (s,\nabla\hat{v}^\sigma(x,y,t))^2))}{(2(c^2 + b^2(s, \nabla' g_t^\sigma(x,y,t,\tilde{u}^\sigma,\tilde{v}^\sigma))^2)} ds +$$

$$0.5\gamma \left( \hat{u}^\sigma(x,y,t) - \tilde{u}^\sigma(x,y,t) - \frac{\partial}{\partial \sigma} \tilde{u}^\sigma(x,y,t) \right)^2 +$$

$$\left. 0.5\gamma \left( \hat{v}^\sigma(x,y,t) - \tilde{v}^\sigma(x,y,t) - \frac{\partial}{\partial \sigma} \tilde{v}^\sigma(x,y,t) \right)^2 \right] dx\, dy\, d\sigma,$$

where the symbol ln stands for the natural logarithm function.

The above substitutions imply that the parametric vector field $(\tilde{u},\tilde{v})$ satisfies the system of nonlinear equations (4-19) if and only if every variation of the functional $h(\tilde{u},\tilde{v},\hat{u},\hat{v})$ with respect to the parametric vector field $(\hat{u},\hat{v})$ is equal to zero whenever the parametric vector field $(\hat{u},\hat{v})$ is identically equal to the parametric vector field $(\tilde{u},\tilde{v})$.

Note that when the constant $q^2$ approaches zero and when the increments between successive time moments of the time sequence $\{t_k"\}_{k=0}^{K"+0}$ uniformly approach zero the functional $h(\tilde{u},\tilde{v},\hat{u},\hat{v})$ approaches the functional, which is independent of the parametric vector field $(\tilde{u},\tilde{v})$ and the problem of finding the estimate of the parametric velocity vector field becomes the energy minimization problem.

Let $(\tilde{u},\tilde{v}) \equiv \{(\tilde{u}^\sigma(x,y,t),\tilde{v}^\sigma(x,y,t))|(x,y)\in\Omega,\sigma\in[1,\infty)\}$ be the estimate of the parametric velocity vector field obtained as the solution of the system of nonlinear equations (4-19). We now examine the behavior of the system of nonlinear equations (4-19) near such a solution. First, the changes in the behavior of the optical flow and the directional smoothness constraints when the image point (x,y) goes from the position beyond the occluding boundary to the position near the occluding boundary are considered. Then, the dependence of the optical flow and the directional smoothness constraints on the parameters $r^2,p^2,q^2$ specifying the weight functions $\alpha_{g_t}^\sigma(x,y,t,\tilde{u}^\sigma,\tilde{v}^\sigma,\|\nabla\tilde{u}^\sigma\|,\|\nabla\tilde{v}^\sigma\|)$, $g_t\in G_t$ as in the relation (4-12) and on the parameters $a^2, c^2, b_{g_t}^2, g_t\in G_t$ specifying the weight functions $\beta_s^\sigma(x,y,t,\tilde{u}^\sigma,\tilde{v}^\sigma,(s,\nabla\tilde{u}^\sigma),(s,\nabla\tilde{v}^\sigma))$, $s\in S$ as in the relation (4-13) are investigated.

Let $(\Delta\tilde{u},\Delta\tilde{v}) \equiv \{(\Delta\tilde{u}^\sigma(x,y,t),\Delta\tilde{v}^\sigma(x,y,t))|(x,y)\in\Omega,\sigma\in[1,\infty)\}$ be a parametric vector field defined by the relation (4-1), then in the neighborhood of the parametric vector field $(\tilde{u},\tilde{v})$ the functional $h(\tilde{u},\tilde{v},\tilde{u}+\Delta\tilde{u},\tilde{v}+\Delta\tilde{v})$ can be expanded into the quadratic form of the parametric vector field $(\Delta\tilde{u},\Delta\tilde{v})$ as follows:

$$h(\tilde{u}, \tilde{v}, \tilde{u} + \Delta\tilde{u}, \tilde{v} + \Delta\tilde{v}) - h(\tilde{u}, \tilde{v}, \tilde{u}, \tilde{v}) \approx \quad (4-21)$$

$$\frac{1}{2}\int_1^\infty \int\int_\Omega \int \left[ \int_{G_t} \frac{(r^2 - (p^2 + q^2(\|\nabla\tilde{u}^\sigma(x,y,t)\|^2 + \|\nabla\tilde{v}^\sigma(x,y,t)\|^2))(g_t^\sigma(x,y,t,\tilde{u}^\sigma,\tilde{v}^\sigma))^2)}{(r^2 + (p^2 + q^2(\|\nabla\tilde{u}^\sigma(x,y,t)\|^2 + \|\nabla\tilde{v}^\sigma(x,y,t)\|^2))(g_t^\sigma(x,y,t,\tilde{u}^\sigma,\tilde{v}^\sigma))^2)^2} \right.$$

$$(g_{\tilde{u}}^\sigma(x,y,t,\tilde{u}^\sigma,\tilde{v}^\sigma)\Delta\tilde{u}^\sigma(x,y,t) + g_{\tilde{v}}^\sigma(x,y,t,\tilde{u}^\sigma,\tilde{v}^\sigma)\Delta\tilde{v}^\sigma(x,y,t))^2 \, d\,g_t +$$

$$\int_S \frac{(a^2 - (c^2 + b^2(s,\nabla' g_t^\sigma(x,y,t,\tilde{u}^\sigma,\tilde{v}^\sigma))^2)((s,\nabla\tilde{u}^\sigma(x,y,t))^2 + (s,\nabla\tilde{v}^\sigma(x,y,t))^2))}{(a^2 + (c^2 + b^2(s,\nabla' g_t^\sigma(x,y,t,\tilde{u}^\sigma,\tilde{v}^\sigma))^2)((s,\nabla\tilde{u}^\sigma(x,y,t))^2 + (s,\nabla\tilde{v}^\sigma(x,y,t))^2))^2} \cdot$$

$$((s,\nabla(\Delta\tilde{u}^\sigma(x,y,t)))^2 + (s,\nabla(\Delta\tilde{v}^\sigma(x,y,t)))^2) d\,s +$$

$$\int_S \frac{2(c^2 + b^2(s,\nabla' g_t^\sigma(x,y,t,\tilde{u}^\sigma,\tilde{v}^\sigma))^2)}{(a^2 + (c^2 + b^2(s,\nabla' g_t^\sigma(x,y,t,\tilde{u}^\sigma,\tilde{v}^\sigma))^2)((s,\nabla\tilde{u}^\sigma(x,y,t))^2 + (s,\nabla\tilde{v}^\sigma(x,y,t))^2))^2} \cdot$$

$$((s,\nabla(\Delta\tilde{u}^\sigma(x,y,t)))(s,\nabla\tilde{v}^\sigma(x,y,t)) - (s,\nabla(\Delta\tilde{v}^\sigma(x,y,t)))(s,\nabla\tilde{u}^\sigma(x,y,t)))^2 d\,s +$$

$$\left. \gamma(\Delta\tilde{u}^\sigma(x,y,t))^2 + \gamma(\Delta\tilde{v}^\sigma(x,y,t))^2 \right] dx\,dy\,d\sigma.$$

The optical flow constraint $g_t^\sigma(x,y,t,\tilde{u}^\sigma,\tilde{v}^\sigma)$ corresponding to the index $g_t\in G_t$ is represented in the system of nonlinear equations (4-19) by the expression $$\frac{\sqrt{(g_t^\sigma(x,y,t,\tilde{u}^\sigma,\tilde{v}^\sigma))^2}}{r^2 + (p^2 + q^2(\|\nabla\tilde{u}^\sigma(x,y,t)\|^2 + \|\nabla\tilde{v}^\sigma(x,y,t)\|^2))(g_t^\sigma(x,y,t,\tilde{u}^\sigma,\tilde{v}^\sigma))^2} \quad (4-22)$$

With respect to this expression the following cases can be considered:

1. The image point (x,y) is beyond the occluding boundary. Then the value of the function $(g_t^\sigma(x,y,t,\tilde{u}^\sigma,\tilde{v}^\sigma))^2$ may become small. In this case the value of the function (4-22) would approach the value of the function $$\frac{\sqrt{(g_t^\sigma(x,y,t,\tilde{u}^\sigma,\tilde{v}^\sigma))^2}}{r^2}. \quad (4-23)$$

This, in turn, would make each of the two summands of the system of nonlinear equations (4-19) associated with the optical flow constraint $g_t^\sigma(x,y,t,\tilde{u}^\sigma,\tilde{v}^\sigma)$ corresponding to the index $g_t$ behave as a linear function relative to the function $g_t^\sigma(x,y,t,\tilde{u}^\sigma,\tilde{v}^\sigma)$ with the proportionality coefficient equal to the function $g_{t\tilde{u}}^\sigma(x,y,t,\tilde{u}^\sigma,\tilde{v}^\sigma)/r^2$ in the case of the first summand and to the function $g_{t\tilde{v}}^\sigma(x,y,t,\tilde{u}^\sigma,\tilde{v}^\sigma)/r^2$ in the case of the second summand.

2. The image point (x,y) approaches the occluding boundary. Then the value of the function $(g_t^\sigma(x,y,t,\tilde{u}^\sigma,\tilde{v}^\sigma))^2$ may increase. In the case when the value of the function $(g_t^\sigma(x,y,t,\tilde{u}^\sigma,\tilde{v}^\sigma))^2$ is less than the value of the function $r^2/(p^2+q^2(\|\nabla\tilde{u}^\sigma(x,y,t)\|^2+\|\nabla\tilde{v}^\sigma(x,y,t)\|^2))$, the fact that the summand of the quadratic form (4-21) associated with the optical flow constraint $g_t^\sigma(x,y,t,\tilde{u}^\sigma,\tilde{v}^\sigma)$ is positive implies that the function (4-22) would increase. In the case when the value of the function $(g_t^\sigma(x,y,t,\tilde{u}^\sigma,\tilde{v}^\sigma))^2$ is greater than the value of the function $r^2/(p^2+q^2(\|\nabla\tilde{u}^\sigma(x,y,t)\|^2+\|\nabla\tilde{v}^\sigma(x,y,t)\|^2))$, the fact that the summand of the quadratic form (4-21) associated with the optical flow constraint $g_t^\sigma(x,y,t,\tilde{u}^\sigma,\tilde{v}^\sigma)$ is negative implies that the function (4-22) would decrease. Therefore, the function (4-22) achieves its maximal value $$\frac{1}{2r\sqrt{p^2 + q^2(\|\nabla \tilde{u}^\sigma(x, y, t)\|^2 + \|\nabla \tilde{v}^\sigma(x, y, t)\|^2)}} \quad (4\text{-}24)$$

when the value of the function $(g_t^o(x,y,t,\tilde{u}^o,\tilde{v}^o))^2$ is equal to the value of the function $r^2/(p^2+q^2(\|\nabla \tilde{u}^o(x,y,t)\|^2+\|\nabla \tilde{v}^o(x,y,t)\|^2))$.

It may also happen that the values of the functions $\|\nabla \tilde{u}^o(x,y,t)\|$ and $\|\nabla \tilde{v}^o(x,y,t)\|$ become large. Under these conditions the following values are reduced: the maximal value of the function (4-22) specified by the relation (4-24), the value $r^2/(p^2+q^2(\|\nabla \tilde{u}^o(x,y,t)\|^2+\|\nabla \tilde{v}^o(x,y,t)\|^2))$ of the function $(g_t^o(x,y,t,\tilde{u}^o,\tilde{v}^o))^2$ where this maximal value is achieved. The above situation may occur in the following cases.

1. The occluding object may artificially constrain the estimate $(\tilde{u}^o(x,y,t),\tilde{v}^o(x,y,t))$ in the direction orthogonal to the occluding boundary. Then the optical flow constraint may react by shifting the estimate $(\tilde{u}^o(x,y,t),\tilde{v}^o(x,y,t))$ of the velocity vector in the direction parallel to the occluding boundary to reduce the absolute value of the function $g_t^o(x,y,t,\tilde{u}^o,\tilde{v}^o)$. This, in turn, may increase the values of the functions $\|\nabla \tilde{u}^o(x,y,t)\|$ and $\|\nabla \tilde{v}^o(x,y,t)\|$.

2. The estimate $(\tilde{u}^o(x,y,t),\tilde{v}^o(x,y,t))$ may diverge as the result of nonlinearity of the optical flow constraint or as the result of the noise present in the images.

The directional smoothness constraints $(s,\nabla \tilde{u}^o(x,y,t))$ and $(s,\nabla \tilde{v}^o(x,y,t))$ in the direction $s \in S$ are represented in the system of nonlinear equations (4-19) by the expression $$\frac{\sqrt{(s, \nabla \tilde{u}^\sigma(x, y, t))^2 + (s, \nabla \tilde{v}^\sigma(x, y, t))^2}}{a^2 + (c^2 + b^2(s, \nabla' g_t^\sigma(x, y, t, \tilde{u}^\sigma, \tilde{v}^\sigma))^2)((s, \nabla \tilde{u}^\sigma(x, y, t))^2 + (s, \nabla \tilde{v}^\sigma(x, y, t))^2)}. \quad (4\text{-}25)$$

With respect to this expression the following cases can be considered:

1. The image point (x,y) does not cross the occluding boundary in the direction s. Then the value of the function $((s,\nabla \tilde{u}^o(x,y,t))^2+(s,\nabla \tilde{v}^o(x,y,t))^2)$ may become small. In this case the value of the function (4-25) would approach the value of the function $$\frac{\sqrt{(s, \nabla \tilde{u}^\sigma(x, y, t))^2 + (s, \nabla \tilde{v}^\sigma(x, y, t))^2}}{a^2}. \quad (4\text{-}26)$$

This, in turn, would make each of the two summands of the system of nonlinear equations (4-19), one associated with the directional smoothness constraint $(s,\nabla \tilde{u}^o(x,y,t))$, and the other associated with the directional smoothness constraint $(s,\nabla \tilde{v}^o(x,y,t))$, behave as a linear function of the corresponding constraint with proportionality coefficient equal to the constant value $1/a^2$.

2. The image point (x,y) approaches the occluding boundary in the direction s. Then the value of the function $((s,\nabla \tilde{u}^o(x,y,t))^2+(s,\nabla \tilde{v}^o(x,y,t))^2)$ may increase. In the case when the value of the function $((s,\nabla \tilde{u}^o(x,y,t))^2+(s,\nabla \tilde{v}^o(x,y,t))^2)$ is less than the value of the function $a^2/(c^2+b^2(s,\nabla'g_t^o(x,y,t,\tilde{u}^o,\tilde{v}^o))^2)$, the fact that the summand of the quadratic form (4-21) associated with the directional smoothness constraints $(s,\nabla \tilde{u}^o(x,y,t))$ and $(s,\nabla \tilde{v}^o(x,y,t))$ is positive implies that the function (4-25) would increase. In the case when the value of the function $((s,\nabla \tilde{u}^o(x,y,t))^2+(s,\nabla \tilde{v}^o(x,y,t))^2)$ is greater than the value of the function $a^2/(c^2+b^2(s,\nabla'g_t^o(x,y,t,\tilde{u}^o,\tilde{v}^o))^2)$, the fact that the summand of the quadratic form (4-21) associated with the directional smoothness constraints $(s,\nabla \tilde{u}^o(x,y,t))$ and $(s,\nabla \tilde{v}^o(x,y,t))$ is negative implies that the function (4-25) would decrease. Therefore, the function (4-25) achieves its maximal value $$\frac{1}{2a\sqrt{c^2 + b^2(s, \nabla' g_t^\sigma(x, y, t, \tilde{u}^\sigma, \tilde{v}^\sigma))^2}} \quad (4\text{-}27)$$

when the value of the function $((s,\nabla \tilde{u}^o(x,y,t))^2+(s,\nabla \tilde{v}^o(x,y,t))^2)$ is equal to the value of the function $a^2/(c^2+b^2(s,\nabla'g_t^o(x,y,t,\tilde{u}^o,\tilde{v}^o))^2)$.

In the case when the values of some of the functions $(s,\nabla'g_t^o(x,y,t,\tilde{u}^o,\tilde{v}^o))$, $g_t \in G_t$ are large the following values are reduced: the maximal value of the function (4-25) specified by the relation (4-27), the value $a^2/(c^2+b^2(s,\nabla'g_t^o(x,y,t,\tilde{u}^o,\tilde{v}^o))^2)$ of the function $((s,\nabla \tilde{u}^o(x,y,t))^2+(s,\nabla \tilde{v}^o(x,y,t))^2)$ where this maximal value is achieved. Such an action reflects the fact that in this case the image point (x,y) is likely to cross the occluding boundary in the direction s if the value of the function $((s,\nabla \tilde{u}^o(x,y,t))^2+(s,\nabla \tilde{v}^o(x,y,t))^2)$ specifying the degree of the smoothness of the estimate of the velocity vector field in such a direction s is large.

As has been stated earlier the role of the regularization constraint is to discriminate between the parametric vector fields $(\tilde{u},\tilde{v})$ giving the same optimal values to the weighted average of the optical flow and the directional smoothness constraints without causing any significant changes in these values. This is achieved by assigning a small value to the parameter $\gamma$ appearing in the system of nonlinear equations (4-19). For the sake of simplicity of the analysis given below, we shall ignore the regularization constraint by assuming that the parameter $\gamma$ is equal to zero while keeping in mind that the solution of the system of nonlinear equations (4-19) is locally unique.

Taking the above into account, the process of solving the system of nonlinear equations (4-19) described in the next section can be regarded as an attempt to achieve an equal balance between the functions representing two antagonistic sets of constraints: optical flow constraints and directional smoothness constraints. This, in part, is the consequence of the fact that the quadratic form arising from the linearization (5-16) of the system of nonlinear equations (4-19) described in the next section is positive definite.

It is not difficult to see that by increasing the values of the parameters $r^2,p^2,q^2$ appearing in the relation (4-12), we decrease the values of the weight functions $\alpha_{g_t}^o(x,y,t,\tilde{u}^o,\tilde{v}^o,\|\nabla \tilde{u}^o\|,\|\nabla \tilde{v}^o\|)$, $g_t \in G_t$. This would shift the balance in the system of nonlinear equations (4-19) toward the directional smoothness constraints. To restore the equal balance between the optical flow and the directional smoothness constraints the system of nonlinear equations (4-19) would react in such a way that the absolute values of the functions $(s,\nabla \tilde{u}^\sigma(x,y,t))$, $(s,\nabla \tilde{v}^\sigma(x,y,t))$, $s \in S$ corresponding to the directional smoothness constraints are reduced, while the absolute values of the functions $g_t^\sigma(x,y,t,\tilde{u}^\sigma,\tilde{v}^\sigma)$, $g_t \in G_t$ corresponding to the optical flow constraints are increased. Likewise, by increasing the values of the parameters $a^2, c^2, b_{g_t}^2, g_t \in G_t$ appearing in the relation (4-13), we decrease the values of the weight functions $\beta_s^\sigma(x,y,t,\tilde{u}^\sigma,\tilde{v}^\sigma,(s,\nabla \tilde{u}^\sigma),(s,\nabla \tilde{v}^\sigma))$, $s \in S$. This, in turn, would shift the balance in the system of nonlinear equations (4-19) toward the optical flow constraints. To restore equal balance between the optical flow and the directional smoothness constraints the system of nonlinear equations (4-19) would react in the way that would reduce the absolute values of the functions $g_t^\sigma(x,y,t,\tilde{u}^\sigma,\tilde{v}^\sigma)$, $g_t \in G_t$ corresponding to the optical flow constraints and would increase the absolute values of the functions $(s,\nabla \tilde{u}^\sigma(x,y,t))$, $(s,\nabla \tilde{v}^\sigma(x,y,t))$, $s \in S$ corresponding to the directional smoothness constraints.

Taking into account the earlier discussion related to the behavior of the optical flow and the directional smoothness constraints, we can conclude the following. The parameters $r^2$ and $a^2$ have their greatest impact on the solution of the system of nonlinear equations (4-19) at the image points that are away from the occluding boundary, while the parameters $p^2, q^2, c^2, b_{g_t}^2, g_t \in G_t$ mostly influence the solution at the image points that are near the occluding boundary. The parameter $r^2$ defines the coefficient of proportionality for the functions $g_t^\sigma(x,y,t,\tilde{u}^\sigma,\tilde{v}^\sigma)$, $g_t \in G_t$ specifying the optical flow constraints, while the parameter $a^2$ determines the proportionality coefficient for the functions $(s,\nabla \tilde{u}^\sigma(x,y,t))$, $(s,\nabla \tilde{v}^\sigma(x,y,t))$, $s \in S$ specifying the directional smoothness constraints. The combination (4-24) of the parameters $r^2, p^2,$ and $q^2$ determines the upper limit for the influence of the optical flow constraints on the solution of the system of nonlinear equations (4-19), while the combination (4-27) of the parameters $a^2, c^2,$ and $b_{g_t}^2, g_t \in G_t$ determines the upper limit for the influence of the directional smoothness constraints on the solution of the system of nonlinear equations (4-19).

Earlier the estimate $\{(\tilde{u}^\sigma(x,y,t), \tilde{v}^\sigma(x,y,t)) | (x,y) \in \Omega, \sigma \in [1,\infty)\}$ of the parametric velocity vector field $\{(u^\sigma(x,y,t), v^\sigma(x,y,t)) | (x,y) \in \Omega, \sigma \in [1,\infty)\}$ was defined as a solution of the system of nonlinear equations (4-19), which can be expressed in the following form:

$$\int_{G_t} \frac{\tilde{g}_{t\tilde{u}}^\sigma \tilde{g}_t^\sigma d\,g_t}{r^2 + (p^2 + q^2(\|\nabla \tilde{u}^\sigma\|^2 + \|\nabla \tilde{v}^\sigma\|^2))(\tilde{g}_t^\sigma)^2} - \qquad (5\text{-}1)$$

$$\int_S \left( s, \nabla \frac{(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) ds -$$

$$\gamma \frac{\partial}{\partial \sigma} \tilde{u}^\sigma = 0,$$

$$\int_{G_t} \frac{\tilde{g}_{t\tilde{v}}^\sigma \tilde{g}_t^\sigma d\,g_t}{r^2 + (p^2 + q^2(\|\nabla \tilde{u}^\sigma\|^2 + \|\nabla \tilde{v}^\sigma\|^2))(\tilde{g}_t^\sigma)^2} -$$

$$\int_S \left( s, \nabla \frac{(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) ds -$$

$$\gamma \frac{\partial}{\partial \sigma} \tilde{v}^\sigma = 0.$$

Here, for the sake of compactness of the notation, the arguments of the functions appearing in the system of nonlinear equations (4–19) have been omitted. Also, the symbols $\tilde{g}_t^\sigma, \tilde{g}_{t\tilde{u}}^\sigma, \tilde{g}_{t\tilde{v}}^\sigma, \tilde{g}_t^\sigma$ have been used instead of the symbols $g_t^\sigma, g_{t\tilde{u}}^\sigma, g_{t\tilde{v}}^\sigma, g_t^\sigma$ to indicate that at every image point $(x,y) \in \Omega$ the corresponding functions depend on the estimate $(\tilde{u}^\sigma(x,y,t), \tilde{v}^\sigma(x,y,t))$ of the velocity vector $(u^\sigma(x,y,t), v^\sigma(x,y,t))$.

To compute the estimate of the parametric velocity vector field $\{(\tilde{u}^\sigma(x,y,t), \tilde{v}^\sigma(x,y,t)) | (x,y) \in \Omega, \sigma \in [1,\infty)\}$ a restriction is imposed ourselves to a finite subset $\sigma_1, \ldots, \sigma_n$ of the parameter values from the interval $[1,\infty)$. Let $\sigma_0$ be the parameter with the value equal to $\infty$. Suppose that the value of the parameter $\sigma_n$ is equal to 1; and that the sequence of the parameters $\sigma_0, \sigma_1, \ldots, \sigma_n$ is not too sparse, and is decreasing in values. Then the estimate of the parametric velocity vector field $\{(\tilde{u}^\sigma(x,y,t), \tilde{v}^\sigma(x,y,t)) | (x,y) \in \Omega, \sigma = \sigma_1, \ldots, \sigma_n\}$ is obtained by successively solving the system of nonlinear equations (5-1) for each value of the parameter of $\sigma = \sigma_1, \ldots, \sigma_n$, starting with the parameter value $\sigma = \sigma_0$ where the solution is identically equal to a given vector constant $(\tilde{u}^\infty, \tilde{v}^\infty)$, and proceeding in the direction decreasing with respect to the parameter values using the solution of the system of nonlinear equations (5-1) obtained for the preceding parameter value as the initial estimate.

Let $\delta(\sigma)$ be a function of the parameter $\sigma$ defined on the set of the parameter values $\sigma = \sigma_1, \ldots, \sigma_n$ by the following relation:

$$\delta(\sigma_i) = \sigma_{i-1}, \, i=1, \ldots, n. \qquad (5\text{-}2)$$

If the weight constants $\gamma^\sigma, \sigma = \sigma_1, \ldots, \sigma_n$ are defined as in the relation $$\gamma = \gamma^\sigma(\delta(\sigma) - \sigma), \qquad (5\text{-}3)$$

then the regularization constraints $$-\gamma \frac{\partial}{\partial \sigma} \tilde{u}^\sigma(x,y,t) \text{ and } -\gamma \frac{\partial}{\partial \sigma} \tilde{v}^\sigma(x,y,t)$$

can, respectively, be approximated as $$-\gamma \frac{\partial}{\partial \sigma} \tilde{u}^\sigma(x,y,t) \approx \gamma^\sigma(\tilde{u}^\sigma(x,y,t) - \tilde{u}^{\delta(\sigma)}(x,y,t)), \qquad (5\text{-}4)$$

$$-\gamma \frac{\partial}{\partial \sigma} \tilde{v}^\sigma(x,y,t) \approx \gamma^\sigma(\tilde{v}^\sigma(x,y,t) - \tilde{v}^{\delta(\sigma)}(x,y,t)), \qquad (5\text{-}5)$$

for every image point $(x,y) \in \Omega$, and for every parameter value $\sigma = \sigma_1, \ldots, \sigma_n$. Under these conditions the system of nonlinear equations (5-1) of the unknown estimate of the parametric velocity vector field $\{(\tilde{u}^\sigma(x,y,t), \tilde{v}^\sigma(x,y,t)) | (x,y) \in \Omega, \sigma = \sigma_1, \ldots, \sigma_n\}$ takes the form $$\int_{G_t} \frac{\tilde{g}_{t\tilde{u}}^\sigma \tilde{g}_t^\sigma d\,g_t}{r^2 + (p^2 + q^2(\|\nabla \tilde{u}^\sigma\|^2 + \|\nabla \tilde{v}^\sigma\|^2))(\tilde{g}_t^\sigma)^2} - \qquad (5\text{-}6)$$

$$\int_S \left( s, \nabla \frac{(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) ds +$$

$$\gamma^\sigma(\tilde{u}^\sigma - \tilde{u}^{\delta(\sigma)}) = 0,$$

$$\int_{G_t} \frac{\tilde{g}_{t\tilde{v}}^\sigma \tilde{g}_t^\sigma d\,g_t}{r^2 + (p^2 + q^2(\|\nabla \tilde{u}^\sigma\|^2 + \|\nabla \tilde{v}^\sigma\|^2))(\tilde{g}_t^\sigma)^2} -$$

$$\int_S \left( s, \nabla \frac{(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) ds +$$

-continued $$\gamma^\sigma(\tilde{v}^\sigma - \tilde{v}^{\delta(\sigma)}) = 0.$$

Then the computational process for estimating the parametric velocity vector field can be more precisely described as follows: for every parameter value $\sigma=\sigma_1, \ldots, \sigma_n$, using the previously obtained estimate $\{(\tilde{u}^{\delta(\sigma)}(x,y,t), \tilde{v}^{\delta(\sigma)}(x,y,t))|(x,y)\in\Omega\}$ of the velocity vector field corresponding to the parameter value $\delta(\sigma)$ as the initial estimate, find the estimate $\{(\tilde{u}^\sigma(x,y,t),\tilde{v}^\sigma(x,y,t))|(x,y)\in\Omega\}$ of the velocity vector field corresponding to the parameter value $\sigma$ that is the closest to the initial estimate by solving the system of nonlinear equations (5-6).

For a fixed value of the parameter $\sigma=\sigma_1, \ldots, \sigma_n$, the system of nonlinear equations (5-6) relative to the unknown estimate $(\tilde{u}^\sigma,\tilde{v}^\sigma)\equiv\{(\tilde{u}^\sigma(x,y,t),\tilde{v}^\sigma(x,y,t))|(x,y)\in\Omega\}$ of the velocity vector field corresponding to the parameter value $\sigma$, defines, for every image point $(x,y)\in\Omega$, a set of relations between the components of the velocity vector $(\tilde{u}^\sigma(x,y,t), \tilde{v}^\sigma(x,y,t))$ and its partial derivatives, which can be expressed in the form $$F^\sigma(\tilde{u}^\sigma,\tilde{v}^\sigma)=0. \qquad (5-7)$$

To find the estimate $(\tilde{u}^\sigma,\tilde{v}^\sigma)$ of the velocity vector field corresponding to the parameter value $\sigma$ as an estimate of the solution of the system of nonlinear equations (5-6) corresponding to the parameter value $\sigma$ that is the closest to the initial estimate $(\tilde{u}^{\delta(\sigma)},\tilde{v}^{\delta(\sigma)})$ the iterative updating scheme can be used. In this scheme, starting with the initial estimate $(\tilde{u}^{\delta(\sigma)},\tilde{v}^{\delta(\sigma)})$, which is taken as the current estimate $(\tilde{u}^\sigma,\tilde{v}^\sigma)$ of the solution of the system of nonlinear equations (5-6) corresponding to the parameter value $\sigma$, the improved estimate $(\tilde{u}_+^\sigma,\tilde{v}_+^\sigma)\equiv\{(\tilde{u}_+^\sigma(x,y,t),\tilde{v}_+^\sigma(x,y,t))|(x,y)\in\Omega\}$ of the solution of the system of nonlinear equations (5-6) corresponding to the parameter value $\sigma$ is determined by the step $$(\tilde{u}_+^\sigma,\tilde{v}_+^\sigma)=(\tilde{u}^\sigma,\tilde{v}^\sigma)+\omega(\Delta\tilde{u}^\sigma,\Delta\tilde{v}^\sigma), \qquad (5-8)$$

where the scalar parameter $\omega$ defines the length of the step, while the vector field $(\Delta\tilde{u}^\sigma,\Delta\tilde{v}^\sigma)\equiv\{(\Delta\tilde{u}^\sigma(x,y,t),\Delta\tilde{v}^\sigma(x,y,t))|(x,y)\in\Omega\}$ defines the direction of the step. The step length $\omega\in(0,1]$ is selected in such a way that the following function is minimized:

$$f^\sigma(\omega)=F^\sigma(\tilde{u}^\sigma+\tilde{\omega}\Delta\tilde{u}^\sigma,\tilde{v}^\sigma+\tilde{\omega}\Delta\tilde{v}^\sigma)^T F^\sigma(\tilde{u}^\sigma+\tilde{\omega}\Delta\tilde{u}^\sigma,\tilde{v}^\sigma+\tilde{\omega}\Delta\tilde{v}^\sigma). \qquad (5-9)$$

The step direction $(\Delta\tilde{u}^\sigma,\Delta\tilde{v}^\sigma)$ is selected in such a way that the function (5-9) becomes steadily decreasing for sufficiently small values of $\omega\in(0,1]$. The improved estimate $(\tilde{u}_+^\sigma, \tilde{v}_+^\sigma)$ is taken as the current estimate $(\tilde{u}^\sigma,\tilde{v}^\sigma)$ of the solution of the system of nonlinear equations (5-6) corresponding to the parameter value $\sigma$, and the step (5-8) of the iterative updating scheme is repeated to determine the next improved estimate $(\tilde{u}_+^\sigma,\tilde{v}_+^\sigma)$ of the solution of the system of nonlinear equations (5-6) corresponding to the parameter value $\sigma$. This process is continued until the appropriate criteria are met, in which case the improved estimate $(\tilde{u}_+^{94},\tilde{v}_+^\sigma)$ is taken as the estimate $(\tilde{u}^\sigma,\tilde{v}^\sigma)$ of the velocity vector field corresponding to the parameter value $\sigma$.

If the vector field $(\Delta\tilde{u}^\sigma,\Delta\tilde{v}^\sigma)$ is not too large, then in the neighborhood of the vector field $(\tilde{u}^\sigma,\tilde{v}^\sigma)$ the nonlinear operator $F^\sigma$ can be linearly expanded as $$F^\sigma(\tilde{u}^\sigma+\Delta\tilde{u}^\sigma,\tilde{v}^\sigma+\Delta\tilde{v}^\sigma)\approx F^\sigma(\tilde{u}^\sigma,\tilde{v}^\sigma)+J^\sigma(\tilde{u}^\sigma,\tilde{v}^\sigma,\Delta\tilde{u}^\sigma,\Delta\tilde{v}^\sigma). \qquad (5-10)$$

Here the linear and bounded with respect to the vector field $(\Delta\tilde{u}^\sigma,\Delta\tilde{v}^\sigma)$ operator $J^\sigma(\tilde{u}^\sigma,\tilde{v}^\sigma,\Delta\tilde{u}^\sigma,\Delta\tilde{v}^\sigma)$ is the Jacobian of the nonlinear operator $F^\sigma(\tilde{u}^\sigma,\tilde{v}^\sigma)$. The operator $J^\sigma(\tilde{u}^\sigma,\tilde{v}^\sigma,\Delta\tilde{u}^\sigma,\Delta\tilde{v}^\sigma)$ can be more conveniently expressed in the form $$J^\sigma(\tilde{u}^\sigma,\tilde{v}^\sigma,\Delta\tilde{u}^\sigma,\Delta\tilde{v}^\sigma)\equiv J^\sigma(\tilde{u}^\sigma,\tilde{v}^\sigma)(\Delta\tilde{u}^\sigma,\Delta\tilde{v}^\sigma). \qquad (5-11)$$

In the Newton method [22] the vector field $(\Delta\tilde{u}^\sigma,\Delta\tilde{v}^\sigma)$ is defined as a solution of the system of linear equations $$J^\sigma(\tilde{u}^\sigma,\tilde{v}^\sigma)(\Delta\tilde{u}^\sigma,\Delta\tilde{v}^\sigma)=-F^\sigma(\tilde{u}^\sigma,\tilde{v}^\sigma). \qquad (5-12)$$

Then the improved estimate $(\tilde{u}_+^\sigma,\tilde{v}_+^\sigma)$ of the solution of the system of nonlinear equations (5-6) is defined as in the relation (5-8) where the scalar parameter $\omega$ is taken to be equal to 1.

The improved estimate $(\tilde{u}_+^\sigma,\tilde{v}_+^\sigma)$ of the solution of the system of nonlinear equations (5-6), which is obtained as the result of solving the system of linear equations (5-12) and then applying the relation (5-8), is not necessarily a better estimate. The reason behind it comes from the fact that the Jacobian $J^\sigma(\tilde{u}^\sigma,\tilde{v}^\sigma)$ of the nonlinear operator $F^\sigma(\tilde{u}^\sigma,\tilde{v}^\sigma)$ is nonsymmetric and ill-conditioned, so that the system of linear equations (5-12) cannot be reliably solved for the vector field $(\Delta\tilde{u}^\sigma,\Delta\tilde{v}^\sigma)$. The last is the consequence of the fact that the regularization constraints can only be effective in resolving the ambiguities of the system of nonlinear equations (5-6) at the image points that are beyond the occluding boundaries where the quadratic form appearing in the relation (4-21) is positive definite. The regularization constraints become ineffective in resolving the ambiguities of the system of nonlinear equations (5-6) at the image points that are near the occluding boundaries where the quadratic form appearing in the relation (4-21) is not positive definite. This observation suggests that an alternative method should be employed.

In the quasi-Newton method of solving the system of nonlinear equations (5-6) the system of linear equations (5-12) is replaced with the system of linear equations $$M^\sigma(\tilde{u}^\sigma,\tilde{v}^\sigma)(\Delta\tilde{u}^\sigma,\Delta\tilde{v}^\sigma)=-F^\sigma(\tilde{u}^\sigma,\tilde{v}^\sigma), \qquad (5-13)$$

which combines the globally convergent strategy of the well-conditioned method with the fast local strategy of the Newton method in a way that derives the benefits of both. This quasi-Newton method defines the regularization of the system of nonlinear equations (5-6) that is meaningful for the problem of estimating the parametric velocity vector field. The linear and bounded with respect to the vector field $(\Delta\tilde{u}^\sigma,\Delta\tilde{v}^\sigma)$ operator $M^\sigma(\tilde{u}^\sigma,\tilde{v}^\sigma)(\Delta\tilde{u}^\sigma,\Delta\tilde{v}^\sigma)$ is the approximation to the Jacobian $J^\sigma(\tilde{u}^\sigma,\tilde{v}^\sigma)(\Delta\tilde{u}^\sigma,\Delta\tilde{v}^\sigma)$ of the nonlinear operator $F^\sigma(\tilde{u}^\sigma,\tilde{v}^\sigma)$ defined as follows.

Let $F_\theta^\sigma(\tilde{u}^\sigma,\tilde{v}^\sigma,\hat{u}^\sigma,\hat{v}^\sigma)$, $\theta\in[0,1]$, be a family of nonlinear operators of the invariable copy $(\tilde{u}^\sigma,\tilde{v}^\sigma)$ and of the variable copy $(\hat{u}^\sigma,\hat{v}^\sigma)$ of the estimate of the velocity vector field corresponding to the parameter value $\sigma$ defined by the relation $$\int_{G_t} \frac{\tilde{g}^\sigma_{t\tilde{u}} \tilde{g}^\sigma_t d\, g_t}{(r^2 + (p^2 + q^2(\|\nabla \tilde{u}^\sigma\|^2 + \|\nabla \tilde{v}^\sigma\|^2))(\tilde{g}^\sigma_t)^2)^{1-\theta}(r^2 + (p^2 + q^2(\|\nabla \tilde{u}^\sigma\|^2 + \|\nabla \tilde{v}^\sigma\|^2))(\hat{g}^\sigma_t)^2)^\theta} + \gamma^\sigma\left(\hat{u}^\sigma - \tilde{u}^{\delta(\sigma)}\right) - \quad (5\text{-}14)$$

$$\int_S \left(s, \nabla \frac{(s, \nabla \hat{u}^\sigma)}{(a^2 + (c^2 + b^2(s, \nabla' \tilde{g}^\sigma_t)^2)((s, \nabla \tilde{u}^\sigma)^2 + (s, \nabla \tilde{v}^\sigma)^2))^{1-\theta}(a^2 + (c^2 + b^2(s, \nabla' \tilde{g}^\sigma_t)^2)((s, \nabla \tilde{u}^\sigma)^2 + (s, \nabla \tilde{v}^\sigma)^2))^\theta}\right) ds,$$

$$\int_{G_t} \frac{\tilde{g}^\sigma_{t\tilde{v}} \tilde{g}^\sigma_t d\, g_t}{(r^2 + (p^2 + q^2(\|\nabla \tilde{u}^\sigma\|^2 + \|\nabla \tilde{v}^\sigma\|^2))(\tilde{g}^\sigma_t)^2)^{1-\theta}(r^2 + (p^2 + q^2(\|\nabla \tilde{u}^\sigma\|^2 + \|\nabla \tilde{v}^\sigma\|^2))(\hat{g}^\sigma_t)^2)^\theta} + \gamma^\sigma\left(\hat{v}^\sigma - \tilde{v}^{\delta(\sigma)}\right) -$$

$$\int_S \left(s, \nabla \frac{(s, \nabla \hat{v}^\sigma)}{(a^2 + (c^2 + b^2(s, \nabla' \tilde{g}^\sigma_t)^2)((s, \nabla \tilde{u}^\sigma)^2 + (s, \nabla \tilde{v}^\sigma)^2))^{1-\theta}(a^2 + (c^2 + b^2(s, \nabla' \tilde{g}^\sigma_t)^2)((s, \nabla \tilde{u}^\sigma)^2 + (s, \nabla \tilde{v}^\sigma)^2))^\theta}\right) ds,$$

where the symbols $\tilde{g}_t^\sigma, \tilde{g}_{t\tilde{u}}^\sigma, \tilde{g}_{t\tilde{v}}^\sigma, \tilde{g}_t^\sigma$ are used to indicate that at every image point $(x,y)\in\Omega$ the corresponding functions depend on the invariable copy $(\tilde{u}^\sigma(x,y,t),\tilde{v}^\sigma(x,y,t))$ of the estimate of the velocity vector $(u^\sigma(x,y,t),v^\sigma(x,y,t))$, while the symbol $\hat{g}_t^\sigma$ is used to indicate that at every image point $(x,y)\in\Omega$ the corresponding function depends on the variable copy $(\hat{u}^\sigma(x,y,t),\hat{v}^\sigma(x,y,t))$ of the estimate of the velocity vector $(u^\sigma(x,y,t),v^\sigma(x,y,t))$. If the variable copy $(\hat{u}^\sigma,\hat{v}^\sigma)$ of the estimate of the velocity vector field is identically equal to the invariable copy $(\tilde{u}^\sigma,\tilde{v}^\sigma)$ of the estimate of the velocity vector field, then for every $\theta\in[0,1]$ the nonlinear operator $F_\theta^\sigma(\tilde{u}^\sigma, \tilde{v}^\sigma,\hat{u}^\sigma,\hat{v}^\sigma)$ is identically equal to the nonlinear operator $F^\sigma(\tilde{u}^\sigma,\tilde{v}^\sigma)$. The parameter $\theta$ defines the degree of the feedback relaxation of the optical flow and the directional smoothness constraints through the variable copy $(\hat{u}^\sigma,\hat{v}^\sigma)$ of the estimate of the velocity vector field.

Let $M_\theta^\sigma(\tilde{u}^\sigma,\tilde{v}^\sigma)(\Delta\tilde{u}^\sigma,\Delta\tilde{v}^\sigma)$, $\theta\in[0,1]$ be a family of the linear and bounded with respect to the vector field $(\Delta\tilde{u}^\sigma,\Delta\tilde{v}^\sigma)$ operators, where for each $\theta\in[0,1]$ the operator $M_\theta^\sigma(\tilde{u}^\sigma,\tilde{v}^\sigma)(\Delta\tilde{u}^\sigma,\Delta\tilde{v}^\sigma)$ is the Jacobian of the nonlinear operator $F_\theta^\sigma(\tilde{u}^\sigma,\tilde{v}^\sigma,\hat{u}^\sigma,\hat{v}^\sigma)$, considered as the function of the vector field $(\hat{u}^\sigma,\hat{v}^\sigma)$, and depending on the vector field $(\tilde{u}^\sigma,\tilde{v}^\sigma)$ as on the parameter, under the conditions that the vector field $(\hat{u}^\sigma,\hat{v}^\sigma)$ is identically equal to the vector field $(\tilde{u}^\sigma,\tilde{v}^\sigma)$. Then the operator $M^\sigma(\tilde{u}^\sigma,\tilde{v}^\sigma)(\Delta\tilde{u}^\sigma,\Delta\tilde{v}^\sigma)$ is defined as the member of the family $M_\theta^\sigma(\tilde{u}^\sigma,\tilde{v}^\sigma)(\Delta\tilde{u}^\sigma,\Delta\tilde{v}^\sigma)$, $\theta\in[0,1]$ satisfying the following requirements:

1. As a part of the globally convergent strategy, the vector field $(\Delta\tilde{u}^\sigma,\Delta\tilde{v}^\sigma)$ obtained as the solution of the system of linear equations (5-13) is required to be a descent direction for the functional $h(\tilde{u}^\sigma,\tilde{v}^\sigma,\hat{u}^\sigma,\hat{v}^\sigma)$, considered as the function of the vector field $(\hat{u}^\sigma,\hat{v}^\sigma)$, and depending on the vector field $(\tilde{u}^\sigma,\tilde{v}^\sigma)$ as on the parameter, under the conditions that the vector field $(\hat{v}^\sigma,\hat{v}^\sigma)$ be identically equal to the vector field $(\tilde{u}^\sigma,\tilde{v}^\sigma)$. In other words, the first-order partial with respect to the variable $\omega$ derivative of the functional $h(\tilde{u}^\sigma,\tilde{v}^\sigma,\tilde{u}^\sigma+\omega\Delta\tilde{u}^\sigma, \tilde{v}^\sigma+\omega\Delta\tilde{v}^\sigma)$ considered as the function of the scalar variable $\omega$ is required to be negative when the value of such variable $\omega$ is equal to 0. It is not difficult to see that the value of this derivative is equal to $$-F^\sigma(\tilde{u}^\sigma,\tilde{v}^\sigma)^T M^\sigma(\tilde{u}^\sigma,\tilde{v}^\sigma)^{-1} F^\sigma(\tilde{u}^\sigma,\tilde{v}^\sigma). \qquad (5\text{-}15)$$

The requirement for the functional (5-15) to be negative can be satisfied by in turn requiring the operator $M^\sigma(\tilde{u}^\sigma,\tilde{v}^\sigma)(\Delta\tilde{u}^\sigma,\Delta\tilde{v}^\sigma)$ to be positive definite.

2. As a part of the fast local strategy, the operator $M^\sigma(\tilde{u}^\sigma,\tilde{v}^\sigma)(\Delta\tilde{u}^\sigma,\Delta\tilde{v}^\sigma)$ is required to be the nearest possible approximation to the Jacobian $J^\sigma(\tilde{u}^\sigma,\tilde{v}^\sigma)(\Delta\tilde{u}^\sigma, \Delta\tilde{v}^\sigma)$ of the nonlinear operator $F^\sigma(\tilde{u}^\sigma,\tilde{v}^\sigma)$.

The operator $M_\theta^\sigma(\tilde{u}^\sigma,\tilde{v}^\sigma)(\Delta\tilde{u}^\sigma,\Delta\tilde{v}^\sigma)$ from the family corresponding to the parameter value $\theta=0.5$ satisfies the above requirements and is taken as the operator $M^\sigma(\tilde{u}^\sigma,\tilde{v}^\sigma)(\Delta\tilde{u}^\sigma,\Delta\tilde{v}^\sigma)$ appearing in the system of linear equations (5-13). With this choice of the operator $M^\sigma(\tilde{u}^\sigma,\tilde{v}^\sigma)(\Delta\tilde{u}^\sigma,\Delta\tilde{v}^\sigma)$ the system of linear equations (5-13) has the following explicit form $$\int_{G_t} \frac{r^2 (\tilde{g}_{\tilde{t}\tilde{u}}^\sigma)^2 \Delta \tilde{u}^\sigma d\, g_t}{(r^2 + (p^2 + q^2(\|\nabla \tilde{u}^\sigma\|^2 + \|\nabla \tilde{v}^\sigma\|^2))(\tilde{g}_t^\sigma)^2)^2} - \qquad (5\text{-}16)$$

$$\iint_S \left( s, \nabla \frac{(a^2 + (c^2 + b^2(s, \nabla' \tilde{g}_t^\sigma)^2)(s, \nabla \tilde{v}^\sigma)^2)(s, \nabla(\Delta \tilde{u}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} \right) d\,s +$$

$$\int_{G_t} \frac{r^2 \tilde{g}_{\tilde{t}\tilde{u}}^\sigma \tilde{g}_{\tilde{t}\tilde{v}}^\sigma \Delta \tilde{v}^\sigma d\, g_t}{(r^2 + (p^2 + q^2(\|\nabla \tilde{u}^\sigma\|^2 + \|\nabla \tilde{v}^\sigma\|^2))(\tilde{g}_t^\sigma)^2)^2} +$$

$$\iint_S \left( s, \nabla \frac{(c^2 + b^2(s, \nabla' \tilde{g}_t^\sigma)^2)(s, \nabla \tilde{u}^\sigma)(s, \nabla \tilde{v}^\sigma)(s, \nabla(\Delta \tilde{v}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} \right) d\,s + \gamma^\sigma \Delta \tilde{u}^\sigma =$$

$$\int_{G_t} \frac{-\tilde{g}_{\tilde{t}\tilde{u}}^\sigma \tilde{g}_t^\sigma d\, g_t}{r^2 + (p^2 + q^2(\|\nabla \tilde{u}^\sigma\|^2 + \|\nabla \tilde{v}^\sigma\|^2))(\tilde{g}_t^\sigma)^2} +$$

$$\iint_S \left( s, \nabla \frac{(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) d\,s$$

$$\int_{G_t} \frac{r^2 (\tilde{g}_{\tilde{t}\tilde{v}}^\sigma)^2 \Delta \tilde{v}^\sigma d\, g_t}{(r^2 + (p^2 + q^2(\|\nabla \tilde{u}^\sigma\|^2 + \|\nabla \tilde{v}^\sigma\|^2))(\tilde{g}_t^\sigma)^2)^2} -$$

$$\iint_S \left( s, \nabla \frac{(a^2 + (c^2 + b^2(s, \nabla' \tilde{g}_t^\sigma)^2)(s, \nabla \tilde{u}^\sigma)^2)(s, \nabla(\Delta \tilde{v}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} \right) d\,s +$$

$$\int_{G_t} \frac{r^2 \tilde{g}_{\tilde{t}\tilde{u}}^\sigma \tilde{g}_{\tilde{t}\tilde{v}}^\sigma \Delta \tilde{u}^\sigma d\, g_t}{(r^2 + (p^2 + q^2(\|\nabla \tilde{u}^\sigma\|^2 + \|\nabla \tilde{v}^\sigma\|^2))(\tilde{g}_t^\sigma)^2)^2} +$$

$$\iint_S \left( s, \nabla \frac{(c^2 + b^2(s, \nabla' \tilde{g}_t^\sigma)^2)(s, \nabla \tilde{u}^\sigma)(s, \nabla \tilde{v}^\sigma)(s, \nabla(\Delta \tilde{u}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} \right) d\,s + \gamma^\sigma \Delta \tilde{v}^\sigma =$$

$$\int_{G_t} \frac{-\tilde{g}_{\tilde{t}\tilde{v}}^\sigma \tilde{g}_t^\sigma d\, g_t}{r^2 + (p^2 + q^2(\|\nabla \tilde{u}^\sigma\|^2 + \|\nabla \tilde{v}^\sigma\|^2))(\tilde{g}_t^\sigma)^2} +$$

$$\iint_S \left( s, \nabla \frac{(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} \right) d\,s$$

Next, the finite-difference discretizations of the system of nonlinear equations (5-6) as well as the system of linear equations (5-16) are considered. The method of constructing the estimate of the solution of the system of nonlinear equations (5-6) is extended to the finite-difference discretization of this system.

Although the theoretical analysis for the computation of the estimate of the parametric velocity vector field can be effectively performed in the case when the combined generalized initial image functions $\Gamma_g$, $g \in G$ are defined over the entire set of testing functions $\Phi(R^3)$, while the estimate $(\tilde{u}(x,y,t), \tilde{v}(x,y,t))$ of the velocity vector $(u,(x,y,t),v(x,y,t))$ is defined for every image point $(x,y) \in \Omega$ and for every time moment $t \in T$, the actual computation can only be accomplished on finite subsets of the above data sets. In this section a finite-difference discretization of the system of nonlinear equations (5-6) is described. The estimate of the parametric velocity vector field is then determined as a solution of the resulted system of a finite number of nonlinear equations.

Given a generalized function F defined on the locally convex linear topological space $\Phi(R^3)$, and given a testing function $\phi \in \Phi(R^3)$ the "convolution" of the generalized function F and the testing function $\phi$ is the infinitely differentiable function $(F*\phi)$ defined on the space $R^3$ by the relation $$(F*\phi)(x,y,t) = F(\phi_{x,y,t}), \quad \phi_{x,y,t}(\tilde{x},\tilde{y},\tilde{t}) \equiv \phi(x-\tilde{x}, y-\tilde{y}, t-\tilde{t}), \quad (\tilde{x},\tilde{y},\tilde{t}) \in R^3, \quad (6\text{-}1)$$

for every $(x,y,t) \in R^3$.

Let F be a generalized function, and let $\chi \in \Phi(R^3)$ be a given fixed non-negative testing function such that $$\iiint_{R^3} \chi(x, y, t) dx\, dy\, dt = 1.$$

For instance, take $$\chi(x, y, t) \equiv \psi(x, y, t) \bigg/ \iiint_{R^3} \psi(\tilde{x}, \tilde{y}, \tilde{t}) d\tilde{x}\, d\tilde{y}\, d\tilde{t}, \, (x, y, t) \in R^3$$

where $\psi$ is the function described later. The testing function $\chi$ will be called the "sampling function". Then the "regularization" of the generalized function F through the sampling function $\chi$ is defined on the space $R^3$ as the infinitely differentiable function $(F*\chi)$, which is obtained as the convolution of the generalized function F and the sampling function $\chi$.

Let $\{t'_k\}_{k=0}^{K'}$ be an increasing sequence of time moments containing the sequence of time moments $\{t''_k\}_{k=0}^{K''}$. Assume that for every $t \in \{t'_k\}_{k=0}^{K'}$ the regularizations $\gamma_{86} \equiv (\Gamma_\xi * \chi)$ of the generalized functions $\Gamma_\xi$ associated with the irradiance image functions $\xi$, $\xi \in \Xi$ through the sampling function $\chi$ and the regularizations $\gamma_\eta \equiv (\Gamma_\eta * \chi)$ of the generalized functions $\Gamma_\eta$ associated with the feature image functions $\eta$, $\eta \in H$ through the sampling function $\chi$ are given at the points (x,y) belonging to the following subset of the image plane:

$$R^2(h'_{\sigma,1}, h'_{\sigma,2}) = \{(x',y') | (x',y') = i_1 h'_{\sigma,1} + i_2 h'_{\sigma,2}, i_1, i_2 \in Z\}. \quad (6\text{-}2)$$

Here Z is the set of integers; $h'_{\sigma,1}$, $h'_{\sigma,2}$ are two dimensional real vectors; and $i_1 h'_{\sigma,1} + i_2 h'_{\sigma,2}$ is a linear combination of such vectors with integer coefficients $i_1$, $i_2$. The points from the subset $R^2(h'_{\sigma,1}, h'_{\sigma,2})$ will be called the "sampling points" corresponding to the parameter $\sigma$; the functions $\gamma_\xi$, $\xi \in \Xi$ will be called the "sampled irradiance image functions"; and the functions $\gamma_\eta$, $\eta \in H$ will be called the "sampled feature image functions".

The generalized functions $\Gamma_{\xi,\sigma}$ associated with the sampled irradiance image functions $\gamma_\xi$, $\xi \in \Xi$ and the generalized functions $\Gamma_{\eta,\sigma}$ associated with the sampled feature image functions $\gamma_\eta$, $\eta \in H$ are defined on the set of testing functions $\Phi(R^3)$ as follows. The value of the generalized function $\Gamma_{\xi,\sigma}$ associated with the sampled irradiance image function $\gamma_\xi$ at the testing function $\phi \in \Phi(R^3)$ is given by the relation $$\Gamma_{\xi,\sigma}(\phi) = \sum_{(x,y,t) \in R^2(h'_{\sigma,1}, h'_{\sigma,2}) \times \{t'_k\}_{k=0}^{K'}} \gamma_\xi(x, y, t) \phi(x, y, t). \quad (6\text{-}3)$$

The value of the generalized function $\Gamma_{\eta,\sigma}$ associated with the sampled feature image function $\gamma_\eta$ at the testing function $\phi \in \Phi(R^3)$ is given be the relation $$\Gamma_{\eta,\sigma}(\phi) = \sum_{(x,y,t) \in R^2(h'_{\sigma,1}, h'_{\sigma,2}) \times \{t'_k\}_{k=0}^{K'}} \gamma_\eta(x, y, t) \phi(x, y, t). \quad (6\text{-}4)$$

Let $\lambda \equiv \{\lambda_\xi, \lambda_\eta | \xi \in \Xi, \eta \in H\}$ be a set of real-valued constants; let $g(\lambda)$ be an index attached to the set $\lambda$; and let $m_{g(\lambda)} \equiv \{m_{\xi,x}, m_{\xi,y}, m_{\xi,t}, m_{\eta,x}, m_{\eta,y}, m_{\eta,t} | \xi \in \Xi, \eta \in H\}$ be a set of non-negative integer constants corresponding to the set of constants $\lambda$. Then the "combined generalized sampled image function" corresponding to the index $g \equiv g(\lambda)$ is the generalized function $\Gamma_{g,\sigma}$ defined on the locally convex linear topological space $\Phi(R^3)$. The value of the combined generalized sampled image function $\Gamma_{g,\sigma}$ at the testing function $\phi \in \Phi(R^3)$ is given by the relation $$\Gamma_{g,\sigma}(\phi) = \sum_{\xi \in \Xi} \lambda_\xi \frac{\partial^{m_{\xi,x} + m_{\xi,y} + m_{\xi,t}}}{\partial x^{m_{\xi,x}} \partial y^{m_{\xi,y}} \partial t^{m_{\xi,t}}} \Gamma_{\xi,\sigma}(\phi) + \quad (6\text{-}5)$$

$$\sum_{\eta \in H} \lambda_\eta \frac{\partial^{m_{\eta,x} + m_{\eta,y} + m_{\eta,t}}}{\partial x^{m_{\eta,x}} \partial y^{m_{\eta,y}} \partial t^{m_{\eta,t}}} \Gamma_{\eta,\sigma}(\phi)$$

and is called the "observation" of the combined generalized sampled image function $\Gamma_{g,\lambda}$ on the testing function $\phi$.

Assume the restriction to the case when each subset $R^2(h'_{\sigma,1}, h'_{\sigma,2})$, $\sigma = \sigma_0, \sigma_1, \ldots, \sigma_n$ is a square grid of points on the image plane. In other words, it is a requirement that the vectors $h'_{\sigma,1}$, $h'_{\sigma,2}$ are of equal length and are orthogonal to each other for every $\sigma = \sigma_0, \sigma_1, \ldots, \sigma_n$. Also, it is a requirement that such grids of points constitute a pyramid on the image plane which means that the following relation is satisfied:

$$R^2(h'_{\sigma_0,1}, h'_{\sigma_0,2}) \subset R^2(h'_{\sigma_1,1}, h'_{\sigma_1,2}) \subset \ldots \subset R^2(h'_{\sigma_n,1}, h'_{\sigma_n,2}). \quad (6\text{-}6)$$

The "grid rotation method" is the sampling method that complies with the above requirements. It is commonly used to obtain numerical solutions of partial differential equations. In this method the vectors $h'_{\sigma_0,1}$, $h'_{\sigma_0,2}$ are selected to be of equal length and orthogonal to each other; then for every $k=1, \ldots, n$ the vectors $h'_{\sigma_k,1}$, $h'_{\sigma_k,2}$ are defined as in the relations $$h'_{\sigma_k,1} = 0.5(h'_{\sigma_{k-1},1} + h'_{\sigma_{k-1},2}), \quad (6\text{-}7)$$

$$h'_{\sigma_k,2} = 0.5(h'_{\sigma_{k-1},1} - h'_{\sigma_{k-1},2}), \quad (6\text{-}8)$$

It is not difficult to see that the above defined vectors $h'_{\sigma_k,1}$, $h'_{\sigma_k,2}$ are of equal length and are orthogonal to each other for every $k=0, 1, \ldots, n$, and that the relation 6-6) is satisfied.

Let $\kappa'$ be a positive integer constant and $\psi \in \Phi(R^3)$ be a given measurement function. Then for every time moment $t \in \{t''_k\}_{k=0}^{K''}$, and for every parameter value $\sigma = \sigma_0, \sigma_1, \ldots, \sigma_n$ the image function $g^\sigma(x,y,t)$ and its spatial partial derivatives $g_x^\sigma(x,y,t)$, $g_y^\sigma(x,y,t)$ are defined on the set $\Omega$ as follows.

First, assume that the image point (x,y) belongs to the subset $\Omega''(h''_{\sigma,1}, h''_{\sigma,2}) \cap R^2(h''_{\sigma,1}, h''_{\sigma,2})$. Here the two-dimensional real vectors $h''_{\sigma,1}$, $h''_{\sigma,2}$ are defined as in the relations $$h''_{\sigma,1} = \kappa' h'_{\sigma,1}, \quad (6\text{-}9)$$

$$h''_{\sigma,2} = \kappa' h'_{\sigma,2}, \quad (6\text{-}10)$$

while the subset $\Omega''(h''_{\sigma,1}, h''_{\sigma,2}) \subset R^2$ is defined as in the relation $$\Omega''(h''_{\sigma,1}, h''_{\sigma,2}) = \bigcup_{\substack{-1.0 \leq \theta_1 \leq +1.0 \\ -1.0 \leq \theta_2 \leq +1.0}} \{(x, y) + \theta_1 h''_{\sigma,1} + \theta_2 h''_{\sigma,2} | (x, y) \in \Omega\}. \quad (6\text{-}11)$$

Then for every $g \in G$ the value of the component $g^\sigma(x,y,t)$ of the image function $g^\sigma(x,y,t)$ is determined as the observation $\Gamma_{g,\sigma}(\psi_{x,y,t}^\sigma)$ of the combined generalized sampled image function $\Gamma_{g,\sigma}$ on the testing function $\psi_{x,y,t}^\sigma$ defined by the relation (2-4); and the values of the components $g_x^\sigma(x,y,t)$, $g_y^\sigma(x,y,t)$ of the partial derivatives $g_x^\sigma(x,y,t)$, $g_y^\sigma(x,y,t)$ of the image function $g^\sigma(x,y,t)$ are given as the observations $$\Gamma_{g,\sigma}\left(\frac{\partial}{\partial x}\psi_{x,y,t}^\sigma\right), \Gamma_{g,\sigma}\left(\frac{\partial}{\partial y}\psi_{x,y,t}^\sigma\right)$$

of the combined generalized sampled image function $\Gamma_{g,\sigma}$ on the defined by the relations (2-5), (2-6) testing functions $$\frac{\partial}{\partial x}\psi_{x,y,t}^\sigma, \frac{\partial}{\partial y}\psi_{x,y,t}^\sigma \in \Phi(R^3).$$

Let (x,y) be any image point from the set $\Omega$, then for some integer numbers $i_1$, $i_2$ and for some real number $\theta_1$, $\theta_2$ from the interval [0,1] the following relation is satisfied:

$$(x,y) = (i_1 + \theta_1) h''_{\sigma,1} + (i_2 + \theta_2) h''_{\sigma,2}. \quad (6\text{-}12)$$

Then the values of the image function $g^\sigma(x,y,t)$ and its partial derivatives $g_x^\sigma(x,y,t)$, $g_y^\sigma(x,y,t)$ are obtained through the bilinear interpolations $$g^\sigma(x,y,t) = (1-\theta_2)((1-\theta_1)g^\sigma(x_{1,1},y_{1,1},t) + \theta_1 g^\sigma(x_{1,2},y_{1,2},t)) + \theta_2((1-\theta_1)g^\sigma(x_{2,1},y_{2,1},t) + \theta_1 g^\sigma(x_{2,2},y_{2,2},t)), \quad (6\text{-}13)$$

$$g_x^\sigma(x,y,t) = (1-\theta_2)((1-\theta_1)g_x^\sigma(x_{1,1},y_{1,1},t) + \theta_1 g_x^\sigma(x_{1,2},y_{1,2},t)) + \theta_2((1-$$

$$\theta_1)g_x^\sigma(x_{2,1},y_{2,1},t)+\theta_1 g_x^\sigma(x_{2,2},y_{2,2},t)), \tag{6-14}$$

$$g_y^\sigma(x,y,t)=(1-\theta_2)((1-\theta_1)g_y^\sigma(x_{1,1},y_{1,1},t)+\theta_1 g_y^\sigma(x_{1,2},y_{1,2},t))+\theta_2((1-\theta_1)g_y^\sigma(x_{2,1},y_{2,1},t)+\theta_1 g_y^\sigma(x_{2,2},y_{2,2},t)), \tag{6-15}$$

of the values of the image function $g^\sigma(x,y,t)$ and, respectively, its partial derivatives $g_x^\sigma(x,y,t)$, $g_y^\sigma(x,y,t)$ at the points from the subset $\Omega''(h''_{\sigma,1},h''_{\sigma,2}) \cap R^2(h''_{\sigma,1},h''_{\sigma,2})$ given as in the relations $$(x_{1,1},y_{1,1})=i_1 h''_{\sigma,1}+i_2 h''_{\sigma,2}, \tag{6-16}$$

$$(x_{1,2},y_{1,2})=(i_1+1)h''_{\sigma,1}+i_2 h''_{\sigma,2}, \tag{6-17}$$

$$(x_{2,1},y_{2,1})=i_1 h''_{\sigma,1}+(i_2+1)h''_{\sigma,2}, \tag{6-18}$$

$$(x_{2,2},y_{2,2})=(i_1+1)h''_{\sigma,1}+(i_2+1)h''_{\sigma,2}. \tag{6-19}$$

Let $\kappa''$ be a positive integer constant, and let $h_{\sigma,1}$, $h_{\sigma,2}$ be two-dimensional real vectors defined as in the relations $$h_{\sigma,1}=\kappa'' h''_{\sigma,1}, \tag{6-20}$$

$$h_{\sigma,2}=\kappa'' h''_{\sigma,2}, \tag{6-21}$$

while the subset $\Omega(h_{\sigma,1},h_{\sigma,2}) \subset \Omega$ be defined as in the relation $$\Omega(h_{\sigma,1},h_{\sigma,2})=\Omega \cap R^2(h_{\sigma,1},h_{\sigma,2}). \tag{6-22}$$

The finite-difference discretizations of the system of nonlinear equations (5-6) and of the system of linear equations (5-16), both corresponding to the parameter value $\sigma=\sigma_0, \sigma_1, \ldots, \sigma_n$, are defined on the set $\Omega(h_{\sigma,1},h_{\sigma,2})$ as, respectively, the system of nonlinear equations relative to the unknown estimate of the velocity vector field $\{(\tilde{u}^\sigma(x,y,t), \tilde{v}^\sigma(x,y,t))|(x,y)\in\Omega(h_{\sigma,1},h_{\sigma,2})\}$ corresponding to the parameter value $\sigma$ and its finite differences, and the system of linear equations relative to the unknown vector field $\{(\Delta \tilde{u}^\sigma(x,y,t),\Delta \tilde{v}^\sigma(x,y,t))|(x,y)\in\Omega(h_{\sigma,1},h_{\sigma,2})\}$ corresponding to the parameter value $\sigma$ and its finite differences as follows.

The expressions appearing under the integral signs over the set S in the system on nonlinear equations (5-6) and in the system of linear equations (5-16) have the general form $$(s,\nabla f(x,y,t,s)), \tag{6-23}$$

where $f(x,y,t,s)$ is a function of the variables $(x,y)\in\Omega$, $t\in T$, $s\in S$, which is continuously differentiable with respect to the variables $(x,y)\in\Omega$ for every fixed value of the variables $t\in T$, $s\in S$.

The unit circle making up the set S is replaced by a finite subset, denoted by the same symbol S, of the set $R^2(h_{\sigma,1},h_{\sigma,2})$ having the following properties: the set S does not contain the origin, and for every element s belonging to the set S the element $-s$ also belongs to the set S. The measure ds is replaced with the point measure associating the value 0.5 to every element $s\in S$.

As a consequence of the above actions an integral over the set S of values of any expression of the form (6-23) becomes a finite sum over the set S of the values of that expression; in other words, the following relation is satisfied:

$$\int_S (s,\nabla f(x,y,t,s))ds = \sum_{s\in S} 0.5(s,\nabla f(x,y,t,s)). \tag{6-24}$$

Given a function $f(x,y,t,s)$ that is continuously differentiable with respect to the variables $(x,y)\in\Omega$ for every $t\in T$, $s\in S$, and given an element $s\in S$, the expression (6-23) is defined on the set $R^2(h_{\sigma,1},h_{\sigma,2})$ in terms of the finite-difference approximations to the partial derivatives as $$(s,\nabla f(x,y,t,s))=\rho_s(f(x+0.5s_x,y+0.5s_y,t,s)-f(x-0.5s_x,y-0.5s_y,t,s)), \tag{6-25}$$

where $\rho_s$ is a real positive constant depending on the length of the vector s as a parameter, and the values $s_x$, $s_y$ are the components of the vector $s\equiv(s_x,s_y)$.

Taking into account the relation (6-25) and the fact that the set S has the property that for every element $s\in S$ the element $-s\in S$, then, in the case when $f(x,y,t,s)$ is an odd function with respect to the variable s, the sum appearing in the relation (6-24) can be expressed as $$\sum_{s\in S} 0.5(s,\nabla f(x,y,t,s)) = \sum_{s\in S} \rho_s f(x+0.5s_x, y+0.5s_y, t, s). \tag{6-26}$$

It is assumed that the set $G_t$ is finite and that $dg_t$ is the point measure associating the value $\rho(g_t)$ to the element $g_t\in G_t$. Here $\rho(g_t)$ is a real positive constant for every $g_t\in G_t$.

Based on the above discussion, the system of nonlinear equations (5-6) can be defined on the set $R^2(h_{\sigma,1},h_{\sigma,2})$ as $$\sum_{g_t\in G_t} \frac{\rho(g_t)\tilde{g}_{t\tilde{u}}^\sigma \tilde{g}_t^\sigma}{r^2+(p^2+q^2(\|\nabla\tilde{u}^\sigma\|^2+\|\nabla\tilde{v}^\sigma\|^2))(\tilde{g}_t^\sigma)^2} - \tag{6-27}$$

$$\sum_{s\in S} \frac{\rho_s(s,\nabla\tilde{u}^\sigma)}{a^2+(c^2+b^2(s,\nabla'\tilde{g}_t^\sigma)^2)((s,\nabla\tilde{u}^\sigma)^2+(s,\nabla\tilde{v}^\sigma)^2)} +$$

$$\gamma^\sigma(\tilde{u}^\sigma-\tilde{u}^{\delta(\sigma)}) = 0,$$

$$\sum_{g_t\in G_t} \frac{\rho(g_t)\tilde{g}_{t\tilde{v}}^\sigma \tilde{g}_t^\sigma}{r^2+(p^2+q^2(\|\nabla\tilde{u}^\sigma\|^2+\|\nabla\tilde{v}^\sigma\|^2))(\tilde{g}_t^\sigma)^2} -$$

$$\sum_{s\in S} \frac{\rho_s(s,\nabla\tilde{v}^\sigma)}{a^2+(c^2+b^2(s,\nabla'\tilde{g}_t^\sigma)^2)((s,\nabla\tilde{u}^\sigma)^2+(s,\nabla\tilde{v}^\sigma)^2)} +$$

$$\gamma^\sigma(\tilde{v}^\sigma-\tilde{v}^{\delta(\sigma)}) = 0,$$

while the system of linear equations (5–16) can be defined on the set $R^2(h_{\sigma,1},h_{\sigma,2})$ as $$\sum_{g_t\in G_t} \frac{\rho(g_t)r^2(\tilde{g}_{t\tilde{u}}^\sigma)^2 \Delta\tilde{u}^\sigma}{(r^2+(p^2+q^2(\|\nabla\tilde{u}^\sigma\|^2+\|\nabla\tilde{v}^\sigma\|^2))(\tilde{g}_t^\sigma)^2)^2} - \tag{6-28}$$

$$\sum_{s\in S} \frac{\rho_s(a^2+(c^2+b^2(s,\nabla'\tilde{g}_t^\sigma)^2)(s,\nabla\tilde{v}^\sigma)^2)(s,\nabla(\Delta\tilde{u}^\sigma))}{(a^2+(c^2+b^2(s,\nabla'\tilde{g}_t^\sigma)^2)((s,\nabla\tilde{u}^\sigma)^2+(s,\nabla\tilde{v}^\sigma)^2))^2} +$$

$$\sum_{g_t\in G_t} \frac{\rho(g_t)r^2 \tilde{g}_{t\tilde{u}}^\sigma \tilde{g}_{t\tilde{v}}^\sigma \Delta\tilde{v}^\sigma}{(r^2+(p^2+q^2(\|\nabla\tilde{u}^\sigma\|^2+\|\nabla\tilde{v}^\sigma\|^2))(\tilde{g}_t^\sigma)^2)^2} +$$

$$\sum_{s\in S} \frac{\rho_s(c^2+b^2(s,\nabla'\tilde{g}_t^\sigma)^2)(s,\nabla\tilde{u}^\sigma)(s,\nabla\tilde{v}^\sigma)(s,\nabla(\Delta\tilde{v}^\sigma))}{(a^2+(c^2+b^2(s,\nabla'\tilde{g}_t^\sigma)^2)((s,\nabla\tilde{u}^\sigma)^2+(s,\nabla\tilde{v}^\sigma)^2))^2} +$$

$$\gamma_{1,1}^\sigma \Delta\tilde{u}^\sigma + \gamma_{1,2}^\sigma \Delta\tilde{v}^\sigma =$$

$$\sum_{g_t\in G_t} \frac{-\rho(g_t)\tilde{g}_{t\tilde{u}}^\sigma \tilde{g}_t^\sigma}{r^2+(p^2+q^2(\|\nabla\tilde{u}^\sigma\|^2+\|\nabla\tilde{v}^\sigma\|^2))(\tilde{g}_t^\sigma)^2} +$$

-continued
$$\sum_{s \in S} \frac{\rho_s(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} -$$

$$\gamma^\sigma(\tilde{u}^\sigma - \tilde{u}^{\delta(\sigma)}),$$

$$\sum_{g_t \in G_t} \frac{\rho(g_t)r^2(\tilde{g}_{t\tilde{v}}^\sigma)^2 \Delta \tilde{v}^\sigma}{(r^2 + (p^2 + q^2(\|\nabla \tilde{u}^\sigma\|^2 + \|\nabla \tilde{v}^\sigma\|^2))(\tilde{g}_t^\sigma)^2)^2} -$$

$$\sum_{s \in S} \frac{\rho_s(a^2 + (c^2 + b^2(s, \nabla' \tilde{g}_t^\sigma)^2)(s, \nabla \tilde{u}^\sigma)^2)(s, \nabla(\Delta \tilde{v}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} +$$

$$\sum_{g_t \in G_t} \frac{\rho(g_t)r^2 \tilde{g}_{t\tilde{u}}^\sigma \tilde{g}_{t\tilde{v}}^\sigma \Delta \tilde{u}^\sigma}{(r^2 + (p^2 + q^2(\|\nabla \tilde{u}^\sigma\|^2 + \|\nabla \tilde{v}^\sigma\|^2))(\tilde{g}_t^\sigma)^2)^2} +$$

$$\sum_{s \in S} \frac{\rho_s(c^2 + b^2(s, \nabla' \tilde{g}_t^\sigma)^2)(s, \nabla \tilde{u}^\sigma)(s, \nabla \tilde{v}^\sigma)(s, \nabla(\Delta \tilde{u}^\sigma))}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2} +$$

$$\gamma_{2,2}^\sigma \Delta \tilde{v}^\sigma + \gamma_{2,1}^\sigma \Delta \tilde{u}^\sigma =$$

$$\sum_{g_t \in G_t} \frac{-\rho(g_t)\tilde{g}_{t\tilde{v}}^\sigma \tilde{g}_t^\sigma}{r^2 + (p^2 + q^2(\|\nabla \tilde{u}^\sigma\|^2 + \|\nabla \tilde{v}^\sigma\|^2))(\tilde{g}_t^\sigma)^2} +$$

$$\sum_{s \in S} \frac{\rho_s(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} -$$

$$\gamma^\sigma(\tilde{v}^\sigma - \tilde{v}^{\delta(\sigma)}).$$

The arguments of the functions appearing in the relations (6-27), (6-28) have been omitted for the sake of simplicity of notation. The functions appearing under the summation over the set S sign are evaluated at the points $(x+0.5s_x, y+0.5s_y, t)$, while the rest of the functions are evaluated at the points $(x,y,t)$ for every $(x,y) \in R^2(h_{o,1}, h_{o,2})$, $t \in T$, $s \equiv (s_x, s_y) \in S$. The functions $\tilde{g}_t^\sigma, \tilde{g}_{t\tilde{u}}^\sigma, \tilde{g}_{t\tilde{v}}^\sigma$ are defined, respectively, by the relations $$\tilde{g}_t^\sigma \equiv g_t^\sigma(x, y, t, \tilde{u}^\sigma, \tilde{v}^\sigma) = \quad (6\text{-}29)$$
$$(g^\sigma(x + \Delta t^+ \tilde{u}^\sigma(x, y, t), y + \Delta t^+ \tilde{v}^\sigma(x, y, t), t + \Delta t^+) -$$
$$g^\sigma(x - \Delta t^- \tilde{u}^\sigma(x, y, t), y - \Delta t^- \tilde{v}^\sigma(x, y, t), t - \Delta t^-))/$$
$$(\Delta t^- + \Delta t^+),$$

$$\tilde{g}_{t\tilde{u}}^\sigma \equiv g_{t\tilde{u}}^\sigma(x, y, t, \tilde{u}^\sigma, \tilde{v}^\sigma) = \quad (6\text{-}30)$$
$$(\Delta t^+ g_x^\sigma(x + \Delta t^+ \tilde{u}^\sigma(x, y, t), y + \Delta t^+ \tilde{v}^\sigma(x, y, t), t + \Delta t^+) +$$
$$\Delta t^- g_x^\sigma(x - \Delta t^- \tilde{u}^\sigma(x, y, t), y - \Delta t^- \tilde{v}^\sigma(x, y, t), t - \Delta t^-))/$$
$$(\Delta t^- + \Delta t^+),$$

$$\tilde{g}_{t\tilde{v}}^\sigma \equiv g_{t\tilde{v}}^\sigma(x, y, t, \tilde{u}^\sigma, \tilde{v}^\sigma) = \quad (6\text{-}31)$$
$$(\Delta t^+ g_y^\sigma(x + \Delta t^+ \tilde{u}^\sigma(x, y, t), y + \Delta t^+ \tilde{v}^\sigma(x, y, t), t + \Delta t^+) +$$
$$\Delta t^- g_y^\sigma(x - \Delta t^- \tilde{u}^\sigma(x, y, t), y - \Delta t^- \tilde{v}^\sigma(x, y, t), t - \Delta t^-))/$$
$$(\Delta t^- + \Delta t^+).$$

The functions $\|\nabla \tilde{u}^\sigma\|^2, \|\nabla \tilde{v}^\sigma\|^2$ are defined as in the relations $$\|\nabla \tilde{u}^\sigma\|^2 \equiv \|\nabla \tilde{u}^\sigma(x, y, t)\|^2 \quad (6\text{-}32)$$
$$= \sum_{s \in S} \rho_s(\tilde{u}^\sigma(x + s_x, y + s_y, t) - \tilde{u}^\sigma(x, y, t))^2,$$

$$\|\nabla \tilde{v}^\sigma\|^2 \equiv \|\nabla \tilde{v}^\sigma(x, y, t)\|^2 \quad (6\text{-}33)$$
$$= \sum_{s \in S} \rho_s(\tilde{v}^\sigma(x + s_x, y + s_y, t) - \tilde{v}^\sigma(x, y, t))^2.$$

The functions $(s, \nabla \tilde{u}^\sigma), (s, \nabla \tilde{v}^\sigma)$ are defined by the relations $$(s, \nabla \tilde{u}^\sigma) \equiv (s, \nabla \tilde{u}^\sigma(x+0.5s_x, y+0.5s_y, t)) = \rho_s(\tilde{u}^\sigma(x+s_x, y+s_y, t) - \tilde{u}^\sigma(x, y, t)), \quad (6\text{-}34)$$

$$(s, \nabla \tilde{v}^\sigma) \equiv (s, \nabla \tilde{v}^\sigma(x+0.5s_x, y+0.5s_y, t)) = \rho_s(\tilde{v}^\sigma(x+s_x, y+s_y, t) - \tilde{v}^\sigma(x, y, t)), \quad (6\text{-}35)$$

while the functions $(s, \nabla(\Delta \tilde{u}^\sigma)), (s, \nabla(\Delta \tilde{v}^\sigma))$ are defined as in the relations $$(s, \nabla(\Delta \tilde{u}^\sigma)) \equiv (s, \nabla(\Delta \tilde{u}^\sigma(x+0.5s_x, y+0.5s_y, t))) = \rho_s(\Delta \tilde{u}^\sigma(x+s_x, y+s_y, t) - \Delta \tilde{u}^\sigma(x, y, t)), \quad (6\text{-}36)$$

$$(s, \nabla(\Delta \tilde{v}^\sigma)) \equiv (s, \nabla(\Delta \tilde{v}^\sigma(x+0.5s_x, y+0.5s_y, t))) = \rho_s(\Delta \tilde{v}^\sigma(x+s_x, y+s_y, t) - \Delta \tilde{v}^\sigma(x, y, t)). \quad (6\text{-}37)$$

The function $b^2(s, \nabla' \tilde{g}_t^\sigma)^2$ is defined by the relation $$b^2(s, \nabla' \tilde{g}_t^\sigma)^2 = \sum_{g_t \in G_t} \rho(g_t) b_{g_t}^2(s, \nabla' \tilde{g}_t^\sigma)^2, \quad (6\text{-}38)$$

where each function $(s, \nabla' \tilde{g}_t^\sigma)^2$, $g_t \in G_t$ is determined as $$(s, \nabla' \tilde{g}_t^\sigma)^2 \equiv (s, \nabla' g_t^\sigma(x+0.5s_x, y+0.5s_y, t, \tilde{u}^\sigma, \tilde{v}^\sigma))^2 = (s, \nabla' g_t^\sigma(x,y,t,\tilde{u}^\sigma, \tilde{v}^\sigma))^2 + (s, \nabla' g_t^\sigma(x+s_x, y+s_y, t, \tilde{u}^\sigma, \tilde{v}^\sigma))^2. \quad (6\text{-}39)$$

Above, for each value (x',y',t) (equal either to (x,y,t) or to $(x+s_x, y+s_y, t)$) the value of the functions $(s, \nabla' g_t^\sigma(x', y', t, \tilde{u}^\sigma, \tilde{v}^\sigma))^2$ is given by the relation (4-9).

The functions $\gamma_{i,j}^\sigma$, i, j=1, 2 are defined as in the relation $$\gamma_{i,j}^\sigma = \begin{cases} \mu \hat{\gamma}_{i,j}^\sigma / (\mu+1) + \gamma^\sigma, & \text{if } i = j, \\ \mu \hat{\gamma}_{i,j}^\sigma / (\mu+1), & \text{if } i \neq j, \end{cases} \quad (6\text{-}40)$$

where $\mu$ is a small positive constant, while $\hat{\gamma}_{i,j}^\sigma$, i, j=1, 2 are defined as in the relations $$\hat{\gamma}_{1,1}^\sigma = \sum_{g_t \in G_t} \frac{\rho(g_t)r^2(\tilde{g}_{t\tilde{u}}^\sigma)^2}{(r^2 + (p^2 + q^2(\|\nabla \tilde{u}^\sigma\|^2 + \|\nabla \tilde{v}^\sigma\|^2))(\tilde{g}_t^\sigma)^2)^2} - \quad (6\text{-}41)$$
$$\sum_{s \in S} \frac{\rho_s^2(a^2 + (c^2 + b^2(s, \nabla' \tilde{g}_t^\sigma)^2)(s, \nabla \tilde{v}^\sigma)^2)}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2},$$

$$\hat{\gamma}_{1,2}^\sigma = \sum_{g_t \in G_t} \frac{\rho(g_t)r^2 \tilde{g}_{t\tilde{u}}^\sigma \tilde{g}_{t\tilde{v}}^\sigma}{(r^2 + (p^2 + q^2(\|\nabla \tilde{u}^\sigma\|^2 + \|\nabla \tilde{v}^\sigma\|^2))(\tilde{g}_t^\sigma)^2)^2} + \quad (6\text{-}42)$$
$$\sum_{s \in S} \frac{\rho_s^2(c^2 + b^2(s, \nabla' \tilde{g}_t^\sigma)^2)(s, \nabla \tilde{u}^\sigma)(s, \nabla \tilde{v}^\sigma)}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2},$$

$$\hat{\gamma}_{2,1}^\sigma = \sum_{g_t \in G_t} \frac{\rho(g_t)r^2 \tilde{g}_{t\tilde{u}}^\sigma \tilde{g}_{t\tilde{v}}^\sigma}{(r^2 + (p^2 + q^2(\|\nabla \tilde{u}^\sigma\|^2 + \|\nabla \tilde{v}^\sigma\|^2))(\tilde{g}_t^\sigma)^2)^2} + \quad (6\text{-}43)$$
$$\sum_{s \in S} \frac{\rho_s^2(c^2 + b^2(s, \nabla' \tilde{g}_t^\sigma)^2)(s, \nabla \tilde{u}^\sigma)(s, \nabla \tilde{v}^\sigma)}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2},$$

$$\hat{\gamma}_{2,2}^\sigma = \sum_{g_t \in G_t} \frac{\rho(g_t)r^2(\tilde{g}_{t\tilde{v}}^\sigma)^2}{(r^2 + (p^2 + q^2(\|\nabla \tilde{u}^\sigma\|^2 + \|\nabla \tilde{v}^\sigma\|^2))(\tilde{g}_t^\sigma)^2)^2} - \quad (6\text{-}44)$$
$$\sum_{s \in S} \frac{\rho_s^2(a^2 + (c^2 + b^2(s, \nabla' \tilde{g}_t^\sigma)^2)(s, \nabla \tilde{u}^\sigma)^2)}{(a^2 + (c^2 + b^2(s, \nabla' \tilde{g}_t^\sigma)^2)((s, \nabla \tilde{u}^\sigma)^2 + (s, \nabla \tilde{v}^\sigma)^2))^2}.$$

The restriction of the system of nonlinear equations (6-27) and the restriction of the system of linear equations (6-28) on the subset $\Omega(h_{\sigma,1},h_{\sigma,2})$ of the set $R^2(h_{\sigma,1},h_{\sigma,2})$ are both accomplished through introduction of the boundary condition as follows. For every image point $(x,y)\in\Omega(h_{\sigma,1},h_{\sigma,2})$ and for every element $s\equiv(s_x,s_y)\in S$ such that the point $(x+s_x,y+s_y)$ is outside of the subset $\Omega(h_{\sigma,1},h_{\sigma,2})$ the value of the estimate of the velocity vector $(\tilde{u}^\sigma(x+s_x,y+s_y,t), \tilde{v}^\sigma(x+s_x,y+s_y,t)$ is defined to be identically equal to the value of the estimate of the velocity vector $(\tilde{u}^\sigma(x,y,t),\tilde{v}^\sigma(x,y,t))$. Under these conditions the system of nonlinear equations (6-27) and the system of linear equations (6-28) are well defined for every image point $(x,y)$ from the set $\Omega(h_{\sigma,1},h_{\sigma,2})$ and, therefore, form, respectively, the system of nonlinear equations relative to the unknown estimate of the velocity vector field $\{(\tilde{u}^\sigma(x,y,t),\tilde{v}^\sigma(x,y,t))|(x,y)\in\Omega(h_{\sigma,1},h_{\sigma,2})\}$ corresponding to the parameter value $\sigma$ and its finite differences, and the system of linear equations relative to the unknown vector field $\{(\Delta\tilde{u}^\sigma(x,y,t),\Delta\tilde{v}^\sigma(x,y,t))|(x,y)\in\Omega(h_{\sigma,1},h_{\sigma,2})\}$ corresponding to the parameter value $\sigma$ and its finite differences.

Let us denote by the symbol $|S|$ the number of elements of the set S, then for every $s\equiv(s_x,s_y)\in S$ the constant $\rho_s$ can be defined as in the relation $$\rho_s = \sqrt{(s_x^2+s_y^2)/|S|}. \quad (6\text{-}45)$$

The following are two commonly used ways of selecting the set S $$S\equiv\{h_{\sigma,1},-h_{\sigma,1},h_{\sigma,2},-h_{\sigma,2}\}, \quad (6\text{-}46)$$

$$S\equiv\{h_{\sigma,1},-h_{\sigma,1},h_{\sigma,2}-h_{\sigma,2},h_{\sigma,1}+h_{\sigma,2},-h_{\sigma,1}-h_{\sigma,2},h_{\sigma,1}-h_{\sigma,2},-h_{\sigma,1}+h_{\sigma,2}\}. \quad (6\text{-}47)$$

If the set S is selected as in the relation (6-46) we say that the "five-points finite-difference discretization" is used, while for the selection specified by the relation (6-47) we say that the "nine-points finite-difference discretization" is used.

Let $k=0, \ldots, n-1$ and let $\{(\tilde{u}^{\sigma_k}(x,y,t),\tilde{v}^{\sigma_k}(x,y,t))|(x,y)\in\Omega(h_{\sigma_k,1},h_{\sigma_k,2})\}$ be an estimate of the velocity vector field corresponding to the parameter value $\sigma_k$. Then the initial estimate $\{(\tilde{u}^{\sigma_{k+1}}(x,y,t),\tilde{v}^{\sigma_{k+1}}(x,y,t))|(x,y)\in\Omega(h_{\sigma_{k+1},1},h_{\sigma_{k+1},2})\}$ of the velocity vector field corresponding to the parameter value $\sigma_{k+1}$ is defined as follows. For every $(x,y)\in\Omega(h_{\sigma_{k+1},1},h_{\sigma_{k+1},2})$ such that $(x,y)\in\Omega(h_{\sigma_k,1},h_{\sigma_k,2})$ the value of the estimate $(\tilde{u}^{\sigma_{k+1}}(x,y,t),\tilde{v}^{\sigma_{k+1}}(x,y,t))$ is given by the relation $$(\tilde{u}^{\sigma_{k+1}}(x,y,t),\tilde{v}^{\sigma_{k+1}}(x,y,t))=(\tilde{u}^{\sigma_k}(x,y,t),\tilde{v}^{\sigma_k}(x,y,t)) \quad (6\text{-}48)$$

while for every $(x,y)\in\Omega(h_{\sigma_{k+1},1},h_{\sigma_{k+1},2})$ such that $(x,y)\notin\Omega(h_{\sigma_k,1},h_{\sigma_k,2})$ the value of the estimate $(\tilde{u}^{\sigma_{k+1}}(x,y,t),\tilde{v}^{\sigma_{k+1}}(x,y,t))$ is given as in the relation $$(\tilde{u}^{\sigma_{k+1}}(x,y,t),\tilde{v}^{\sigma_{k+1}}(x,y,t)) = \quad (6\text{-}49)$$
$$\sum_{i_1,i_2=-1,+1} 0.25(\tilde{u}^{\sigma_k}(x_{i_1,i_2},y_{i_1,i_2},t),\tilde{v}^{\sigma_k}(x_{i_1,i_2},y_{i_1,i_2},t)),$$

where $$(x_{i_1,i_2},y_{i_1,i_2})=(x,y)+i_1 h_{\sigma_{k+1},1}+i_2 h_{\sigma_{k+1},2}. \quad (6\text{-}50)$$

The system of linear equations (6-28) is symmetric and positive definite. As shown below, the system of linear equations (6-28) can be partitioned into two subsystems, one of which dominates the other and can be directly inverted. Based on these properties a fast preconditioned iterative method is constructed, which can be implemented as a fully local, uniform, and parallel algorithm for solving the system of linear equations (6-28). This method is further accelerated in an embodiment of the present invention with the help of the Chebyshev polynomials, and such acceleration retains the above mentioned properties.

If we introduce an ordering on the set $\Omega(h_{\sigma,1},h_{\sigma,2})$, then the system of linear equations (6-28) can be expressed in the matrix notation as $$M^\sigma(\tilde{u}^\sigma,\tilde{v}^\sigma)(\Delta\tilde{u}^\sigma,\Delta\tilde{v}^\sigma)^T=-F^\sigma(\tilde{u}^\sigma,\tilde{v}^\sigma), \quad (7\text{-}1)$$

where $(\Delta\tilde{u}^\sigma,\Delta\tilde{v}^\sigma)^T$ is the transpose vector of the row-vector $(\Delta\tilde{u}^\sigma,\Delta\tilde{v}^\sigma)$, corresponding to the vector field $\{(\Delta\tilde{u}^\sigma(x,y,t),\Delta\tilde{v}^\sigma(x,y,t))|(x,y)\in\Omega(h_{\sigma,1},h_{\sigma,2})\}$, which is obtained by first listing the elements of the set $\{\Delta\tilde{u}^\sigma(x,y,t)|(x,y)\in\Omega(h_{\sigma,1},h_{\sigma,2})\}$ according to the specified ordering, then listing the elements of the set $\{\Delta\tilde{v}^\sigma(x,y,t)|(x,y)\in\Omega(h_{\sigma,1},h_{\sigma,2})\}$ according to the same ordering. The "natural ordering" on the set $\Omega(h_{\sigma,1},h_{\sigma,2})$ can be defined as follows. The relations (6-2) and (6-2) imply that every element $(x,y)\in\Omega(h_{\sigma,1},h_{\sigma,2})$ can be uniquely represented in the form $(x,y)\equiv i_1 h_{\sigma,1}+i_2 h_{\sigma,2}$ where $i_1$, and $i_2$ are integer numbers. Then the element $(x,y)\equiv i_1 h_{\sigma,1}+i_2 h_{\sigma,2}\in\Omega(h_{\sigma,1},h_{\sigma,2})$ follows the element $(x',y')\equiv i'_1 h_{\sigma,1}+i'_2 h_{\sigma,2}\in\Omega(h_{\sigma,1},h_{\sigma,2})$ if $i_2>i'_2$ or if $i_2=i'_2$ and $i_1>i'_1$.

By partitioning the square matrix $M^\sigma(\tilde{u}^\sigma,\tilde{v}^\sigma)$ into four square submatrices corresponding to the vectors $(\Delta\tilde{u}^\sigma)$ and $(\Delta\tilde{v}^\sigma)$, respectively, and by partitioning the vector $-F^\sigma(\tilde{u}^\sigma,\tilde{v}^\sigma)$ into two subvectors the relation (7-1) representing the system of linear equations (6-28) becomes $$\begin{pmatrix} M_{1,1}^\sigma(\tilde{u}^\sigma,\tilde{v}^\sigma) & M_{1,2}^\sigma(\tilde{u}^\sigma,\tilde{v}^\sigma) \\ M_{2,1}^\sigma(\tilde{u}^\sigma,\tilde{v}^\sigma) & M_{2,2}^\sigma(\tilde{u}^\sigma,\tilde{v}^\sigma) \end{pmatrix}(\Delta\tilde{u}^\sigma,\Delta\tilde{v}^\sigma)^T = \begin{pmatrix} -F_1^\sigma(\tilde{u}^\sigma,\tilde{v}^\sigma) \\ -F_2^\sigma(\tilde{u}^\sigma,\tilde{v}^\sigma) \end{pmatrix}, \quad (7\text{-}2)$$

where $$M^\sigma(\tilde{u}^\sigma,\tilde{v}^\sigma) = \begin{pmatrix} M_{1,1}^\sigma(\tilde{u}^\sigma,\tilde{v}^\sigma) & M_{1,2}^\sigma(\tilde{u}^\sigma,\tilde{v}^\sigma) \\ M_{2,1}^\sigma(\tilde{u}^\sigma,\tilde{v}^\sigma) & M_{2,2}^\sigma(\tilde{u}^\sigma,\tilde{v}^\sigma) \end{pmatrix}, \quad (7\text{-}3)$$

$$F^\sigma(\tilde{u}^\sigma,\tilde{v}^\sigma) = \begin{pmatrix} F_1^\sigma(\tilde{u}^\sigma,\tilde{v}^\sigma) \\ F_2^\sigma(\tilde{u}^\sigma,\tilde{v}^\sigma) \end{pmatrix}.$$

Let the matrix $D_{i,j}^\sigma(\tilde{u}^\sigma,\tilde{v}^\sigma)$ be the diagonal part of the matrix $M_{i,j}^\sigma(\tilde{u}^\sigma,\tilde{v}^\sigma)$, while the matrix $-B_{i,j}^\sigma(\tilde{u}^\sigma,\tilde{v}^\sigma)$ is the off-diagonal part of the matrix $M_{i,j}^\sigma(\tilde{u}^\sigma,\tilde{v}^\sigma)$, so that the relation $$M_{i,j}^\sigma(\tilde{u}^\sigma,\tilde{v}^\sigma)=D_{i,j}^\sigma(\tilde{u}^\sigma,\tilde{v}^\sigma)-B_{i,j}^\sigma(\tilde{u}^\sigma,\tilde{v}^\sigma) \quad (7\text{-}4)$$

is satisfied for every $i,j=1,2$, and let the matrices $D^\sigma(\tilde{u}^\sigma,\tilde{v}^\sigma)$, $B^\sigma(\tilde{u}^\sigma,\tilde{v}^\sigma)$ be defined as in the relations $$D^\sigma(\tilde{u}^\sigma,\tilde{v}^\sigma) = \begin{pmatrix} D_{1,1}^\sigma(\tilde{u}^\sigma,\tilde{v}^\sigma) & D_{1,2}^\sigma(\tilde{u}^\sigma,\tilde{v}^\sigma) \\ D_{2,1}^\sigma(\tilde{u}^\sigma,\tilde{v}^\sigma) & D_{2,2}^\sigma(\tilde{u}^\sigma,\tilde{v}^\sigma) \end{pmatrix}, \quad (7\text{-}5)$$

$$B^\sigma(\tilde{u}^\sigma,\tilde{v}^\sigma) = \begin{pmatrix} B_{1,1}^\sigma(\tilde{u}^\sigma,\tilde{v}^\sigma) & B_{1,2}^\sigma(\tilde{u}^\sigma,\tilde{v}^\sigma) \\ B_{2,1}^\sigma(\tilde{u}^\sigma,\tilde{v}^\sigma) & B_{2,2}^\sigma(\tilde{u}^\sigma,\tilde{v}^\sigma) \end{pmatrix};$$

then the system of linear equations (6-28) takes the form $$(D^\sigma(\tilde{u}^\sigma,\tilde{v}^\sigma)-B^\sigma(\tilde{u}^\sigma,\tilde{v}^\sigma))(\Delta\tilde{u}^\sigma,\Delta\tilde{v}^\sigma)^T=-F^\sigma(\tilde{u}^\sigma,\tilde{v}^\sigma). \quad (7\text{-}6)$$

The quadratic form corresponding to the system of linear equations (6-28) represented by the relation (7-6) can be given as in the relation $$(\Delta\tilde{u}^\sigma,\Delta\tilde{v}^\sigma)(D^\sigma(\tilde{u}^\sigma,\tilde{v}^\sigma)-B^\sigma(\tilde{u}^\sigma,\tilde{v}^\sigma))(\Delta\tilde{u}^\sigma,\Delta\tilde{v}^\sigma)^T \quad (7\text{-}7)$$

and is greater than the quadratic form $$\frac{\mu}{(\mu+1)}(\Delta\tilde{u}^\sigma,\Delta\tilde{v}^\sigma)D^\sigma(\tilde{u}^\sigma,\tilde{v}^\sigma)(\Delta\tilde{u}^\sigma,\Delta\tilde{v}^\sigma)^T. \quad (7\text{-}8)$$

If the relations $$(s,\nabla(\Delta\tilde{u}^\sigma))\equiv(s,\nabla(\Delta\tilde{u}^\sigma(x+0.5s_x,y+0.5s_y,t)))=-\rho_s(\Delta\tilde{u}^\sigma(x+s_x,y+s_y,t)+\Delta\tilde{u}^\sigma(x,y,t)), \quad (7\text{-}9)$$

$$(s,\nabla(\Delta\tilde{v}^\sigma))\equiv(s,\nabla(\Delta\tilde{v}^\sigma(x+0.5s_x,y+0.5s_y,t)))=-\rho_s(\Delta\tilde{v}^\sigma(x+s_x,y+s_y,t)+\Delta\tilde{v}^\sigma(x,y,t)), \quad (7\text{-}10)$$

are used instead of the relations (6-36), (6-37) to define the functions $(s,\nabla(\Delta\tilde{u}^\sigma))$, $(s,\nabla(\Delta\tilde{v}^\sigma))$ appearing in the system of linear equations (6-28); then the system of linear equations (6-28) takes the form $$D^\sigma(\tilde{u}^\sigma,\tilde{v}^\sigma)+B^\sigma(\tilde{u}^\sigma,\tilde{v}^\sigma))(\Delta\tilde{u}^\sigma,\Delta\tilde{v}^\sigma)^T=-F^\sigma(\tilde{u}^\sigma,\tilde{v}^\sigma). \quad (7\text{-}11)$$

The quadratic form corresponding to the system of linear equations (6-28) represented by the relation (7-11) can be given as in the relation $$(\Delta\tilde{u}^\sigma,\Delta\tilde{v}^\sigma)(D^\sigma(\tilde{u}^\sigma,\tilde{v}^\sigma)+B^\sigma(\tilde{u}^\sigma,\tilde{v}^\sigma))(\Delta\tilde{u}^\sigma,\Delta\tilde{v}^\sigma)^T \quad (7\text{-}12)$$

and is greater than the quadratic form (7-8).

It is not difficult to see that the quadratic form (7-8) is equal to the quadratic form $$(1-\lambda)(\Delta\tilde{u}^\sigma,\Delta\tilde{v}^\sigma)D^\sigma(\tilde{u}^\sigma,\tilde{v}^\sigma)(\Delta\tilde{u}^\sigma,\Delta\tilde{v}^\sigma)^T, \quad (7\text{-}13)$$

where the positive constant $\lambda$ is given by the relation $$\lambda=1/(\mu+1). \quad (7\text{-}14)$$

By adding up the expressions of the relations (7-7) and (7-12) it can be seen that the matrix $D^\sigma(\tilde{u}^\sigma,\tilde{v}^\sigma)$ is positive definite which implies that the diagonal matrix $$D_{1,1}^\sigma(\tilde{u}^\sigma,\tilde{v}^\sigma)D_{2,2}^\sigma(\tilde{u}^\sigma,\tilde{v}^\sigma)-D_{1,2}^\sigma(\tilde{u}^\sigma,\tilde{v}^\sigma)D_{2,1}^\sigma(\tilde{u}^\sigma,\tilde{v}^\sigma) \quad (7\text{-}15)$$

as well as diagonal matrices $D_{1,1}^\sigma(\tilde{u}^\sigma,\tilde{v}^\sigma)$, $D_{2,2}^\sigma(\tilde{u}^\sigma,\tilde{v}^\sigma)$ are positive definite.

Let $C^\sigma(\tilde{u}^\sigma,\tilde{v}^\sigma)$ be a block lower triangular matrix defined by the relations $$C^\sigma(\tilde{u}^\sigma,\tilde{v}^\sigma) = \begin{pmatrix} C_{1,1}^\sigma(\tilde{u}^\sigma,\tilde{v}^\sigma) & 0 \\ C_{2,1}^\sigma(\tilde{u}^\sigma,\tilde{v}^\sigma) & C_{2,2}^\sigma(\tilde{u}^\sigma,\tilde{v}^\sigma) \end{pmatrix}, \quad (7\text{-}16)$$

where $$C_{2,2}^\sigma(\tilde{u}^\sigma,\tilde{v}^\sigma) = (D_{2,2}^\sigma(\tilde{u}^\sigma,\tilde{v}^\sigma))^{1/2}, \quad (7\text{-}17)$$

$$C_{2,1}^\sigma(\tilde{u}^\sigma,\tilde{v}^\sigma) = (D_{2,1}^\sigma(\tilde{u}^\sigma,\tilde{v}^\sigma))(D_{2,2}^\sigma(\tilde{u}^\sigma,\tilde{v}^\sigma))^{1/2},$$

$$C_{1,1}^\sigma(\tilde{u}^\sigma,\tilde{v}^\sigma) = (D_{1,1}^\sigma(\tilde{u}^\sigma,\tilde{v}^\sigma)D_{2,2}^\sigma(\tilde{u}^\sigma,\tilde{v}^\sigma) - D_{1,2}^\sigma(\tilde{u}^\sigma,\tilde{v}^\sigma)D_{2,1}^\sigma(\tilde{u}^\sigma,\tilde{v}^\sigma))^{1/2}(D_{2,2}^\sigma(\tilde{u}^\sigma,\tilde{v}^\sigma))^{1/2};$$

then the following relation is satisfied $$C^\sigma(\tilde{u}^\sigma,\tilde{v}^\sigma)^T C^\sigma(\tilde{u}^\sigma,\tilde{v}^\sigma)=D^\sigma(\tilde{u}^\sigma,\tilde{v}^\sigma). \quad (7\text{-}18)$$

Let $(\Delta\bar{u}^\sigma,\Delta\bar{v}^\sigma)$ be a vector defined by the relation $$(\Delta\bar{u}^\sigma,\Delta\bar{v}^\sigma)^T=C^\sigma(\tilde{u}^\sigma,\tilde{v}^\sigma)(\Delta\tilde{u}^\sigma,\Delta\tilde{v}^\sigma)^T. \quad (7\text{-}19)$$

If both sides of the system of linear equations (7-6) of the unknown vector $(\Delta\tilde{u}^\sigma,\Delta\tilde{v}^\sigma)$ are multiplied on the matrix $C^\sigma(\tilde{u}^\sigma,\tilde{v}^\sigma)^{-T}$ from the left and if the unknown vector $(\Delta\tilde{u}^\sigma,\Delta\tilde{v}^\sigma)$ is substituted with the unknown vector $(\Delta\bar{u}^\sigma,\Delta\bar{v}^\sigma)$ the system of linear equations (7-6) becomes the following system of linear equations relative to the unknown vector $(\Delta\bar{u}^\sigma,\Delta\bar{v}^\sigma)$:

$$(\Delta\bar{u}^\sigma,\Delta\bar{v}^\sigma)^T=C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}(\Delta\bar{u}^\sigma,\Delta\bar{v}^\sigma)^T-C^\sigma(\tilde{u}^\sigma,\tilde{v}^\sigma)^{-T}F^\sigma(\tilde{u}^\sigma,\tilde{v}^\sigma). \quad (7\text{-}20)$$

By substitution of the unknown vector $(\Delta\tilde{u}^\sigma,\Delta\tilde{v}^\sigma)$ with the unknown vector $(\Delta\bar{u}^\sigma,\Delta\bar{v}^\sigma)$ the quadratic form (7-7) becomes the quadratic form $$(\Delta\bar{u}^\sigma,\Delta\bar{v}^\sigma)(\Delta\bar{u}^\sigma,\Delta\bar{v}^\sigma)^T-(\Delta\bar{u}^\sigma,\Delta\bar{v}^\sigma)C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}(\Delta\bar{u}^\sigma,\Delta\bar{v}^\sigma)^T, \quad (7\text{-}21)$$

the quadratic form (7-12) becomes the quadratic form $$(\Delta\bar{u}^\sigma,\Delta\bar{v}^\sigma)(\Delta\bar{u}^\sigma,\Delta\bar{v}^\sigma)^T+(\Delta\bar{u}^\sigma,\Delta\bar{v}^\sigma)C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}(\Delta\bar{u}^\sigma,\Delta\bar{v}^\sigma)^T, \quad (7\text{-}22)$$

and the quadratic form (7-13) becomes $$(1-\lambda)(\Delta\bar{u}^\sigma,\Delta\bar{v}^\sigma)(\Delta\bar{u}^\sigma,\Delta\bar{v}^\sigma)^T. \quad (7\text{-}23)$$

The fact that the quadratic forms (7-21) and (7-22) are both greater than the quadratic form (7-23) implies that the following relations are satisfied:

$$(\Delta\bar{u}^\sigma,\Delta\bar{v}^\sigma)C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}(\Delta\bar{u}^\sigma,\Delta\bar{v}^\sigma)^T<+\lambda(\Delta\bar{u}^\sigma,\Delta\bar{v}^\sigma)(\Delta\bar{u}^\sigma,\Delta\bar{v}^\sigma)^T, \quad (7\text{-}24)$$

$$(\Delta\bar{u}^\sigma,\Delta\bar{v}^\sigma)C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}(\Delta\bar{u}^\sigma,\Delta\bar{v}^\sigma)^T>-\lambda(\Delta\bar{u}^\sigma,\Delta\bar{v}^\sigma)(\Delta\bar{u}^\sigma,\Delta\bar{v}^\sigma)^T. \quad (7\text{-}25)$$

The relations (7-24) and (7-25), in turn, imply that the $L^2$ norm of the matrix $C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}$ is less than $\lambda$, i.e., $$\|C^\sigma(\tilde{u}^\sigma,\tilde{v}^\sigma)^{-T}B^\sigma(\tilde{u}^\sigma,\tilde{v}^\sigma)C^\sigma(\tilde{u}^\sigma,\tilde{v}^\sigma)^{-1}\|_2<\lambda<1. \quad (7\text{-}26)$$

Let $G^\sigma(\tilde{u}^\sigma,\tilde{v}^\sigma)$ be a matrix defined as in the relation $$G^\sigma(\tilde{u}^\sigma,\tilde{v}^\sigma)=C^\sigma(\tilde{u}^\sigma,\tilde{v}^\sigma)^{-T}B^\sigma(\tilde{u}^\sigma,\tilde{v}^\sigma)\ C^\sigma(\tilde{u}^\sigma,\tilde{v}^\sigma)^{-1}, \quad (7\text{-}27)$$

while $h^\sigma(\tilde{u}^\sigma,\tilde{v}^\sigma)$ is a vector given by the relation $$h^\sigma(\tilde{u}^\sigma,\tilde{v}^\sigma)=C^\sigma(\tilde{u}^\sigma,\tilde{v}^\sigma)^{-T}F^\sigma(\tilde{u}^\sigma,\tilde{v}^\sigma); \quad (7\text{-}28)$$

then the following basic iterative method can be used to obtain an approximation to the solution of the system of linear equations (6-28).

The initial approximation $(\Delta\bar{u}_0^\sigma,\Delta\bar{v}_0^\sigma)$ to the solution of the system of linear equations (7-20) is defined to be identically equal to zero. For every n=0,1, ... the approximation $(\Delta\bar{u}_{n+1}^\sigma,\Delta\bar{v}_{n+1}^\sigma)$ is defined in terms of the approximation $(\Delta\bar{u}_n^\sigma,\Delta\bar{v}_n^\sigma)$ as in the relation $$(\Delta\bar{u}_{n+1}^\sigma,\Delta\bar{v}_{n+1}^\sigma)^T=G^\sigma(\tilde{u}^\sigma,\tilde{v}^\sigma)(\Delta\bar{u}_n^\sigma,\Delta\bar{v}_n^\sigma)^T h^\sigma(\tilde{u}^\sigma,\tilde{v}^\sigma). \quad (7\text{-}29)$$

The process is continued until a proper approximation $(\Delta\bar{u}_N^\sigma,\Delta\bar{v}_N^\sigma)$ to the solution of the system of linear equations (7-20) is achieved. The approximation $(\Delta\tilde{u}^\sigma,\Delta\tilde{v}^\sigma)$ to the solution of the system of linear equations (6-28) is defined by the relation $$(\Delta\tilde{u}^\sigma,\Delta\tilde{v}^\sigma)^T=C^\sigma(\tilde{u}^\sigma,\tilde{v}^\sigma)^{-1}(\Delta\bar{u}_N^\sigma,\bar{v}_N^\sigma)^T. \quad (7\text{-}30)$$

The performance of the basic iterative method (7-29) can be improved with the help of the polynomial acceleration applied to the basic iterative method. Two methods are described below: a conjugate gradient polynomial acceleration, and a Chebyshev polynomial acceleration. For the sake of simplicity of the presentation the following notation shall be used:

$$w\equiv(\Delta\bar{u}^\sigma,\Delta\bar{v}^\sigma)^T,\ G\equiv G^\sigma(\tilde{u}^\sigma,\tilde{v}^\sigma),\ h\equiv h^\sigma(\tilde{u}^\sigma,\tilde{v}^\sigma). \quad (7\text{-}31)$$

Then the basic iterative method (7-29) becomes $$w_{n+1}=Gw_n-h. \quad (7\text{-}32)$$

The polynomial acceleration of the basic iterative method (7-32) can be described as follows. Start with the initial approximation $w_0$ which is identically equal to zero, then for every n=0,1, ... the following iterative procedure is applied:

$$w_{n+1}=\rho_n(\gamma_n(Gw_n-h)+(1-\gamma_n)w_n)+(1-\rho_n)w_{n-1}. \quad (7\text{-}33)$$

In the case of the conjugate gradient method the coefficients $\rho_n$ and $\gamma_n$ are given by the relation $$\rho_n = \frac{\alpha_{n-1}+\alpha_n\beta_n}{\alpha_{n-1}}, n\geq 1, \rho_0=1, \quad (7\text{-}34)$$

$$\gamma_n = \frac{\alpha_n\alpha_{n-1}}{\alpha_{n-1}+\alpha_n\beta_n}, n\geq 1, \gamma_0=\alpha_0,$$

where $$\alpha_n = \frac{(r_n,r_n)}{(p_n,q_n)}, n\geq 0, \quad (7\text{-}35)$$

$$\beta_n = \frac{(r_n,r_n)}{(r_{n-1},r_{n-1})}, n\geq 1, \beta_0=0,$$

$$p_n = r_n+\beta_n p_{n-1}, n\geq 1, p_0=r_0, \quad (7\text{-}36)$$

$$q_n = p_n - Gp_n, n\geq 0,$$

$$r_n = Gw_n - w_n - h, n\geq 0, \quad (7\text{-}37)$$

while in the case of the Chebyshev method the coefficients $\rho_n$ and $\gamma_n$ are given by the relation $$\rho_n = \frac{1}{1-0.25\lambda^2\rho_{n-1}}, n\geq 2, \rho_1=\frac{1}{1-0.5\lambda^2}, \rho_0=1, \quad (7\text{-}38)$$

$$\gamma_{n+1}=1, n\geq 0.$$

The conjugate gradient method can be expressed in the alternative form $$w_{n+1}=w_n+\alpha_n p_n,\ r_{n+1}=r_n-\alpha_n q_n, \quad (7\text{-}39)$$

where the coefficients $\alpha_n$ are defined as in the relation (7-35), while the vectors $p_n$, $q_n$ are given by the relation (7-36). The alternative form for the Chebyshev method is defined as $$w_{n+1}=w_n+p_n,\ r_{n+1}=r_n-q_n, \quad (7\text{-}40)$$

where $$p_n=\rho_n r_n+(\rho_n-1)p_{n-1}, n\geq 1, p_0=r_0, q_n=p_n-Gp_n, n\geq 0, \quad (7\text{-}41)$$

and the coefficients $\rho_n$ are given by the relation (7-38).

In an exemplary embodiment of the invention, the five level resolution pyramid was used with the value of the parameter σ decreasing by a factor of 2.0 for each successively finer resolution level. A nine-points finite-difference discretization was used. The positive integer constant κ' appearing in the relations (6-6), (6-5) is equal to 4, while the positive integer constant κ" appearing in the relations (6-19), (6-20) is equal to 2. With these values, the present invention is capable of estimating the velocity vector field with good accuracy in the case of the images of real world scenes containing multiple occluding boundaries and objects undergoing nonrigid body motions.

The mathematical analysis and methods discussed above are used to modify a time-varying image sequence in the embodiments of the method of the present invention described below and illustrated in FIGS. 2–8.

Figure 2:
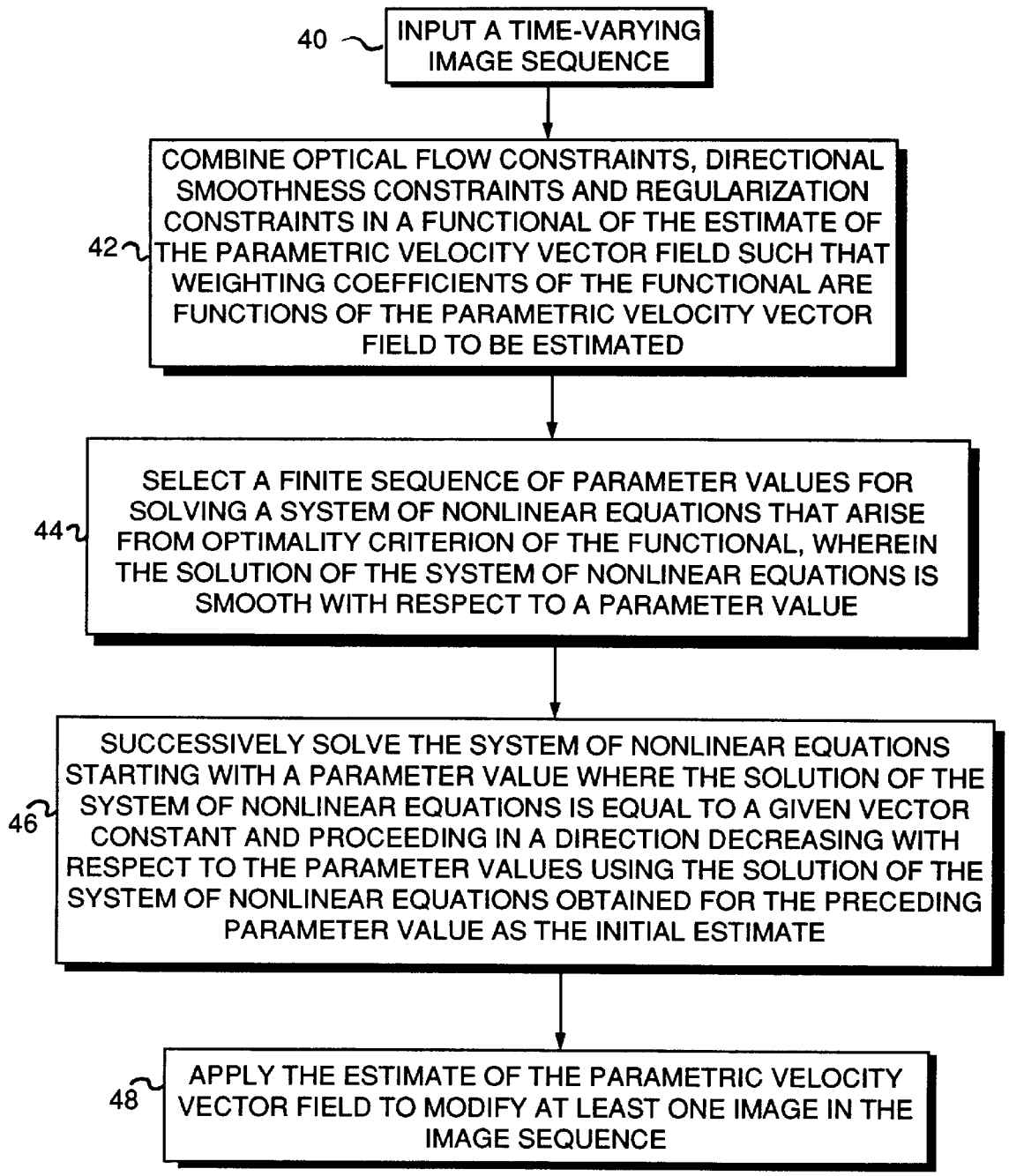
FIG. 2 illustrates a flow chart for a method of modifying an image in a time-varying image sequence in accordance with an embodiment of the present invention.

FIG. 2 illustrates an embodiment of the method of the present invention for modifying at least one image in a time-varying image sequence. In step 40, a time-varying image sequence is input. In step 42, optical flow constraints are combined with directional smoothness constraints and regularization constraints in a functional of the estimate of the parametric velocity vector field such that weighting coefficients of the functional are functions of the parametric velocity vector field to be estimated. Then, in step 44, a finite sequence of parameter values are selected for solving a system of nonlinear equations that arise from optimality criterion of the functional, wherein the solution of the system of nonlinear equations is smooth with respect to a parameter value. Then, in step 46, the system of nonlinear equations is successively solved starting with a parameter value where the solution of the system of nonlinear equations is equal to a given vector constant and proceeds in a direction decreasing with respect to the parameter values using the solution of the system of nonlinear equations obtained for the preceding parameter value as the initial estimate. As shown in step 48, the estimate of the parametric velocity vector field is applied in order to modify at least one image in the image sequence.

Figure 3A:
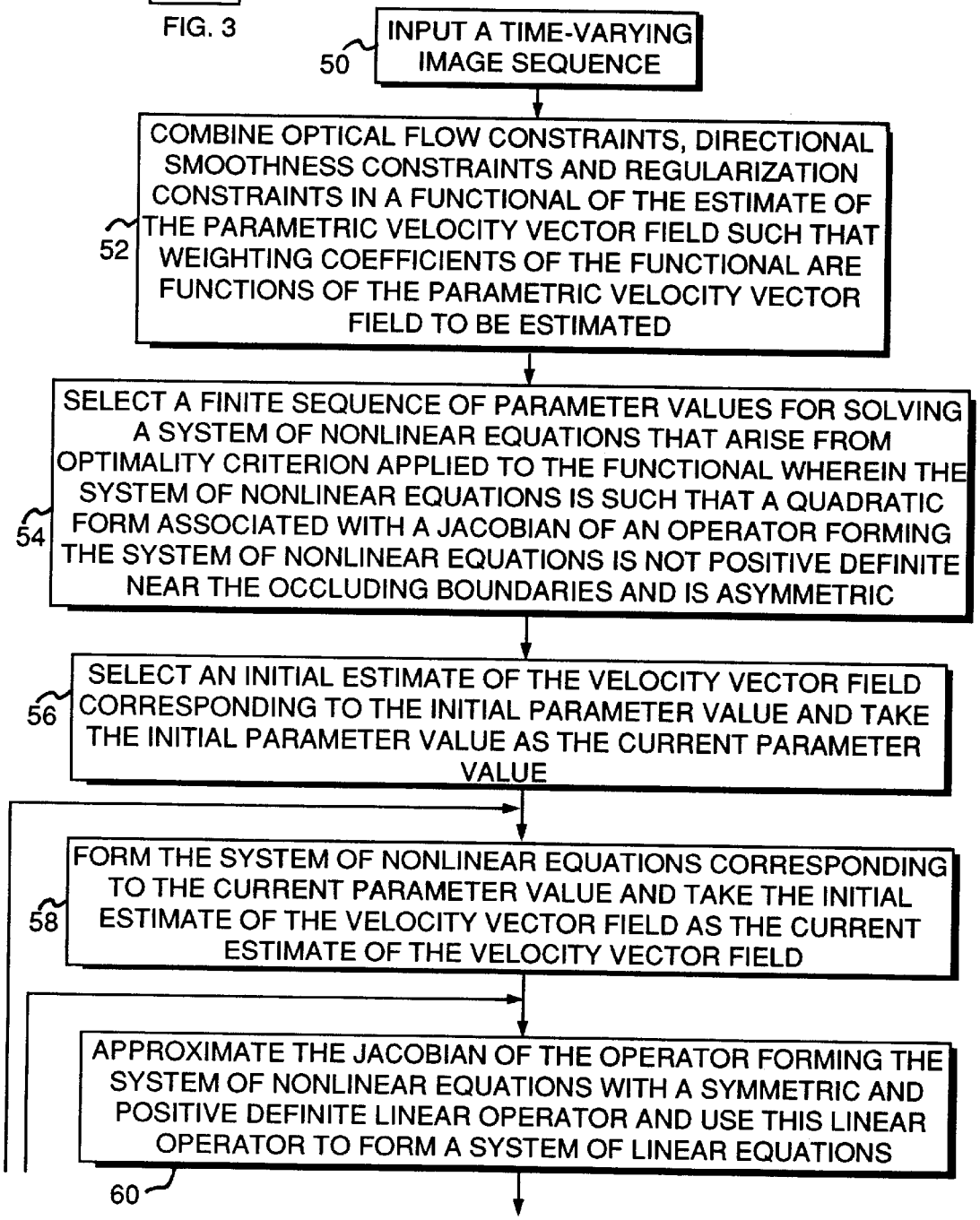
FIG. 3 illustrates a flow chart for a method of modifying an image in a time-varying image sequence in accordance with another embodiment of the present invention.
Figure 3B:
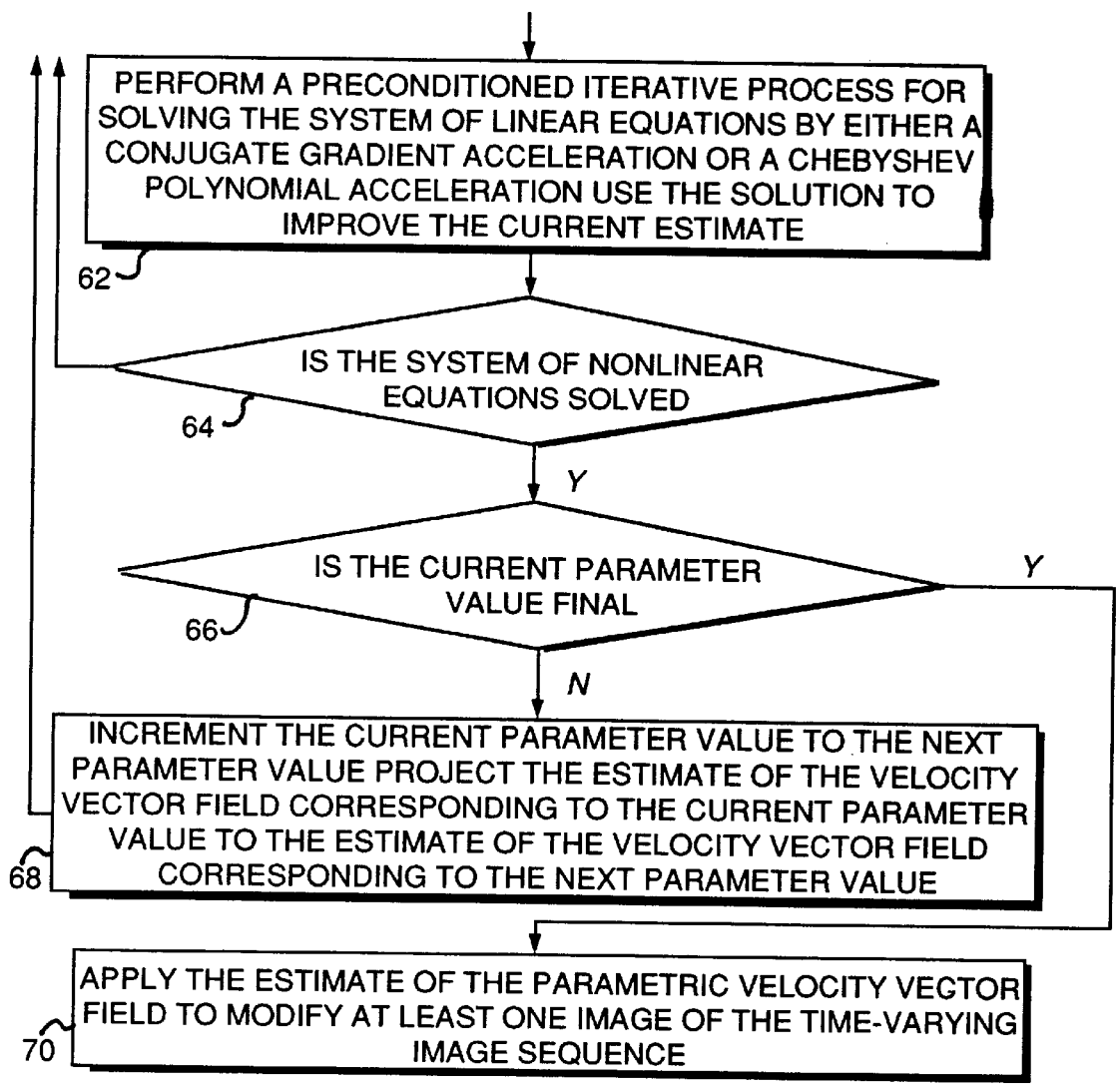

FIG. 3 shows a different embodiment of the method of the present invention in which the first two steps, steps 50 and 52 are the same as steps 40 and 42 in the embodiment of FIG. 2. In step 54, a finite sequence of parameter values is selected for solving a system of nonlinear equations that arise from optimality criterion applied to the functional. The system of nonlinear equations is such that a quadratic form associated with a Jacobian of no operator forming the system of nonlinear equations is not positive definite near the occluding boundaries and is asymmetric.

An initial estimate of the velocity vector field is selected corresponding to the initial parameter value and takes the initial parameter value as the current parameter value in step 56. Then, in step 58, the system of nonlinear equations is formed corresponding to the current parameter value and the initial estimate of the velocity vector field is taken as the current estimate of the velocity vector field. In step 60, the Jacobian of the operator forming a system of nonlinear equations is approximated with a symmetric and positive definite linear operator. This linear operator is used to form a system of linear equations.

In step 62, a preconditioned iterative process is performed for solving the system of linear equations by either a conjugate gradient acceleration or a Chebyshev polynomial acceleration, and then the solution is used to improve the current estimate. Step 64 is a decision step, in which it is determined whether the system of nonlinear equations is solved. If the determination is negative, the flow loops back to between steps 58 and 60. If the determination is positive, the method proceeds to step 66, a second decision step, in which it is determined whether the current parameter value is final. If this determination is no, the current parameter value is incremented to then next parameter value in step 68. The estimate of the velocity vector field corresponding to the current parameter value is projected to the estimate of the velocity vector field corresponding to the next parameter value. The flow then loops back to between steps 56 and 58.

If the current parameter value is final, as determined in step 66, then the estimate of the parameter velocity vector field is applied in step 70 to modify at least one image of the time-varying image sequence.

Figure 4:
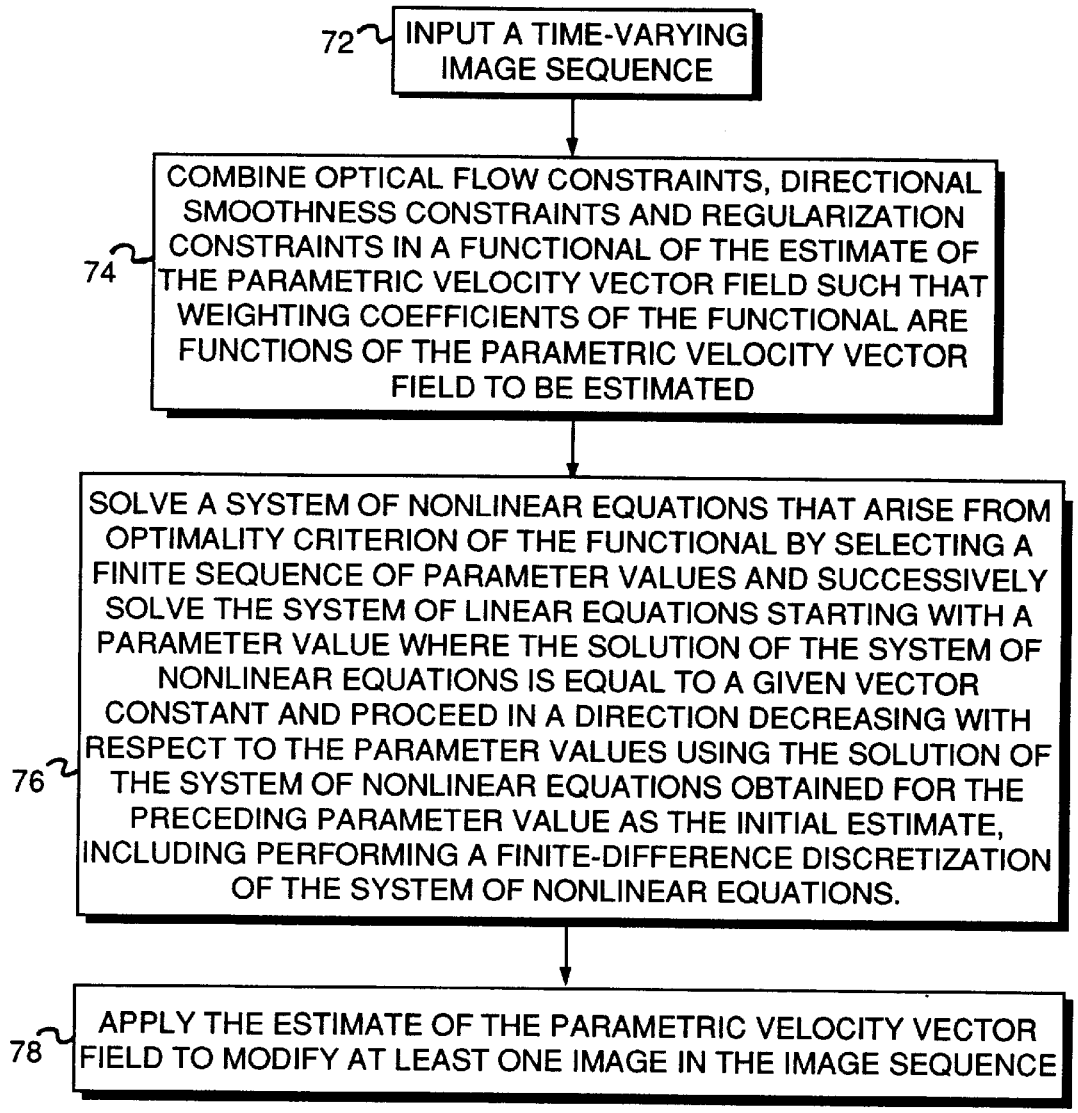
FIG. 4 illustrates a flow chart for a method of modifying an image in a time-varying image sequence in accordance with another embodiment of the present invention.

FIG. 4 illustrates another embodiment of the present invention in which the first two steps, steps 72 and 74, are the same as steps 40 and 42 of the embodiment of FIG. 3. In step 76, a system of nonlinear equations is solved which arise from optimality criterion of the functional by selecting a finite sequence of parameter values and successively solving the system of linear equations. These linear equations are successively solved starting with a parameter value where the solution of the system of nonlinear equations is equal to a given vector constant and proceed in a direction decreasing with respect to the parameter values using the solution of the system of nonlinear equations obtained for the preceding parameter value as the initial estimate. This includes performing a finite-difference discretization of the system of nonlinear equations. Then, in step 78, the estimate of the parametric velocity vector field is applied to modify at least one image in the image sequence.

Figure 5:
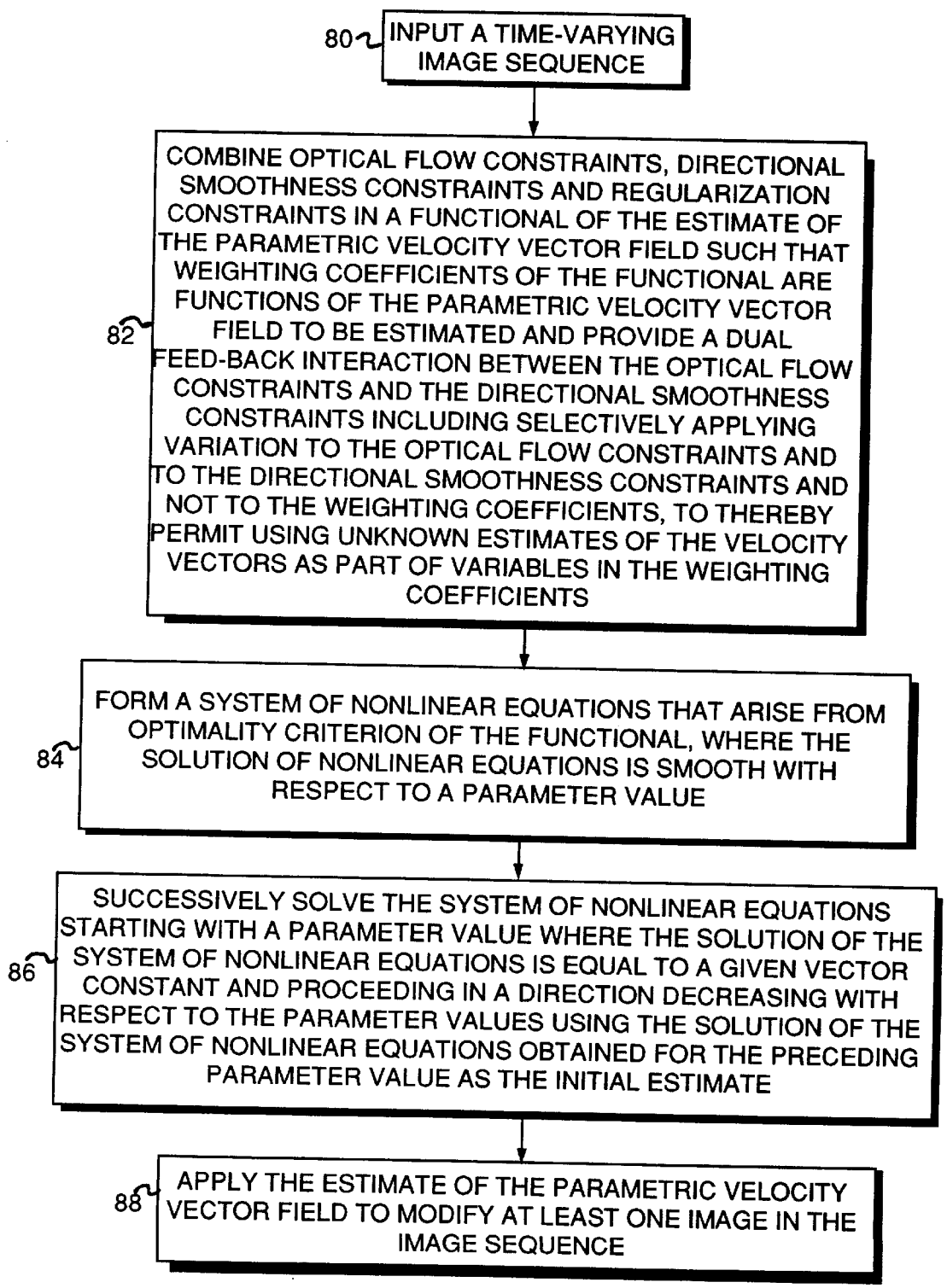
FIG. 5 illustrates a flow chart for a method of modifying an image in a time-varying image sequence in accordance with another embodiment of the present invention.

In FIG. 5, another embodiment of the method of the present invention for modifying an image in image sequence is illustrated. In step 80, a time-varying image sequence is input. Optical flow constraints, directional smoothness constraints and regularization constraints are combined in step 82 in a functional of the estimate of the parametric velocity vector field such that weighting coefficients of the functional are functions of the parametric velocity vector field to be estimated. A dual feed-back interaction is provided between the optical flow constraints and the directional smoothness constraints including selectively applying variation to the optical flow constraints and to the directional smoothness constraints and not to the weighting coefficients. This permits using unknown estimates of the velocity vectors as part of variables in the weighting coefficients.

In step 84, a system of nonlinear equations is formed that arise from optimality criterion of the functional, where the solution of nonlinear equations is smooth with respect to a parameter value. The system of nonlinear equations is successively solved in step 86, starting with a parameter value where the solution of the system of nonlinear equations is equal to a given vector constant and proceeds in a direction decreasing with respect to the parameter values using the solution of the system of nonlinear equations obtained for the preceding parameter value as the initial estimate. Then, in step 88, the estimate of the parametric velocity vector field is applied to modify at least one image in the image sequence.

Figure 6A:
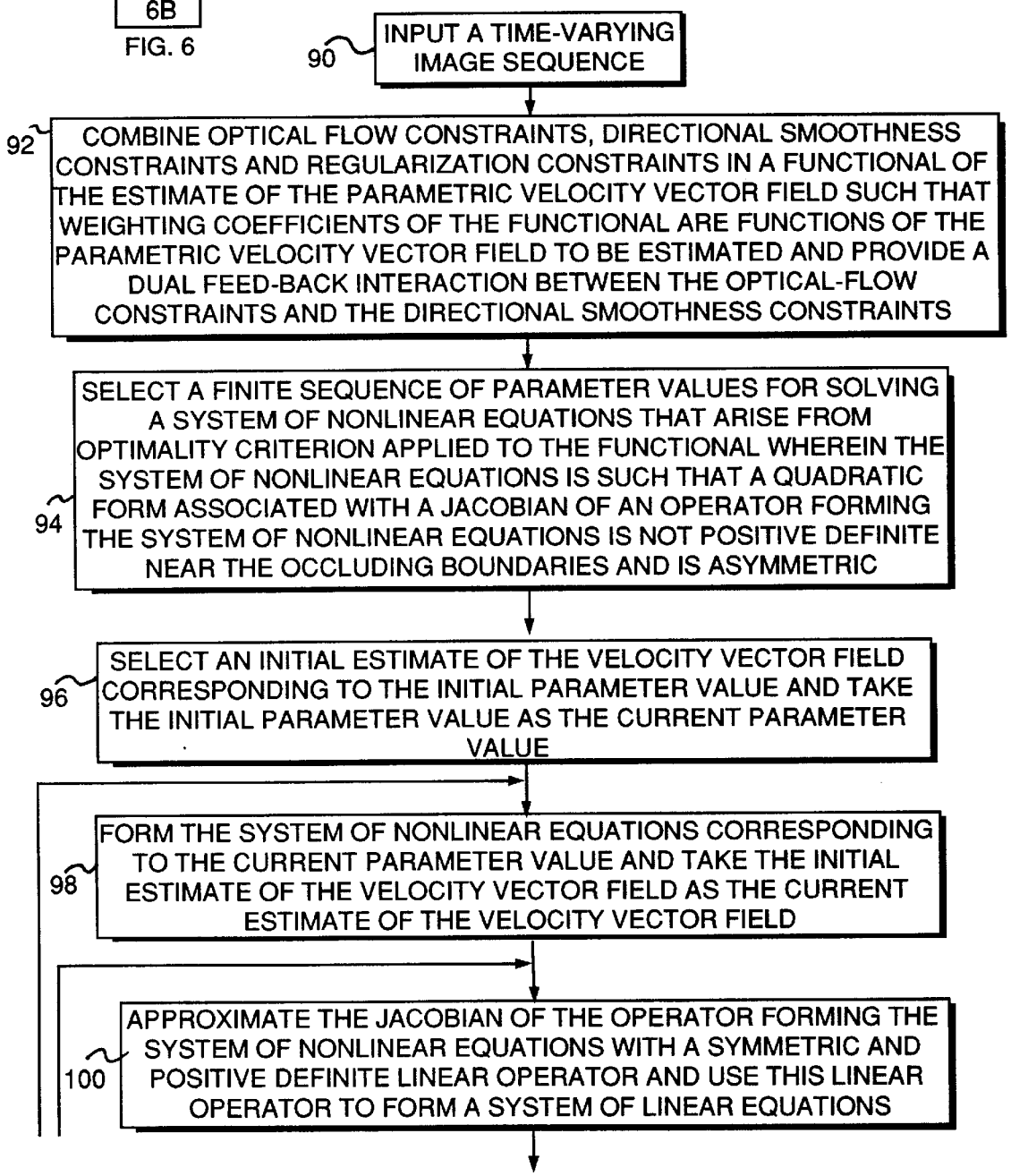
FIG. 6 illustrates a flow chart for a method of modifying an image in a time-varying image sequence in accordance with another embodiment of the present invention.
Figure 6B:
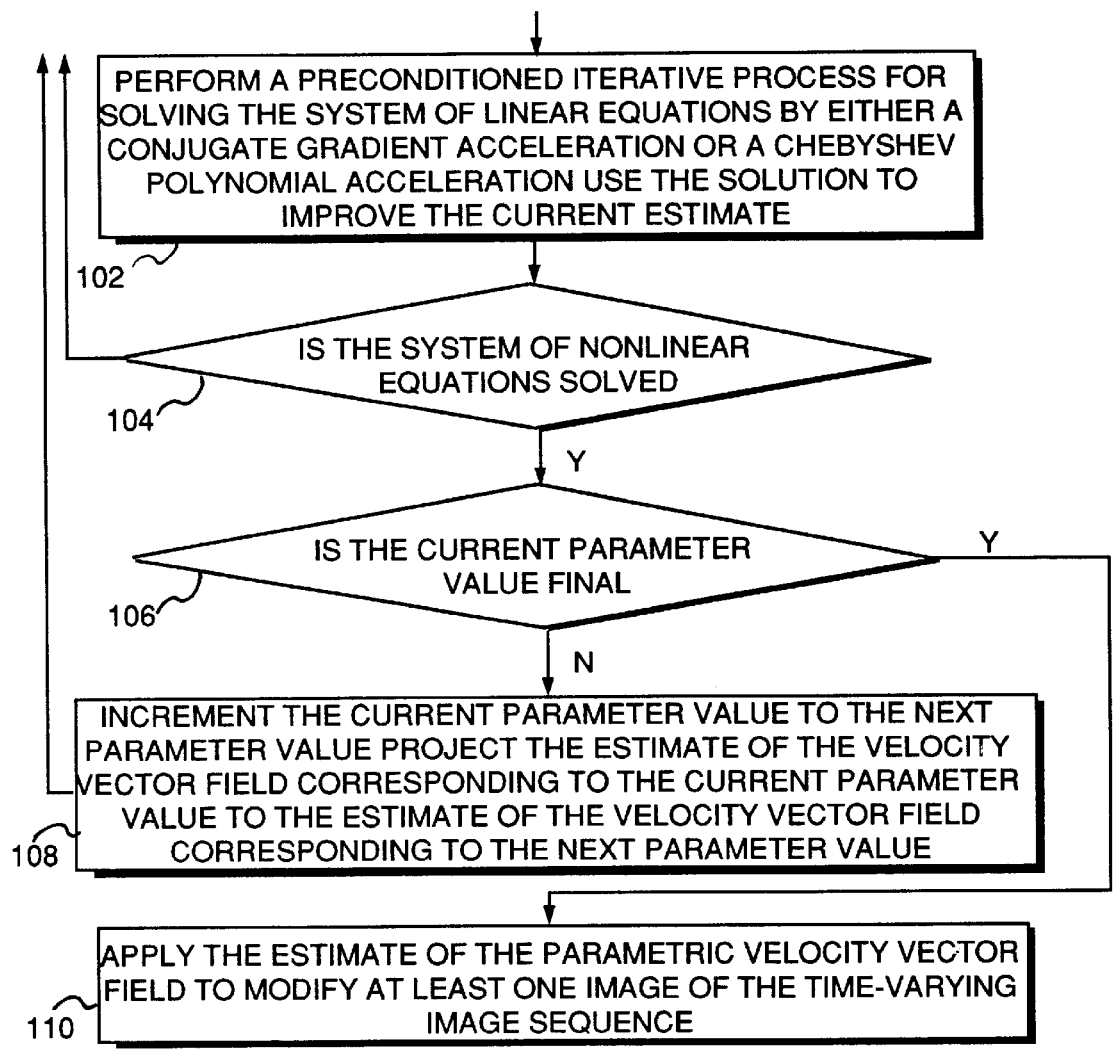

FIG. 6 illustrates a flow chart of another embodiment of the method of the present invention in which a time-varying image sequence is input in step 90. In step 92, optical flow constraints, directional smoothness constraints and regularization constraints are combined in a functional of the estimate of the parametric velocity vector field such that weighting coefficients of the functional are functions of the parametric velocity vector field to be estimated, and a dual feed-back interaction is provided between the optical flow constraints and the directional smoothness constraints.

In step 94, a finite sequence of parameter values is selected for solving a system of nonlinear equations that arise from optimality criterion applied to the functional. This system of nonlinear equations is such that a quadratic form associated with a Jacobian of an operator forming the system of nonlinear equations is not positive definite near the occluding boundaries and is asymmetric. In step 96, an initial estimate of the velocity vector field corresponding to the initial parameter value is selected, and the initial parameter value is taken as the current parameter value.

The system of nonlinear equations corresponding to the current parameter value is formed in step 98, and the initial estimate of the velocity vector field is the current estimate of the velocity vector field as taken.

In step 100, the Jacobian of the operator forming the system of nonlinear equations is approximated with a symmetric and positive definite linear operator. This linear operator is used to form a system of linear equations. In step 102, a preconditioned iterative process is performed for solving the system of linear equations by either a conjugate gradient acceleration or a Chebyshev polynomial acceleration. This solution is then used to improve the current estimate.

It is determined in step 104 whether the system of nonlinear equations is solved. If the determination is no, the flow loops back to between steps 98 and 100. If the determination is yes, a second decision step, step 106, is reached in which it is determined whether the current parameter value is final. If this determination is no, the current parameter value is incremented in step 108 to the next parameter value. The estimate of the velocity vector field to the current parameter value is projected to the estimate of the velocity vector field corresponding to the next parameter value. The flow then loops back to between steps 96 and 98.

If the current parameter value is final, as determined in step 106, the method proceeds to step 110, in which the estimate of the parametric velocity vector field is applied in order to modify at least one image of the time-varying image sequence.

Figure 7:
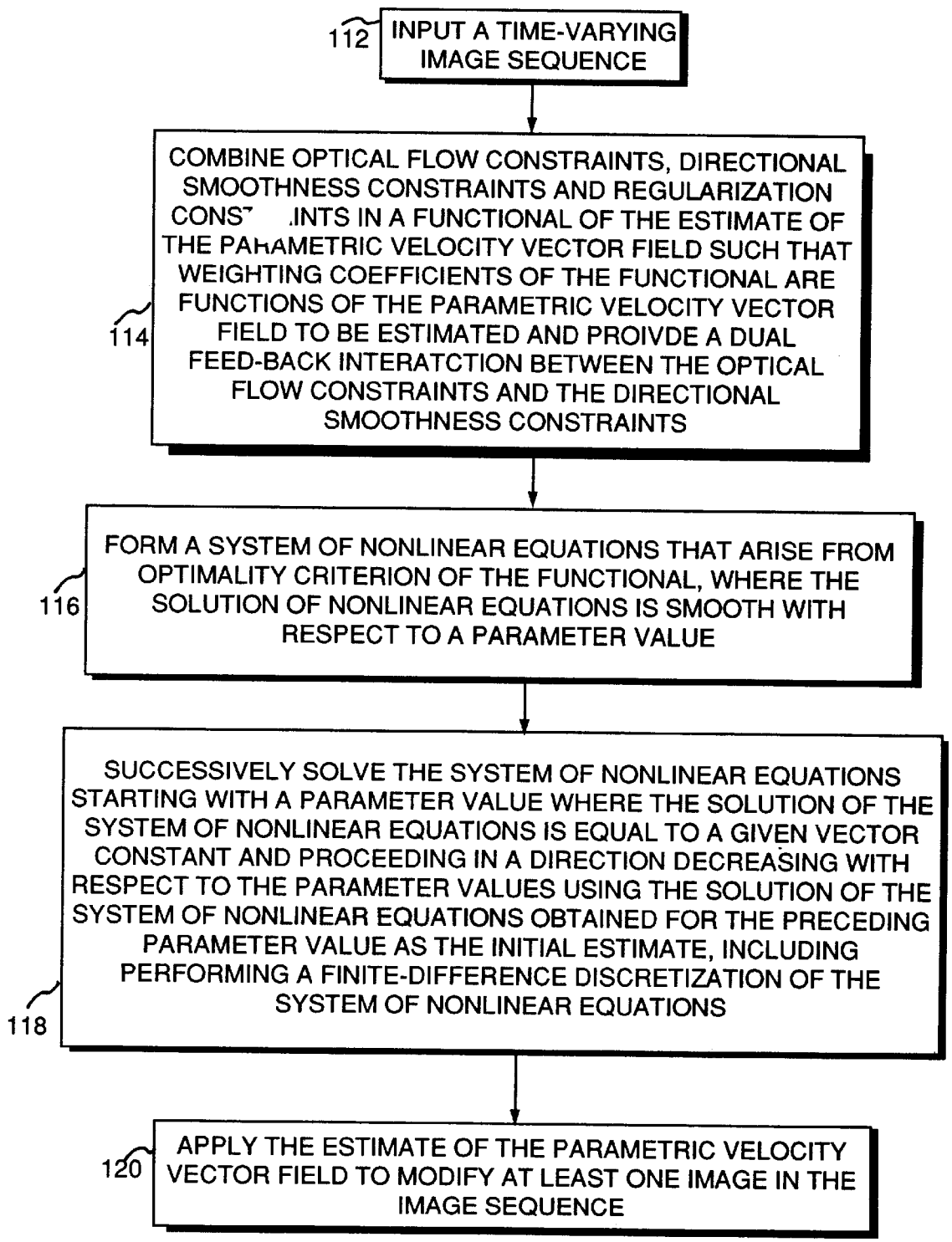
FIG. 7 illustrates a flow chart for a method of modifying an image in a time-varying image sequence in accordance with another embodiment of the present invention.

In the embodiment of FIG. 7, steps 112, and 114 are the same as steps 90, and 92 in FIG. 6. In step 116, a system of nonlinear equations is formed that arise from optimality criterion of the functional. The solution of nonlinear equations is smooth with respect to a parameter value.

In step 118, the system of nonlinear equations is successively solved starting with a parameter value where the solution of the system of nonlinear equations is equal to a given vector constant and proceeds in the direction decreasing with respect to the parameter values using the solution of the system of nonlinear equations obtained for the preceding parameter value as the initial estimate. This includes performing a finite-difference discretization of the system of nonlinear equations. Then, in step 120, the estimate of the parametric velocity vector field is applied to modify at least one image in the image sequence.

Figure 8:
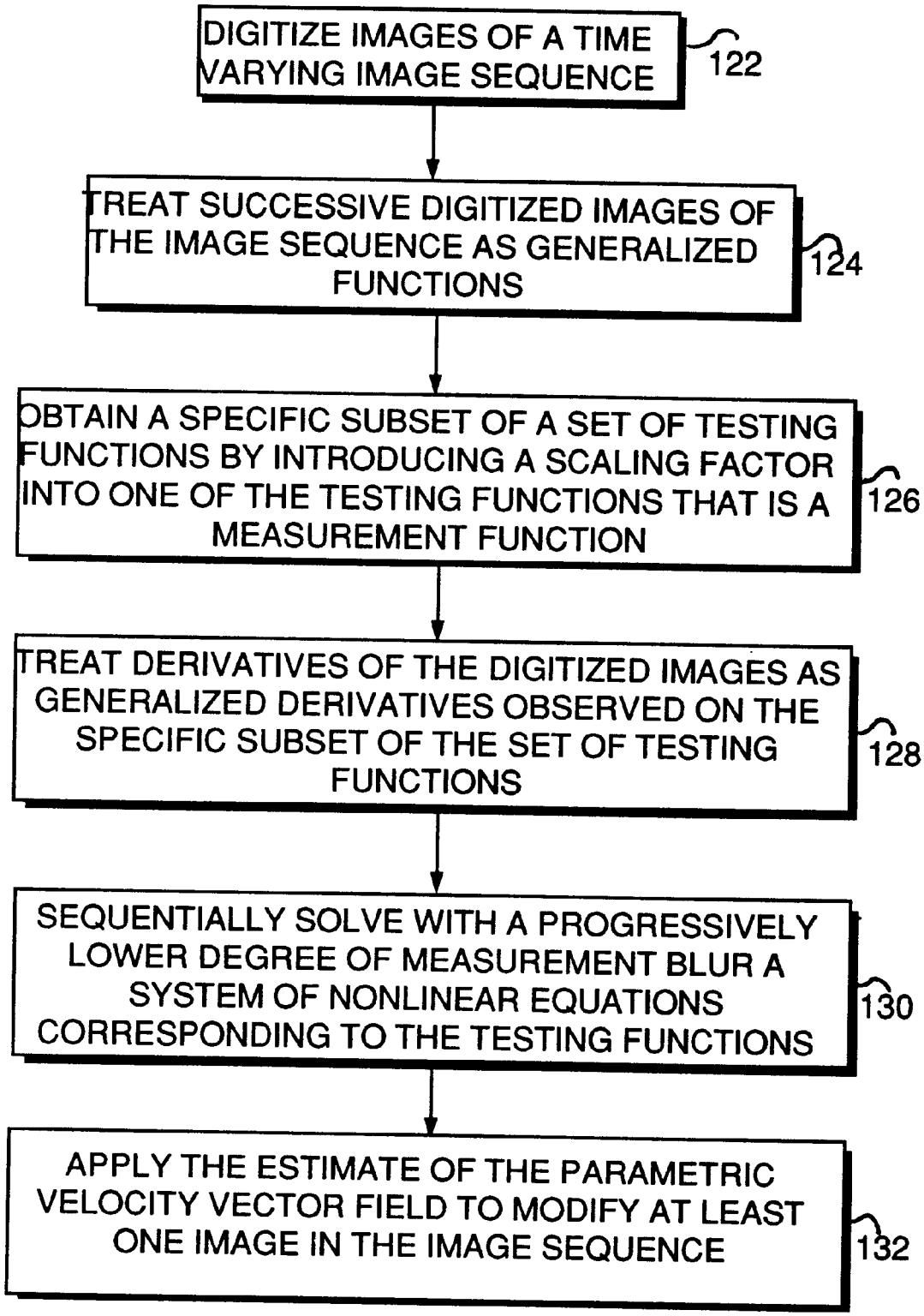
FIG. 8 illustrates a flow chart for a method of modifying an image in a time-varying image sequence in accordance with another embodiment of the present invention.

FIG. 8 illustrates another embodiment of the method of the present invention. In step 122, the images of a time-varying image sequence are digitized. Successive digitized images of the image sequence are treated as generalized functions in step 124. A specific subset of a set of testing functions is obtained in step 126 by introducing a scaling factor into one of the testing functions that is a measurement function. The derivatives of the digitized images are treated in step 128 as generalized derivatives observed on the specific subset of the set of testing functions. In step 130, a system of nonlinear equations corresponding to the testing functions are sequentially solved with a progressively lower degree of measurement blur. Finally, in step 132, the estimate of the parametric velocity vector field is applied to modifying at least one image in the image sequence.

While there has been shown what is considered to be the preferred embodiments of the invention, it will be manifest that many changes and modifications may be made therein without departing from the essential spirit of the invention.

It is intended, therefore, in the annexed claims, to cover all such changes and modifications as may fall within the true scope of the invention.

I claim:

1. A method of modifying a time-varying image sequence comprising the steps of:

a. estimating a parametric velocity vector field that characterizes changes in successive images of the image sequence, said step of estimating including:
  i. combining optical flow constraints, directional smoothness constraints and regularization constraints in a functional of the estimate of the parametric velocity vector field such that weighting coefficients of the functional are functions of the parametric velocity vector field to be estimated; and
  ii. solving a system of nonlinear equations that arise from optimality criterion of the functional;
 b. applying the estimate of the parametric velocity vector field to modify at least one image in the image sequence.

2. The method of claim 1, wherein the step of solving the system of nonlinear equations includes the steps of selecting a finite sequence of parameter values, and successively solving the system of nonlinear equations starting with a parameter value where the solution of the system of nonlinear equations is equal to a given vector constant and proceeding in a direction decreasing with respect to the parameter values using the solution of the system of nonlinear equations obtained for the preceding parameter value as the initial estimate.

3. The method of claim 1, wherein the solution of the system of nonlinear equations is smooth with respect to a parameter value.

4. The method of claim 1, wherein the system of nonlinear equations is such that a quadratic form associated with a Jacobian of an operator forming the system of nonlinear equations is not positive definite near the occluding boundaries and is asymmetric.

5. The method of claim 4, further comprising approximating the Jacobian with a symmetric and positive definite linear operator.

6. The method of claim 5, further comprising deriving a parametric system of linear equations from the Jacobian.

7. The method of claim 6, further comprising performing a preconditioned iterative process for solving the system of linear equations.

8. The method of claim 7, wherein the iterative process is a conjugate gradient acceleration.

9. The method of claim 7, wherein the iterative process is a Chebyshev polynomial acceleration.

10. The method of claim 2, wherein the successive solving of the system of nonlinear equations includes performing a finite-difference discretization of the system of nonlinear equations.

11. The method of claim 1, wherein the system of nonlinear equations that are solved is:

$$\sum_{g_t \in G_t} \frac{\rho(g_t) \tilde{g}_{t\vec{u}}^{\sigma} \tilde{g}_t^{\sigma}}{r^2 + (p^2 + q^2(\|\nabla \tilde{u}^{\sigma}\|^2 + \|\nabla \tilde{v}^{\sigma}\|^2))(\tilde{g}_t^{\sigma})^2} -$$

-continued $$\sum_{s \in S} \frac{\rho_s(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} +$$

$$\gamma^\sigma (\tilde{u}^\sigma - \tilde{u}^{\delta(\sigma)}) = 0,$$

$$\sum_{g_t \in G_t} \frac{\rho(g_t) \tilde{g}_{t\tilde{u}}^\sigma \tilde{g}_t^\sigma}{r^2 + (p^2 + q^2(\|\nabla \tilde{u}^\sigma\|^2 + \|\nabla \tilde{v}^\sigma\|^2))(\tilde{g}_t^\sigma)^2} -$$

$$\sum_{s \in S} \frac{\rho_s(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} +$$

$$\gamma^\sigma (\tilde{v}^\sigma - \tilde{v}^{\delta(\sigma)}) = 0,$$

where the parameters appearing in this system of nonlinear equations variables are defined as follows: $\sigma\delta(\sigma)$ are smoothing parameters; $\tilde{u}^o$ is a horizontal component of the estimate of the velocity vector, $\tilde{v}^o$ is a vertical component of the estimate of the velocity vector; $G_1$ is a set of optical flow constraints; r, p, q, $\rho(g_1)$, $g_1 \in G_1$ are constant parameters specifying the part of the system of nonlinear equations representing the optical flow constraints; $\|\nabla \tilde{u}^o\|$ is a norm of the gradient of the horizontal component of the estimate of the velocity vector; $\|\nabla \tilde{v}^o\|$ is a norm of the gradient of the vertical component of the estimate of the velocity vector, $\tilde{g}_1{}^o$, $g_1 \in G_1$ is an optical flow constraint; $\tilde{g}_{1\tilde{u}}{}^o$, $g_1 \in G_1$ is a derivative of the optical flow constraint $\tilde{g}_1{}^o$ with respect to the horizontal component $\tilde{u}^o$ of the estimate of the velocity vector; $\tilde{g}_{1\tilde{v}}{}^o$, $g_1 \in G_1$ is a derivative of the optical flow constraint $\tilde{g}_1{}^o$ with respect to the vertical component $\tilde{v}^o$ of the estimate of the velocity vector; S is a set of directions used in the directional smoothness constraints; $a,c,b,\rho_s, s \in S$ are constant parameters specifying the part of the system of nonlinear equations representing the directional smoothness constraints; $b^2(s,\sigma'\tilde{g}_1{}^o)^2$ is a weighted average of the squares of the directional derivatives of the optical flow constraints in the direction s; $(s\nabla\tilde{u}^o)$ is a directional derivative of the horizontal component $\tilde{u}^o$ of the estimate of the velocity vector in the direction s; $(s,\nabla\tilde{v}^o)$ is a directional derivative of the vertical component $\tilde{v}^o$ of the estimate of the velocity vector in the direction s; $\gamma^o$ is the constant parameter.

12. A method of modifying a time-varying image sequence comprising the steps of:
  a. estimating a parametric velocity vector field that characterizes changes in successive images of the image sequence, said step of estimating including:
    i. combining optical flow constraints, directional smoothness constraints and regularization constraints in a functional of the estimate of the parametric velocity vector field such that weighting coefficients of the functional are functions of the parametric velocity vector field to be estimated;
    ii. providing a dual feed-back interaction between the optical flow constraints and the directional smoothness constraints;
    iii. solving a system of nonlinear equations that arise from optimality criterion of the functional;
  b. applying the estimate of the parametric velocity vector field to modify at least one image in the image sequence.

13. The method of claim 12, wherein the step of providing dual feed-back interaction includes selectively applying variation to the optical flow constraints and to the directional smoothness constraints and not to the weighting coefficients, to thereby permit using unknown estimates of the velocity vectors as part of variable in the weighting coefficients.

14. The method of claim 12, wherein the step of solving the system of nonlinear equations includes the steps of selecting a finite sequence of parameter values, and successively solving the system of nonlinear equations starting with a parameter value where the solution of the system of nonlinear equations is equal to a given vector constant and proceeding in a direction decreasing with respect to the parameter values using the solution of the system of nonlinear equations obtained for the preceding parameter value as the initial estimate.

15. The method of claim 12, wherein the solution of the system of nonlinear equations is smooth with respect to a parameter value.

16. The method of claim 12, wherein the system of nonlinear equations is such that a quadratic form associated with a Jacobian of an operator forming the system of nonlinear equations is not positive definite near the occluding boundaries and is asymmetric.

17. The method of claim 16, further comprising approximating the Jacobian with a symmetric and positive definite linear operator.

18. The method of claim 17, further comprising deriving a parametric system of linear equations from the Jacobian.

19. The method of claim 18, further comprising performing a preconditioned iterative process for solving the system of linear equations.

20. The method of claim 19, wherein the iterative process is a conjugate gradient acceleration.

21. The method of claim 19, wherein the iterative process is a Chebyshev polynomial acceleration.

22. The method of claim 14, wherein the successive solving of the system of nonlinear equations includes performing a finite-difference discretization of the system of nonlinear equations.

23. The method of claim 12, wherein the system of nonlinear equations that are solved is:

$$\sum_{g_t \in G_t} \frac{\rho(g_t) \tilde{g}_{t\tilde{u}}^\sigma \tilde{g}_t^\sigma}{r^2 + (p^2 + q^2(\|\nabla \tilde{u}^\sigma\|^2 + \|\nabla \tilde{v}^\sigma\|^2))(\tilde{g}_t^\sigma)^2} -$$

$$\sum_{s \in S} \frac{\rho_s(s, \nabla \tilde{u}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} +$$

$$\gamma^\sigma (\tilde{u}^\sigma - \tilde{u}^{\delta(\sigma)}) = 0,$$

$$\sum_{g_t \in G_t} \frac{\rho(g_t) \tilde{g}_{t\tilde{v}}^\sigma \tilde{g}_t^\sigma}{r^2 + (p^2 + q^2(\|\nabla \tilde{u}^\sigma\|^2 + \|\nabla \tilde{v}^\sigma\|^2))(\tilde{g}_t^\sigma)^2} -$$

$$\sum_{s \in S} \frac{\rho_s(s, \nabla \tilde{v}^\sigma)}{a^2 + (c^2 + b^2(s, \nabla' \tilde{g}_t^\sigma)^2)((s, \nabla \tilde{u}^\sigma)^2 + (s, \nabla \tilde{v}^\sigma)^2)} +$$

$$\gamma^\sigma (\tilde{v}^\sigma - \tilde{v}^{\delta(\sigma)}) = 0,$$

where the parameters appearing in this system of nonlinear equations variables are defined as follows: $\sigma\delta(\sigma)$ are smoothing parameters; $\tilde{u}^o$ is a horizontal component of the estimate of the velocity vector, $\tilde{v}^o$ is a vertical component of the estimate of the velocity vector; $G_1$ is a set of optical flow constraints; r, p, q, $\rho(g_1)$, $g_1 \in G_1$ are constant parameters specifying the part of the system of nonlinear equations representing the optical flow constraints; $\|\nabla \tilde{u}^o\|$ is a norm of the gradient of the horizontal component of the estimate of the velocity vector; $\|\nabla \tilde{v}^o\|$ is a norm of the gradient of the vertical component of the estimate of the velocity vector, $\tilde{g}_1^o$, $g_1 \in G_1$ is an optical flow constraint; $\tilde{g}_{1\tilde{u}}^o$, $g_1 \in G_1$ is a derivative of the optical flow constraint $\tilde{g}_1^o$ with respect to the horizontal component $\tilde{u}^o$ of the estimate of the velocity vector; $\tilde{g}_{1\tilde{v}}^o$, $g_1 \in G_1$ is a derivative of the optical flow constraint $\tilde{g}_1^o$ with respect to the vertical component $\tilde{v}^o$ of the estimate of the velocity vector; S is a set of directions used in the directional smoothness constraints; $a,c,b,\rho_s,s \in S$ are constant parameters specifying the part of the system of nonlinear equations representing the directional smoothness constraints; $b^2(s,\sigma'\tilde{g}_1^o)^2$ is a weighted average of the squares of the directional derivatives of the optical flow constraints in the direction s; $(s\nabla\tilde{u}^o)$ is a directional derivative of the horizontal component $\tilde{u}^o$ of the estimate of the velocity vector in the direction s; $(s,\nabla\tilde{v}^o)$ is a directional derivative of the vertical component $\tilde{v}^o$ of the estimate of the velocity vector in the direction s; $\gamma^o$ is the constant parameter.

24. A method of modifying a time-varying image sequence comprising the steps of:

a. digitizing images of the time-varying image sequence;
b. estimating a parametric velocity vector field that characterizes changes in successive digitized images of the image sequence, said step of estimating including:
  i. treating the digitized images as generalized functions;
  ii. obtaining a specific subset of a set of testing functions by introduction of a scaling factor into one of the testing functions that is a measurement function;
  iii. treating derivatives of the digitized images as generalized derivatives observed on the specific subset of the set of testing functions; and
  iv. sequentially solving with a progressively lower degree of measurement blue a system of nonlinear equations corresponding to the testing functions;
b. applying the estimate of the parametric velocity vector field to modify at least one image in the image sequence.

* * * * *